(12) United States Patent
Saito et al.

(10) Patent No.: US 8,077,582 B2
(45) Date of Patent: Dec. 13, 2011

(54) OPTICAL PICKUP, OPTICAL INFORMATION RECORDING METHOD, AND OPTICAL DISC APPARATUS

(75) Inventors: Kimihiro Saito, Kanagawa (JP); Shiori Ogi, Kanagawa (JP); Goro Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/734,653

(22) PCT Filed: Oct. 1, 2009

(86) PCT No.: PCT/JP2009/067525
§ 371 (c)(1),
(2), (4) Date: May 14, 2010

(87) PCT Pub. No.: WO2010/038909
PCT Pub. Date: Apr. 8, 2010

(65) Prior Publication Data
US 2010/0238782 A1 Sep. 23, 2010

(30) Foreign Application Priority Data

Oct. 3, 2008 (JP) .................................. 2008-259110
Oct. 3, 2008 (JP) .................................. 2008-259111
Oct. 3, 2008 (JP) .................................. 2008-259112

(51) Int. Cl.
*G11B 7/00* (2006.01)
(52) U.S. Cl. ............. 369/112.01; 369/112.03; 369/53.11
(58) Field of Classification Search ................. 369/53.11
See application file for complete search history.

(56) References Cited

U.S. PATENT DOCUMENTS

| 5,107,483 | A * | 4/1992 | Nakajima et al. ............. 369/108 |
| 6,614,820 | B2 * | 9/2003 | Hirata et al. ................ 372/38.02 |
| 7,835,409 | B2 * | 11/2010 | Mizuuchi et al. ............... 372/25 |
| 2008/0205244 | A1 * | 8/2008 | Kitabayashi ............. 369/112.04 |
| 2009/0109816 | A1 * | 4/2009 | Usui et al. ................... 369/47.53 |
| 2010/0020375 | A1 * | 1/2010 | Jeong et al. ..................... 359/22 |

FOREIGN PATENT DOCUMENTS

JP    10-221075    8/1998
(Continued)

OTHER PUBLICATIONS

Toriumi, A. et al., "Reflection confocal microscope readout system for three-dimensional photochromic optical data storage", Optics LETTERS/vol. 23, No. 24/Dec. 15, 1988, pp. 1924-1926.

*Primary Examiner* — Lixi C Simpson
(74) *Attorney, Agent, or Firm* — Wolf, Greenfield & Sacks, P.C.

(57) ABSTRACT

The recording accuracy of information on an optical disc is increased.
An information optical system (150) of an optical disc apparatus (110) enables a semiconductor laser (3) to sequentially output specific peak light (LEP) and specific slope light (LES) as an information light beam (LM) and enables the correction lens (162) to change the divergence angle of the specific peak light (LEP) so that an absorption change area (RA) by the specific peak light (LEP) can be positioned at a far position in the recording layer (101). Thus, it is possible to form an energy concentration area (RE) by the specific slope light (LES) in the vicinity of a target position (QG), and the recording accuracy of information on the optical disc (100) can be increased.

20 Claims, 36 Drawing Sheets

FOREIGN PATENT DOCUMENTS

| | | |
|---|---|---|
| JP | 2005-037658 | 2/2005 |
| JP | 2005-209988 | 8/2005 |
| JP | 2006-278926 | 10/2006 |
| JP | 2007-133925 | 5/2007 |
| JP | 2007-522594 | 8/2007 |
| JP | 2008-071433 | 3/2008 |
| JP | 2008-176902 | 7/2008 |

\* cited by examiner (A) PLs SET PULSE, Ws = 1.25 ns, SL PULSE SIGNAL (B) PLhalf, PL GENERATED PULSE, SL PULSE SIGNAL (C) PDhalf, PD DRIVING PULSE, Vmax, SD LASER DRIVING SIGNAL FIG. 19
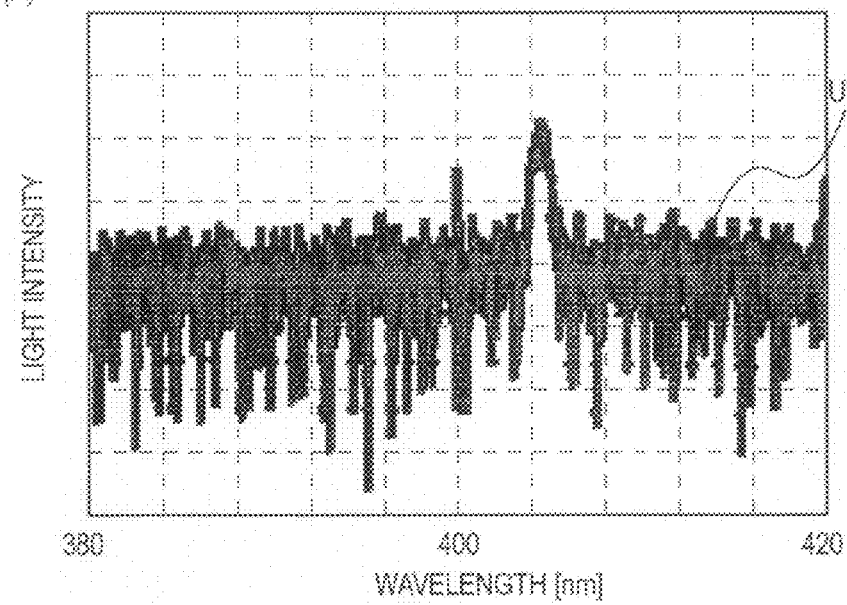
(A)
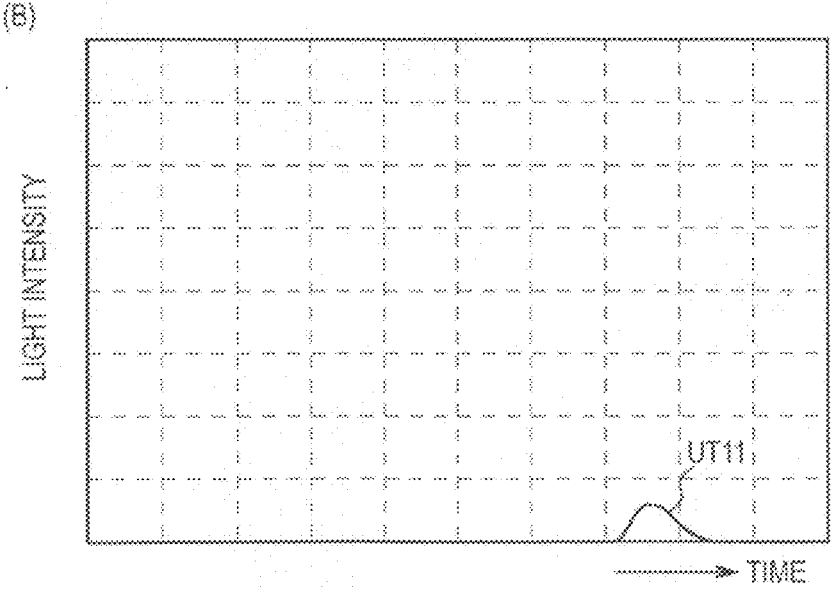
(B)

FIG. 20
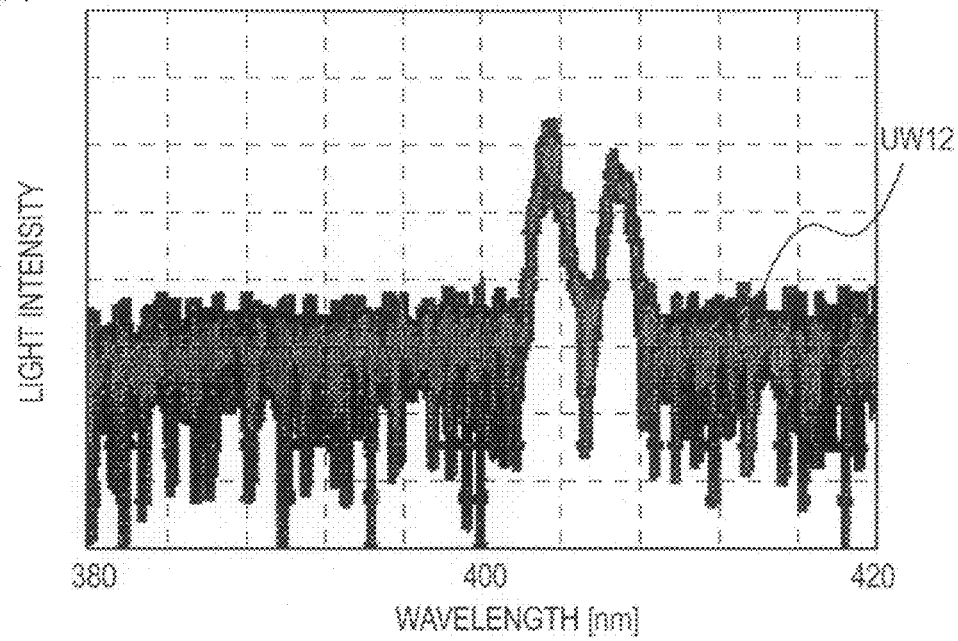
(A)
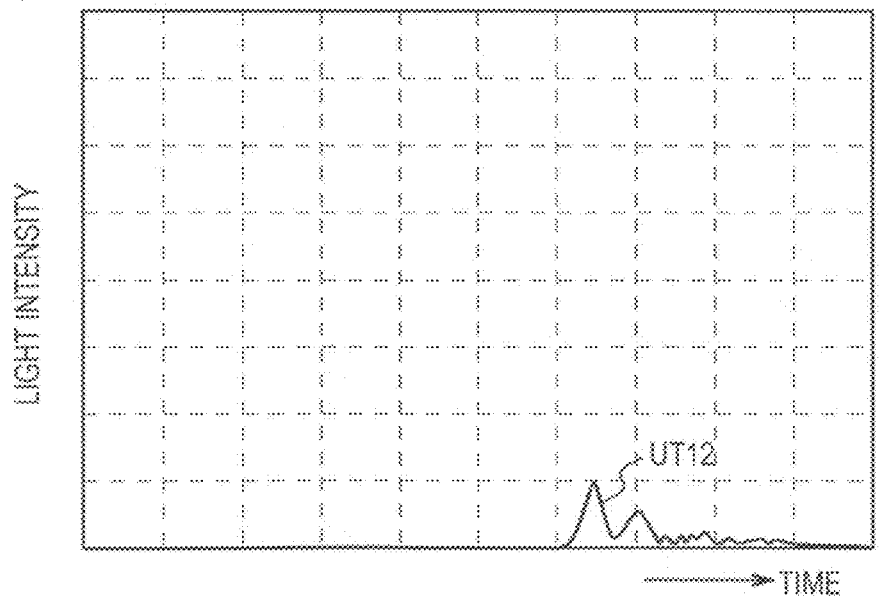
(B)

FIG. 22
(A)
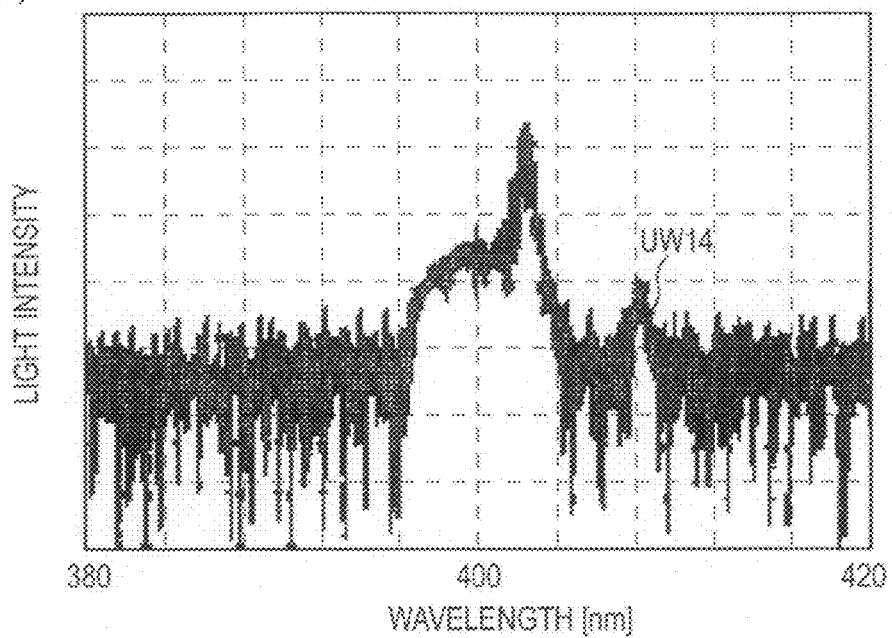
(B)
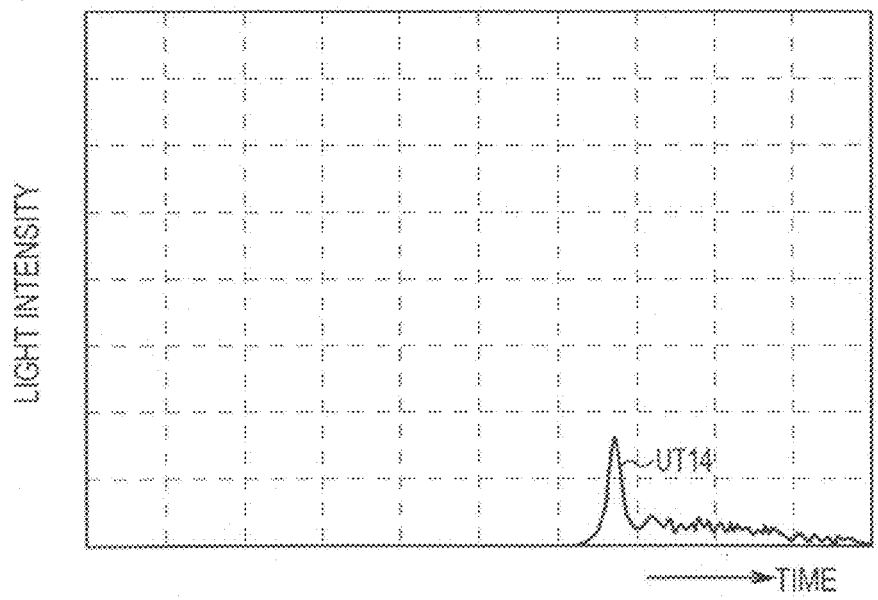

FIG. 23
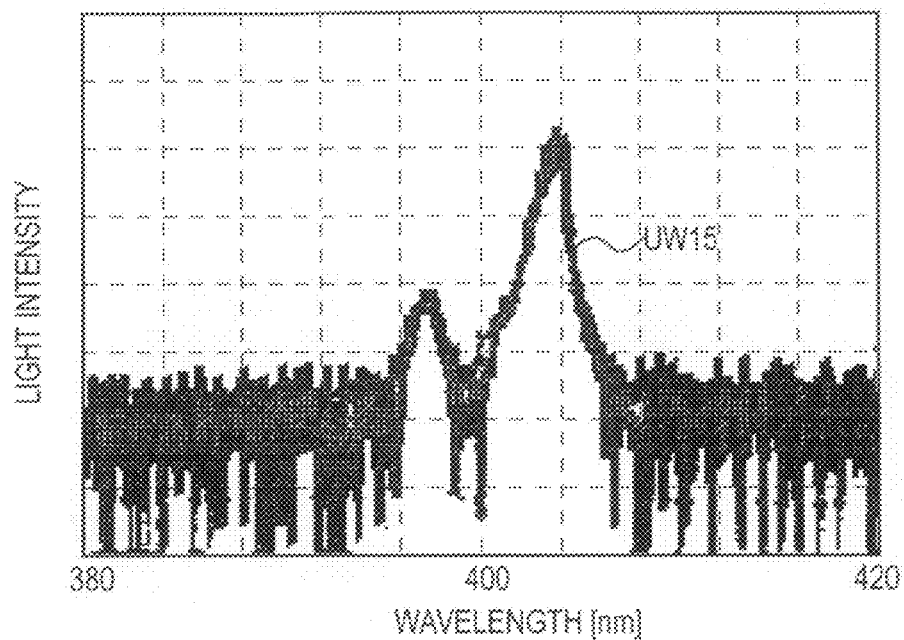
(A)
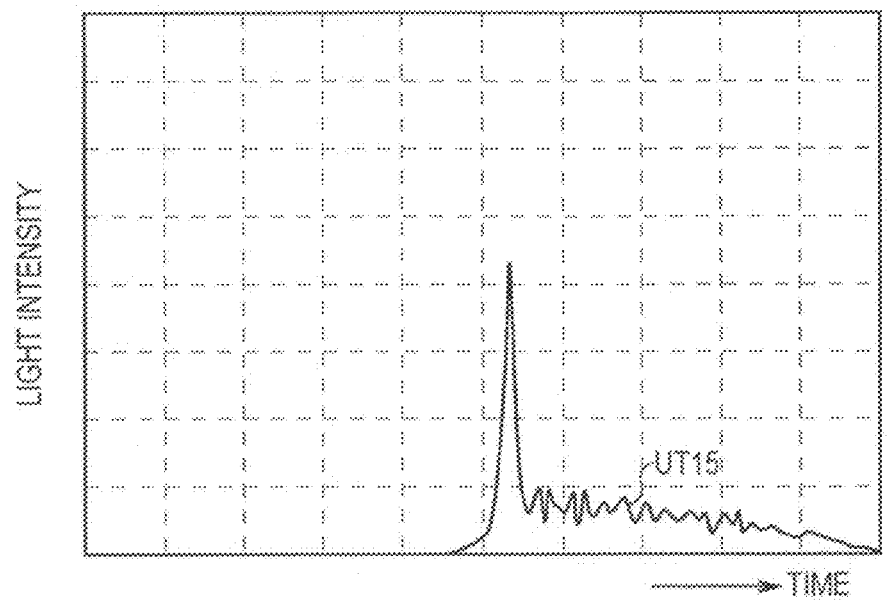
(B)

OPTICAL PICKUP, OPTICAL INFORMATION RECORDING METHOD, AND OPTICAL DISC APPARATUS

TECHNICAL FIELD

The present invention relates to an optical pickup, an optical information recording method, and an optical disc apparatus, and is suitable for use with, for example, an optical disc apparatus that records information on an optical disc by using a light beam.

BACKGROUND ART

Hitherto, optical disc apparatuses that are configured to record information on circular-plate-shaped optical discs, such as CDs (Compact Discs), DVDs (Digital Versatile Discs) or Blu-ray Discs (registered trademark, hereinafter referred to as BDs) and configured to read such information from such an optical disc have become widely popular.

In such optical disc apparatuses, various kinds of information, such as various content, for example, music content and video content, or various data, for use in a computer, is recorded on an optical disc.

In particular, in recent years, the amount of information has increased due to video having a higher definition and music having a higher sound quality, and also, there has been a demand for more content to be recorded on one optical disc. Therefore, there has been a demand for such optical discs to have a larger capacity.

Accordingly, as one of techniques of enabling such optical discs to have a larger capacity, a technique has been proposed in which a two-photon absorbing reaction is used to form recording pits indicating information, and such recording pits are arranged in a three-dimensional manner (see, for example, Patent Literature 1).
Patent Literature
PTL 1: Japanese Unexamined Patent Application Publication No. 2005-37658
PTL 2: Japanese Unexamined Patent Application Publication No. 2008-71433
Non Patent Literature
NPL 1: A. Toriumi and S. Kawata, Opt. Lett/Vol. 23, No. 24, 1998, 1924-1926

SUMMARY OF INVENTION

By the way, as a technique for forming recording marks on an optical disc, a technique is considered in which a first light beam is collected so as to cause a first reaction to occur by a two-photon absorbing reaction, and furthermore, a second light beam is collected so as to cause a second reaction, such as a thermal reaction, to occur.

In a case where recording marks are to be formed on an optical disc by such a technique, the optical disc apparatus collects a first light beam so as to cause a first reaction to occur, and thereafter collects a second light beam in accordance with a changed area in which such a reaction has occurred, making it possible to cause a second reaction to occur.

At this time, basically, if the optical disc apparatus can adjust both the focal point of the first light beam and the focal point of the second light beam to a target position, the optical disc apparatus can correctly form the recording marks at such a target position.

However, depending on the type of an optical disc, a changed area might be colored due to the first reaction. At this time, the transmittance of a light beam is decreased in such a changed area. In this case, in the optical disc, even if the second light beam is collected by adjusting the second light beam to a target position, the second reaction occurs at a position deviated to the side where such second light beam is irradiated, and the recording marks are formed in such a manner as to be deviated from the target position.

As described above, when an area is colored by a first reaction when forming recording marks by irradiating a plurality of light beams, a problem arises in that it is not possible for the optical disc apparatus to correctly form the recording marks at a desired position on the optical disc, and information recording accuracy is decreased.

The present invention has been made in view of the above points, and aims to provide an optical pickup, an optical information recording method, and an optical disc apparatus that are capable of increasing the accuracy at which information is recorded on an optical disc.

In order to solve such problems, an optical pickup of the present invention includes a semiconductor laser that sequentially emits, as laser light, specific peak light having light intensity characteristics in a pulse shape and specific slope light having light intensity characteristics in a slope shape, the specific slope light having a light intensity lower than the specific peak light and a wavelength differing from that of the specific peak light, when a driving pulse in a pulse shape and at a predetermined specific voltage is supplied; a divergence angle differing unit that causes axes or divergence angles in the specific peak light and the specific slope light to differ from each other in accordance with the wavelength of the laser light; and an objective lens for forming, in a recording layer of an optical disc, a recording mark by collecting the specific peak light so as to cause a first reaction to occur in an area in the vicinity of the focal point thereof and thereafter by collecting the specific slope light at the same focus position as that of the specific peak light so as to cause a second reaction to occur in an area in which the specific slope light is irradiated within the area in which the first reaction has occurred.

In the optical pickup of the present invention, it is possible to form a recording mark at a targeted position in only a portion overlapping a range in which specific slope light is irradiated within a reaction area in which the first reaction occurs by appropriately adjusting the degree of the difference in the optical axis or the divergence angle by the divergence angle differing unit.

In addition, in the optical pickup of the present invention, as a result of supplying a driving pulse in a pulse shape and at a predetermined specific voltage to a semiconductor laser, the semiconductor laser is made to sequentially emit, as laser light, specific peak light having light intensity characteristics in a pulse shape, and specific slope light having light intensity characteristics in a slope shape, the specific slope light having a light intensity lower than the specific peak light and a wavelength differing from that of the specific peak light. A predetermined divergence angle differing unit is made to cause the divergence angles of the specific peak light and the specific slope light to differ from each other in accordance with the wavelength of laser light. A predetermined objective lens is made to collect specific slope light after the specific peak light is collected, and the first reaction is made to occur in an area in the vicinity of the focal point with respect to the recording layer of the optical disc. Consequently, a second reaction is made to occur on a side in which specific slope light is irradiated in the area in which the first reaction has occurred so as to form a recording mark. The divergence angle differing unit causes the divergence angles of the specific peak light and the specific slope light to differ from each other so that the first reaction is made to occur in a range containing the focal point with a distant place from the focal point of the specific slope light being the center in the recording layer.

Consequently, in the optical pickup of the present invention, it is possible to position the focus position of the specific peak light at a position away from the focus position of the specific slope light, and it is possible to move the reaction area in which the first reaction occurs away from the side in which the specific peak light is irradiated. As a result, even if the reaction area is colored by the first reaction, and the second reaction by the specific slope light occurs deviated to the side in which the light beam is irradiated within the reaction area, it is possible to form a recording mark with the focal point of the specific slope light being the center, that is, at a targeted position.

In addition, an optical disc apparatus of the present invention includes a semiconductor laser that sequentially emits, as laser light, specific peak light having light intensity characteristics in a pulse shape and specific slope light having light intensity characteristics in a slope shape, the specific slope light having a light intensity lower than the specific peak light and a wavelength differing from that of the specific peak light, when a driving pulse in a pulse shape and at a predetermined specific voltage is supplied; a divergence angle differing unit that causes divergence angles in the specific peak light and the specific slope light to differ from each other in accordance with the wavelength of the laser light; an objective lens for forming, in a recording layer of an optical disc, a recording mark by collecting the specific peak light so as to cause a first reaction to occur in an area in the vicinity of a focal point and thereafter by collecting the specific slope light so as to cause a second reaction to occur in a side in which the specific slope light is irradiated in the area in which the first reaction has occurred; and a lens driving control unit for controlling the position of the focal point in the specific peak light and the specific slope light by driving the objective lens, wherein the divergence angle differing unit causes the divergence angles of the specific peak light and the specific slope light to differ from each other so that a first reaction is made to occur in a range containing the focal point of the specific slope light with a position away from the focal point being the center in the recording layer.

Consequently, in the optical disc apparatus of the present invention, it is possible to position the focus position of the specific peak light to a position away from the focus position of the specific slope light, and it is possible to move the reaction area in which the first reaction occurs away from the side in which the specific peak light is irradiated. As a result, even if the reaction area is colored by the first reaction, and the second reaction by the specific slope light occurs deviated to the side in which the light beam is irradiated within the reaction area, it is possible to form a recording mark with the focal point of the specific slope light being the center, that is, at a targeted position.

In addition, in the optical pickup of the present invention, when a driving pulse in a pulse shape and at a predetermined specific voltage is supplied to the semiconductor laser, specific peak light in a pulse shape having light intensity characteristics, and specific slope light having light intensity characteristics in a slope shape, the specific slope light having a light intensity lower than that of the specific peak light and a wavelength differing from that of the specific peak light, are emitted in sequence. The divergence angles of the specific peak light and the specific slope light are made to differ from each other in accordance with the wavelength of laser light. A recording mark is formed in the recording layer of the optical disc by collecting the specific slope light at the same focus position as that of the specific peak light and by causing a second reaction to occur in the area in which the first reaction has occurred after the specific peak light is collected and the first reaction is made to occur in an area in the vicinity of the focal point.

In the optical pickup of the present invention, it is possible to adjust the focus positions of the specific peak light and the specific slope light independently of each other by causing the divergence angles of the specific peak light and the specific slope light to differ from each other. Consequently, in the optical pickup of the present invention, even in the case that the light-emission points of the specific peak light and the specific slope light differ from each other, it is possible to collect the specific slope light in an area in which the first reaction occurs by the specific peak light. As a result, in the optical pickup and the optical information recording method of the present invention, it is possible to form a recording mark with the focal point of the specific slope light being the center.

In addition, an optical disc apparatus of the present invention includes a semiconductor laser that sequentially emits, as laser light, specific peak light having light intensity characteristics in a pulse shape and specific slope light having light intensity characteristics in a slope shape, the specific slope light having a light intensity lower than the specific peak light and a wavelength differing from that of the specific peak light, when a driving pulse in a pulse shape and at a predetermined specific voltage is supplied; a divergence angle differing unit that causes divergence angles in the specific peak light and the specific slope light to differ from each other in accordance with the wavelength of the laser light; an objective lens for forming, in a recording layer of an optical disc, a recording mark by collecting the specific peak light so as to cause a first reaction to occur in an area in the vicinity of a focal point and thereafter by collecting the specific slope light at the same focus position as that of the specific peak light so as to cause a second reaction to occur in an area in which the first reaction has occurred; and a lens driving control unit for controlling the position of the focal point in the specific peak light and the specific slope light by driving the objective lens.

In the optical disc apparatus of the present invention, it is possible to adjust the focus positions of the specific peak light and the specific slope light by causing the divergence angles of the specific peak light and the specific slope light to differ from each other. Consequently, in the optical disc apparatus of the present invention, even in the case that the light-emission points of the specific peak light and the specific slope light differ from each other, the specific slope light can be collected in an area in which the first reaction occurs by the specific peak light. Thus, it is possible to form a recording mark with the focal point of the specific slope light being the center.

In addition, in the optical pickup of the present invention, by supplying a driving pulse in a pulse shape and at a predetermined specific voltage to a semiconductor laser, the semiconductor laser is made to sequentially emit, as laser light, specific peak light having light intensity characteristics in a pulse shape, and specific slope light having light intensity characteristics in a slope shape, the specific slope light having a light intensity lower than that of the specific peak light and a wavelength differing from that of the specific peak light. The predetermined laser light separation unit is made to separate the optical axis of the specific peak light from the optical axis of the specific slope light in accordance with the wavelength of laser light. In the recording layer of the optical disc, a predetermined objective lens is made to collect the specific slope light after the specific peak light is collected and the first reaction is made to occur in an area in the vicinity of the focal point of the specific peak light, thereby causing a second reaction to occur in a portion in which the specific slope light is collected in the area in which the first reaction has occurred so as to form a recording mark. The laser light separation unit is made to separate the optical axis of the specific peak light from the optical axis of the specific slope light so that the light collection area of the specific slope light partially overlaps with the area in which the first reaction has occurred in the recording layer.

Consequently, in the optical pickup of the present invention, the focus-to-focus distance can be changed in accordance with the degree of the separation between the optical axis of the specific peak light and the optical axis of the specific slope light, and the area in which the first reaction occurs and the area in which the energy of the specific slope light is concentrated can be shifted in the plane direction of the optical disc so as to reduce the overlapping range. Thus, it is possible to reduce a recording mark formed as a result of the second reaction occurring.

In addition, an optical disc apparatus of the present invention includes a semiconductor laser that sequentially emits, as laser light, specific peak light having light intensity characteristics in a pulse shape and specific slope light having light intensity characteristics in a slope shape, the specific slope light having a light intensity lower than the specific peak light and a wavelength differing from that of the specific peak light, when a driving pulse in a pulse shape and at a predetermined specific voltage is supplied; a laser light separation unit for separating the optical axis of the specific peak light from the optical axis of the specific slope light in accordance with a wavelength of the laser light; an objective lens for forming, in a recording layer of an optical disc, a recording mark by collecting the specific peak light so as to cause a first reaction to occur in an area in the vicinity of the focal point of the specific peak light and thereafter by collecting the specific slope light so as to cause a second reaction to occur in a portion in which the specific slope light is collected in the area in which the first reaction has occurred; and a lens driving control unit for controlling the position of the focal point in the specific peak light and the specific slope light by driving the objective lens, wherein the laser light separation unit separates the optical axis of the specific peak light from the optical axis of the specific slope light so that a light collection area of the specific slope light is made to partially overlap with the area in which the first reaction has occurred in the recording layer.

Consequently, in the optical disc apparatus of the present invention, the focus-to-focus distance can be changed in accordance with the degree of the separation between the optical axis of the specific peak light and the optical axis of the specific slope light, and the area in which the first reaction occurs and the area in which the energy of the specific slope light is concentrated can be shifted in the plane direction of the optical disc so as to reduce the overlapping range. Thus, it is possible to reduce a recording mark formed as a result of the second reaction occurring.

According to the present invention, by appropriately adjusting the degree of the difference in the optical axis or the divergence angle by the divergence angle differing unit, it is possible to form a recording mark in only a portion overlapping the range in which the specific slope light is irradiated within the reaction area in which the first reaction occurs, that is, at the targeted position. Thus, according to the present invention, it is possible to realize an optical pickup capable of increasing the accuracy of recording information on an optical disc.

Furthermore, according to the present invention, it is possible to position the focus position of the specific peak light to a position away from the focus position of the specific slope light, and it is possible to move the reaction area in which the first reaction occurs away from the side in which the specific peak light is irradiated. As a result, even if the reaction area is colored by the first reaction and the second reaction by the specific slope light occurs deviated to the side in which the light beam is irradiated within the reaction area, it is possible to form a recording mark with the focal point of the specific slope light being the center, that is, at the targeted position. Thus, according to the present invention, it is possible to realize an optical pickup and an optical disc apparatus that are capable of increasing the accuracy of recording information on an optical disc.

In addition, according to the present invention, it is possible to adjust the focus positions of the specific peak light and the specific slope light independently of each other by causing the divergence angles of the specific peak light and the specific slope light to differ from each other. Consequently, in the present invention, even in the case that the light-emission points of the specific peak light and the specific slope light differ from each other, the specific slope light can be collected in an area in which the first reaction occurs by the specific peak light. Thus, it is possible to form a recording mark with the focal point of the specific slope light being the center. Thus, according to the present invention, it is possible to realize an optical pickup and an optical disc apparatus that are capable of increasing the accuracy of recording information on an optical disc.

In addition, according to the present invention, the focus-to-focus distance can be changed in accordance with the degree of the separation between the optical axis of the specific peak light and the optical axis of the specific slope light, and the area in which the first reaction occurs and the area in which the energy of the specific slope light is concentrated are shifted in the plane direction of the optical disc so as to reduce the overlapping range. Therefore, it is possible to reduce a recording mark formed as a result of the second reaction occurring. Thus, according to the present invention, it is possible to realize an optical pickup and an optical disc apparatus that are capable of increasing the recording capacity of an optical disc.

BRIEF DESCRIPTION OF DRAWINGS

FIG. 19 is a schematic diagram showing wavelength characteristics and light intensity characteristics when the voltage of the driving pulse is 8.8 [V].

FIG. 20 is a schematic diagram showing wavelength characteristics and light intensity characteristics when the voltage of a driving pulse is 13.2 [V].

FIG. 22 is a schematic diagram showing wavelength characteristics and light intensity characteristics when the voltage of a driving pulse is 17.8 [V].

FIG. 23 is a schematic diagram showing wavelength characteristics and light intensity characteristics when the voltage of a driving pulse is 38.4 [V].

DESCRIPTION OF EMBODIMENTS

Modes for the invention (hereinafter referred to as embodiments) will be described below with reference to the drawings. Meanwhile, the description will be given in the following order.

1. Principles of recording and reproducing information on and from optical information recording medium
2. Principles of outputting light beam by semiconductor laser
3. First embodiment (example in which focal point of specific peak light is adjusted to position away from focal point of specific slope light by using correction lens)
4. Second embodiment (example in which focal point of specific peak light is adjusted to same position as that of focal point of specific slope light by using correction lens)
5. Third embodiment (example in which absorption change area by specific peak light is shifted in plane direction from energy concentration area by specific slope light by using wedge prism
6. Fourth embodiment (example in which absorption change area by specific peak light is shifted in plane direction from energy concentration area by specific slope light by using diffraction grating plate)
7. Other embodiments <1. Principles of Recording and Reproducing Information on and from Optical Information Recording Medium>

First, the principles of recording and reproducing information on and from an optical information recording medium, such as an optical disc, will be described. In general, if the numerical aperture of an objective lens is denoted as NA and the wavelength of a light beam is denoted as λ, the spot diameter d when the light beam is collected is represented by equation (1) shown below.

$$d = 1.22 \frac{\lambda}{NA} \quad (1)$$

That is, in a case where the same objective lens is used, since the numerical aperture NA becomes constant, the spot diameter d of the light beam is proportional to the wavelength λ of the light beam.

Figure 1:
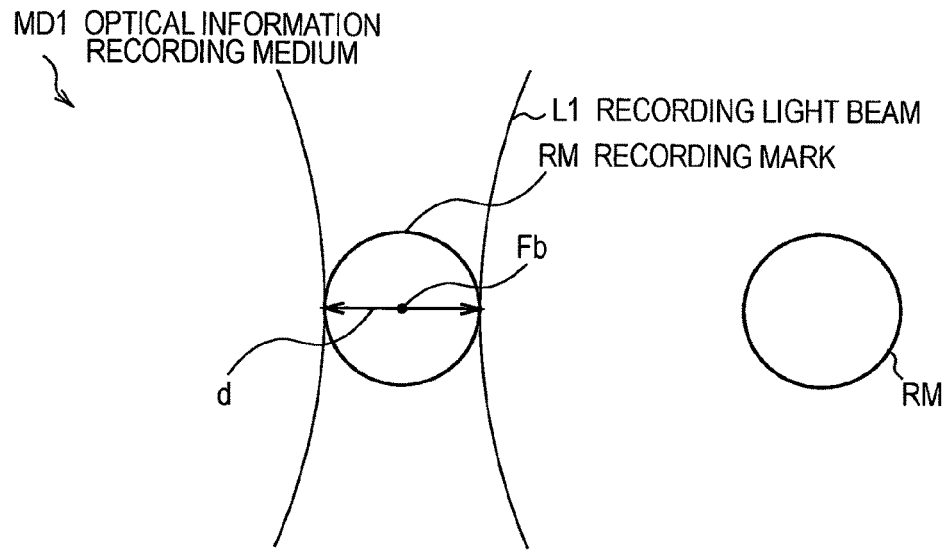
FIG. 1 is a schematic sectional view illustrating formation of a recording mark by one-photon absorption.

As shown in FIG. 1, the light intensity of the collected light beam becomes highest in the vicinity of a focal point FM, and decreases with an increase in separation from the focal point FM. For example, in a case where a recording mark RM indicating information is formed on a typical optical information recording medium MD1, a one-photon absorbing reaction has occurred. In this one-photon absorption, since a light reaction occurs as a result of absorbing one photon, such a light reaction occurs in proportion to the light intensity of the light beam.

For this reason, on the optical information recording medium, a recording mark RM is formed in an area having a predetermined light intensity or higher in a recording light beam L1. Incidentally, FIG. 1 shows a case in which a recording mark RM having the same size as that of the spot diameter d is formed.

Figure 2:
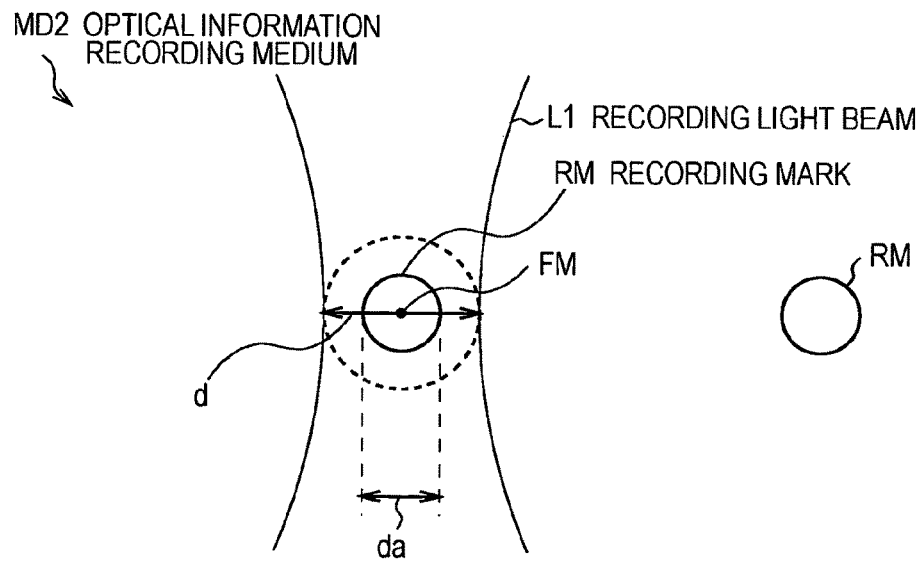
FIG. 2 is a schematic sectional view illustrating formation of a recording marks by two-photon absorbing.

In comparison, in the case of a two-photon absorbing reaction, a reaction occurs only when two photons are absorbed simultaneously. Therefore, a two-photon absorbing reaction occurs in proportion to the square of the light intensity of the light beam. For this reason, on an optical information recording medium MD2 in which a two-photon absorbing reaction occurs, as shown in FIG. 2, a recording mark RM is formed only in the vicinity of the focal point FM having a very large light intensity in a recording light beam L1.

This recording mark RM has a small size when compared to the spot diameter d of the recording light beam L1, and the diameter da thereof is small. For this reason, in the optical information recording medium MD2, by forming recording marks RM at a high density, a larger capacity of recording is made possible.

By the way, among two-photon absorbing materials, a compound (hereinafter, referred to as a light characteristic change material) that causes a chemical change to occur by a two-photon absorbing reaction and cause the light absorption characteristics thereof to be changed is known (see, for example, Non-Patent Literature 1).

Figure 3:
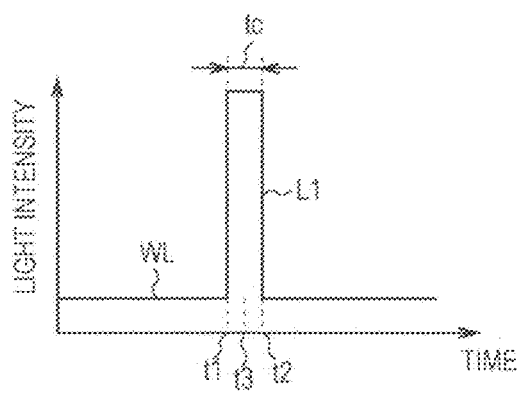
FIG. 3 is a schematic diagram illustrating changes in a light intensity in a recording light beam.

For example, the optical information recording medium MD2 formed by this light characteristic change material is irradiated with the recording light beam L1 having a wavelength at which the light characteristic change material is not originally absorbed from a time point t1 at a large light intensity over a fixed irradiation time period tc, like light intensity characteristics WL shown in FIG. 3.

Figure 4:
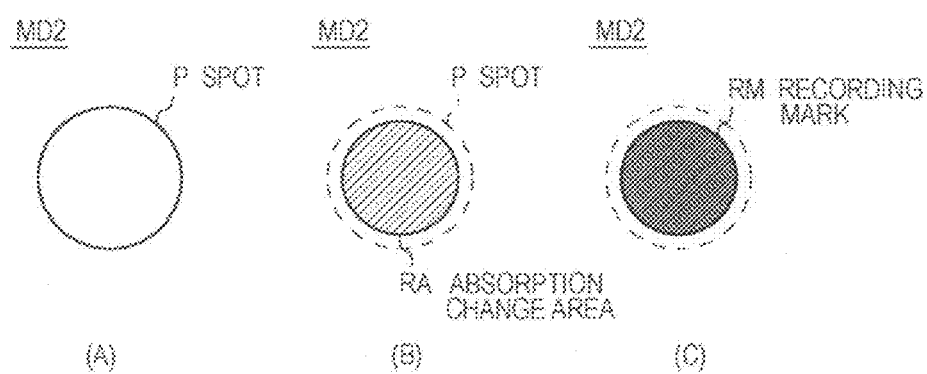
FIG. 4 is a schematic diagram illustrating a state of two-photon absorbing reaction.

In this case, the optical information recording medium MD2 formed by this light characteristic change material is irradiated with a spot P by the recording light beam L1, as shown in FIG. 4(A). After that, in the optical information recording medium MD2, at a time point t2, as shown in FIG. 4(B), the light absorption of the light characteristic change material is changed due to the two-photon absorbing reaction, and an absorption change area RA smaller than the spot P by the recording light beam L1 is formed.

In this absorption change area RA, as a result of the change of the light absorption of the light characteristic change material, the recording light beam L1 is absorbed, and heat is generated. Furthermore, the absorption change area RA is colored by the two-photon absorbing reaction, and the transmittance of the light beam therein is decreased.

After that, in the optical information recording medium MD2, if the recording light beam L1 is continued to be irradiated as is, the recording light beam L1 is absorbed and heat is generated. At a time point t3, the index of refraction is changed or a hollow is formed by a thermal reaction, thereby forming a recording mark RM as shown in FIG. 4(C).

In other words, in the optical information recording medium MD2, a recording mark RM is formed in an area in which the recording light beam L1 is continuously irradiated and a thermal reaction has occurred within the absorption change area RA formed by the two-photon absorbing reaction.

Furthermore, when the recording mark RM formed in the manner described above is irradiated with a read light beam L2 whose light intensity is comparatively weak, because the index of refraction of the recording mark RM differs from that of the light characteristic change material in the surroundings, the read light beam L2 is reflected, and a return light beam L3 is generated.

Accordingly, the optical information recording and reproduction apparatus of the present invention uses such principles. In a case where information is to be recorded, the optical information recording and reproduction apparatus irradiates the optical information recording medium MD2 with the recording light beam L1, so that, first, a two-photon absorbing reaction is caused to occur, and then, the index of refraction is changed or a hollow is formed by a thermal reaction, thereby forming a recording mark RM.

Furthermore, in a case where information is to be reproduced, the optical information recording and reproduction apparatus of the present invention irradiates the optical information recording medium MD2 with the read light beam L2 and also receives a return light beam L3. At this time, the optical information recording and reproduction apparatus detects the presence or absence of the recording mark RM on the basis of the change in the amount of light of the return light beam L3, and reproduces information on the basis of the detection result.

<2. Short Pulse Output Principles by Semiconductor Laser>

Next, a description will be given of the principles of outputting, from a semiconductor laser, laser light LL at a high light intensity at which a two-photon absorbing reaction can occur, the laser light having a short pulse shape.

[2-1. Configuration of Short Pulse Light Source]

Figure 5:
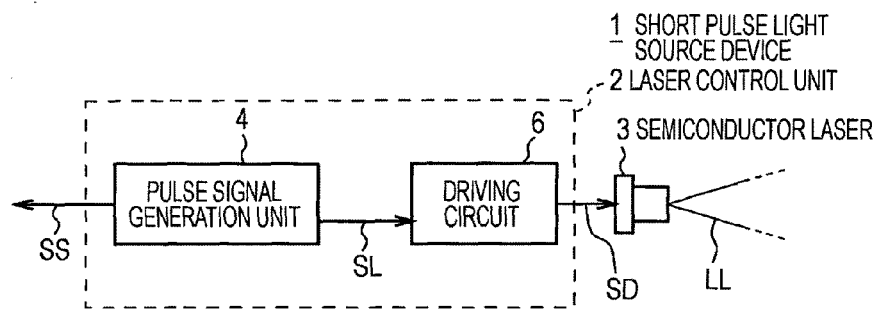
FIG. 5 is a schematic diagram showing the configuration of a short pulse light source device.

Here, a description is given by using, as an example, a short pulse light source device 1 shown in FIG. 5. This short pulse light source device 1 includes a laser control unit 2 and a semiconductor laser 3.

The semiconductor laser 3 is a typical semiconductor laser (for example, SLD3233 that uses semiconductor light emission, manufactured by Sony Corporation). The laser control unit 2 controls a driving signal D1 to be supplied to the semiconductor laser 3 so as to output laser light LL in a pulse shape from the semiconductor laser 3.

The laser control unit 2 includes a pulse signal generation unit 4 for generating a plurality of types of signals in a pulse shape at a predetermined timing, and a driving circuit 6 for driving the semiconductor laser 3 (the details will be described later).

The pulse signal generation unit 4 generates a synchronization signal SS in a rectangular wave of a predetermined period TS. The pulse signal generation unit 4 operates at a timing based on the synchronization signal SS, and can supply the synchronization signal SS to an external measurement device (not shown).

Figure 6:
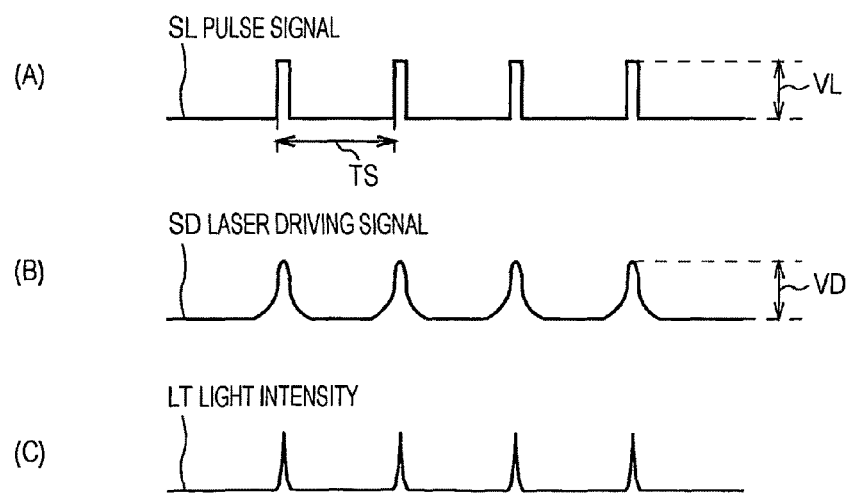
FIG. 6 is a schematic diagram showing a pulse signal and a laser driving signal.

Furthermore, as shown in FIG. 6(A), the pulse signal generation unit 4 generates a pulse signal SL that changes in a pulse shape every period TS, and supplies this signal to the driving circuit 6. This pulse signal SL indicates a timing and a period for the driving circuit 6, in which power should be supplied to the semiconductor laser 3, and the magnitude of the voltage level.

On the basis of the pulse signal SL, the driving circuit 6 generates a laser driving signal SD shown in FIG. 6(B), and supplies this signal to the semiconductor laser 3.

At this time, the driving circuit 6 generates a laser driving signal SD by amplifying the pulse signal SL at a predetermined amplification factor. For this reason, the peak voltage VD of the laser driving signal SD changes in accordance with the peak voltage VL of the pulse signal SL. Incidentally, the waveform of the laser driving signal SD has been distorted due to the amplification characteristics of the driving circuit 6.

When the semiconductor laser 3 receives the supply of the laser driving signal SD, as shown in FIG. 6(C), the semiconductor laser 3 emits the laser light LL while changing a light intensity LT in a pulse shape. In the following, emitting laser light in a pulse shape will be represented as "pulse output".

As described above, under the control of the laser control unit 2, the short pulse light source device 1 directly pulse-outputs laser light LL from the semiconductor laser 3 without using other optical components.

[2-2. Pulse Output of Laser Light in Relaxation Oscillation Mode]

By the way, it is generally known that characteristics of a laser are represented by a so-called rate equation. For example, if a confinement coefficient $\Gamma$, a photon lifetime $\tau_{ph}$ [s], a carrier lifetime $\tau_s$ [s], a natural emission coupling coefficient Cs, an active layer thickness d [mm], an elementary charge q [C], a maximum gain $g_{max}$, a carrier density N, a photon density S, an injected carrier density J, a light speed c [m/s], a transparency carrier density N0, a group index of refraction ng, and an area Ag, are used, the rate equation is represented as in equation (2) shown below.

$$\frac{dN}{dt} = -\Gamma GS - \frac{N}{\tau_s} + \frac{J}{dq} \quad (2)$$

$$\frac{dS}{dt} = \Gamma GS - \frac{S}{\tau_{ph}} + C_s \frac{N}{\tau_s}$$

Where $$G = \frac{c}{n_g} A_g (N - N_0) = \frac{c}{n_g} g_{max}$$

Figure 7:
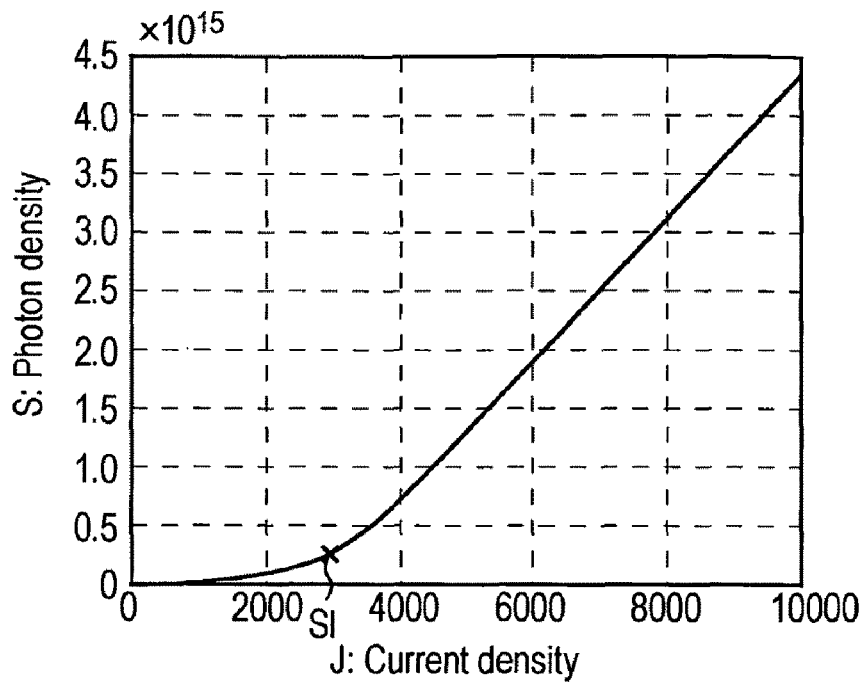
FIG. 7 is a schematic diagram illustrating the relationship between an injected carrier density and a photon density.
Figure 8:
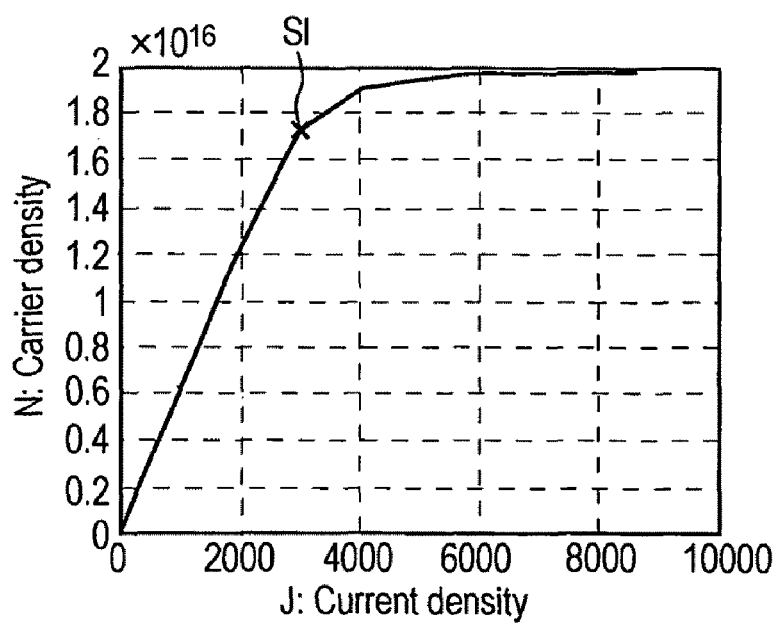
FIG. 8 is a schematic diagram illustrating the relationship between an injected carrier density and a carrier density.

Next, the result in which the relationship between the injected carrier density J and the photon density S is calculated on the basis of the rate equation of equation (2) is shown in the graph of FIG. 7, and the result in which the relationship between the injected carrier density J and the carrier density N is calculated is shown in the graph of FIG. 8.

Incidentally, these calculation results are obtained by setting that the confinement coefficient $\Gamma=0.3$, the photon lifetime $\tau_{ph}=1e^{-12}$ [s], the carrier lifetime $\tau_s=1e^{-9}$ [s], the natural emission coupling coefficient Cs=0.03, the active layer thickness d=0.1 [μm], the elementary charge q=1.6e$^{-19}$ [C], and the area Ag=3e$^{-16}$ [cm$^2$].

As shown in FIG. 8, a typical semiconductor laser starts emitting light at a before-saturation point S1 a little before a state in which the carrier density N is saturated on the basis of an increase in the injected carrier density J (that is, the laser driving signal SD).

Furthermore, as shown in FIG. 7, the semiconductor laser increases the photon density S (that is, the light intensity) with an increase in the injected carrier density J. In addition, as shown in FIG. 9 corresponding to FIG. 7, it can be seen that the semiconductor laser further increases the photon density S with a further increase in the injected carrier density J.

Figure 9:
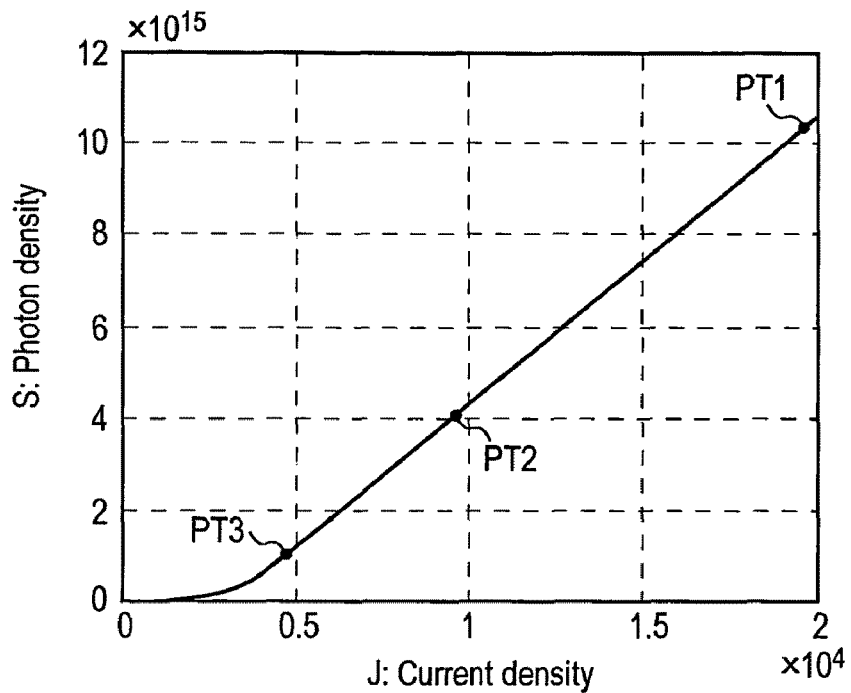
FIG. 9 is a schematic diagram illustrating the relationship between an injected carrier density and a photon density.

Next, in a characteristic curve shown in FIG. 9, a point PT1 whose injected carrier density J is comparatively large, and points PT2 and PT3 whose injected carrier densities J are successively lower than that of the point PT1 are selected.

Figure 10:
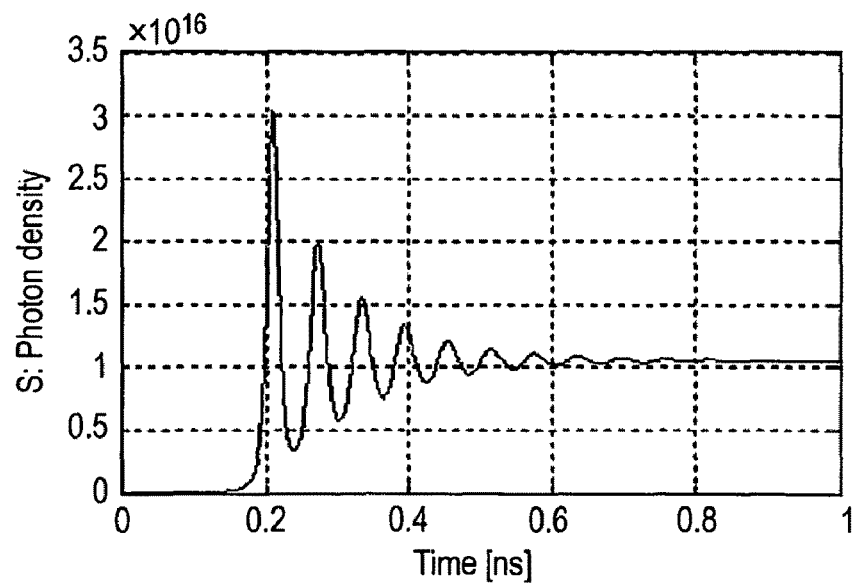
FIG. 10 is a schematic diagram illustrating a photon density at PT1.
Figure 11:
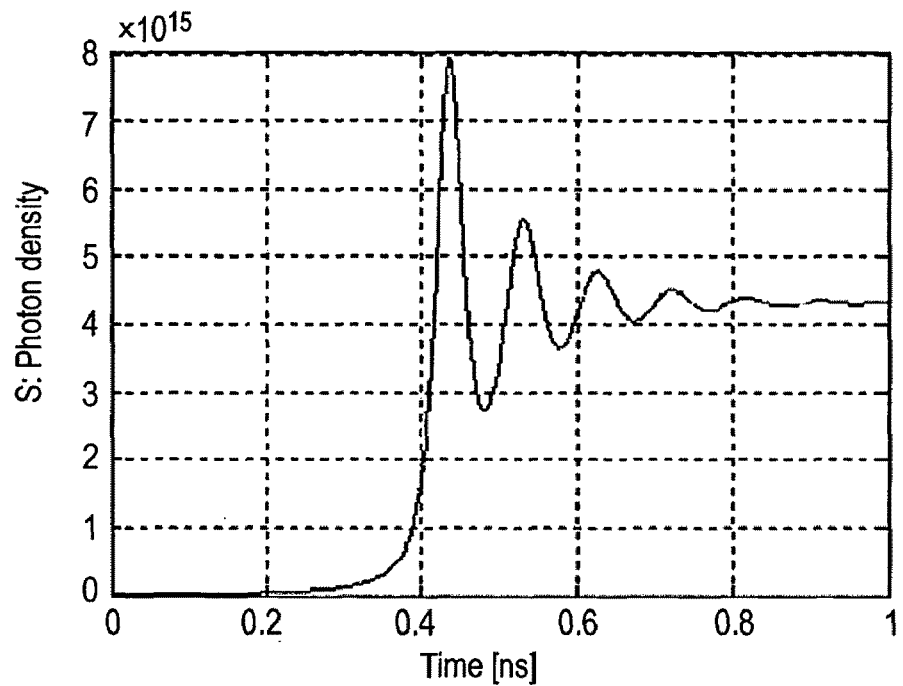
FIG. 11 is a schematic diagram illustrating a photon density at PT2.
Figure 12:
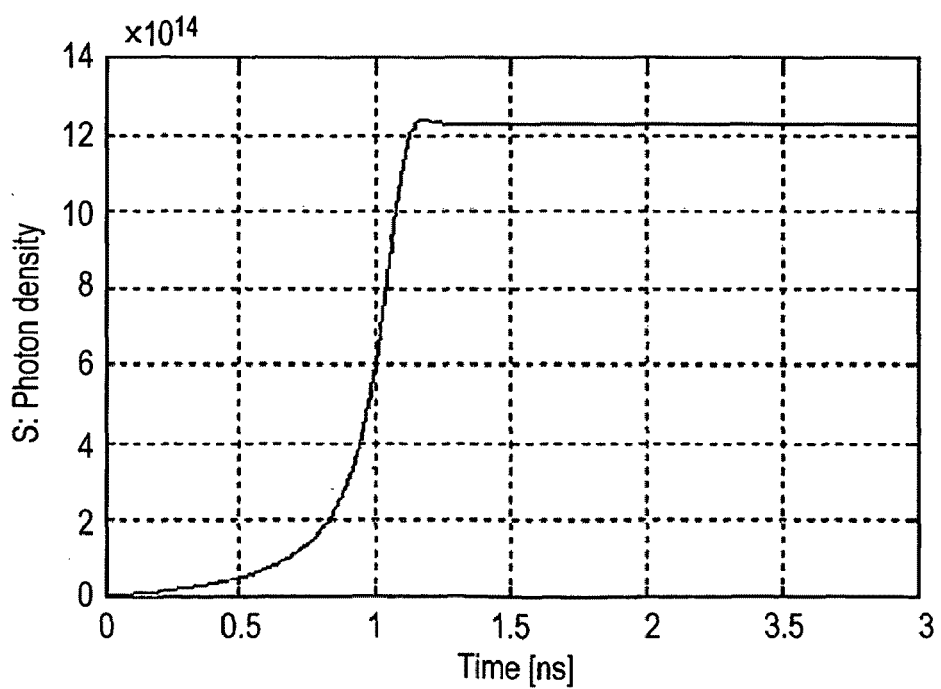
FIG. 12 is a schematic diagram illustrating a photon density at PT3.

Then, the results in which a state in which the photon density S is changed from when the application of the laser driving signal SD is started at the points PT1, PT2, and PT3 is calculated are shown in FIGS. 10, 11 and 12, respectively. Incidentally, the magnitude of the injected carrier density J corresponds to the magnitude of the laser driving signal SD supplied to the semiconductor laser, and also the magnitude of the photon density S corresponds to the magnitude of the light intensity.

As shown in FIG. 10, at the point PT1, it is confirmed that the photon density S greatly oscillates by so-called relaxation oscillation, the amplitude thereof is increased, and the oscillation period ta, which is the period of the amplitude (that is, from the minimal value to the minimal value), is approximately 60 [ps]. Furthermore, regarding the values of the photon density S, the amplitude of a first wave that appears immediately after the light emission starts is largest, and is gradually attenuated with a second wave and a third wave, and becomes stable in a short time.

The maximum value of the first wave at the photon density S at this point PT1 is approximately $3 \times 10^{16}$, which is approximately three times as high as the stable value (approximately $1 \times 10^{16}$), which is a value at which the photon density S is stabilized.

Here, if the time from when the laser driving signal SD is started to be applied until the light emission starts is denoted as a light-emission start time period $\tau d$, the light-emission start time period $\tau d$ can be calculated on the basis of the rate equation shown in equation (2).

That is, if the photon density S=0 before oscillation, the equation at the upper side in equation (2) can be represented as in equation (3) shown below.

$$\frac{dN}{dt} = \frac{N}{\tau_s} + \frac{J}{dq} \quad (3)$$

Here, if the carrier density N is denoted as a threshold value $N_{th}$, the light-emission start time period $\tau d$ can be represented as in equation (4) shown below.

$$\tau d = \tau_s N_{th} \frac{J_{th}}{J} \quad (4)$$

where $$J_{th} = \frac{dq}{\tau_s} N_{th}$$

As described above, it can be seen that the light-emission start time period τd is inversely proportional to the injected carrier density J.

As shown in FIG. 10, at the point PT1, the light-emission start time period τd is calculated as approximately 200 [ps] on the basis of equation (4). At this point PT1, since a laser driving signal SD having a large voltage value is applied to the semiconductor laser, the light-emission start time period τd from when the laser driving signal SD is started to be applied until light emission is started is decreased.

As shown in FIG. 11, at the point PT2 where the value of the laser driving signal SD is smaller than that at the point PT1, although clear relaxation oscillation has occurred, the amplitude of the oscillation is smaller than that at the point PT1, and the oscillation period ta is increased to approximately 100 [ps].

Furthermore, in the case of the point PT2, the light-emission start time period τd calculated on the basis of equation (4) is approximately 400 [ps], which is larger than that at the point PT1. At this point PT2, the maximum value of the first wave at the photon density S is approximately $8 \times 10^{15}$, which is approximately two times as high as the stable value (approximately $4 \times 10^{15}$).

As shown in FIG. 12, at the point PT3 at which the value of the supplied laser driving signal SD is further smaller than that at the point PT2, relaxation oscillation is scarcely seen. Furthermore, in the case of the point PT3, it is confirmed that the light-emission start time period τd calculated on the basis of equation (4) is approximately 1 [ns], which is comparatively long. The maximum value at the photon density S of this point PT3 is approximately the same, and is approximately $1.2 \times 10^{15}$.

By the way, in a typical laser light source, the laser driving signal SD of a comparatively low voltage at which relaxation oscillation is scarcely seen as at the point PT3 is applied to the semiconductor laser. That is, a typical laser light source is configured in such a manner that by minimizing the variation width of the light intensity immediately after laser light is started to be emitted, the output of laser light LL is stabilized.

In the following, in the short pulse light source device 1, an operation mode in which, by supplying the laser driving signal SD formed at a comparatively low voltage to the semiconductor laser 3, laser light LL of stabilized light intensity without causing relaxation oscillation to occur will be referred to as a normal mode. Furthermore, the voltage of the laser driving signal SD to be supplied to the semiconductor laser 3 in this normal mode is referred to as a normal voltage VN, and the laser light LL output from the semiconductor laser 3 is referred to as normal output light LN.

In addition to this, the short pulse light source device 1 according to the present embodiment has an operation mode (hereinafter this will be referred to as a relaxation oscillation mode) in which, as a result of the laser driving signal SD having a comparatively high voltage being supplied as in the case of the points PT1 and PT2, relaxation oscillation is caused to occur in light intensity characteristics.

In the case of this relaxation oscillation mode, in the short pulse light source device 1, the voltage V (hereinafter this will be referred to as an oscillation voltage VB) of the laser driving signal SD is increased to higher than the normal voltage VN (for example, 1.5 times or more times as high). As a result, it is possible for the short pulse light source device 1 to increase the maximum value of the instantaneous light intensity LT of the laser light to more than in the case of the normal mode.

That is, in a case where the short pulse light source device 1 operates in the relaxation oscillation mode, it is possible for the short pulse light source device 1 to emit laser light LL at a large light intensity appropriate for the oscillation voltage VB by supplying a comparatively high oscillation voltage VB to the semiconductor laser 3.

When this is viewed from another perspective, as a result of the laser driving signal SD of a oscillation voltage VB being applied, it is possible for the semiconductor laser 3 to greatly increase the light intensity of the laser light LL when compared to the related art in which the normal voltage VN is applied.

For example, in the semiconductor laser, at the point PT1, the photon density S by the first wave of the relaxation oscillation is approximately $3 \times 10^{16}$. When compared to the case of the point PT3 indicating a case in which the normal voltage VN is applied (approximately $1.2 \times 10^{15}$), it is possible to increase the light intensity of the semiconductor laser 3 by 20 times or more.

Figure 13:
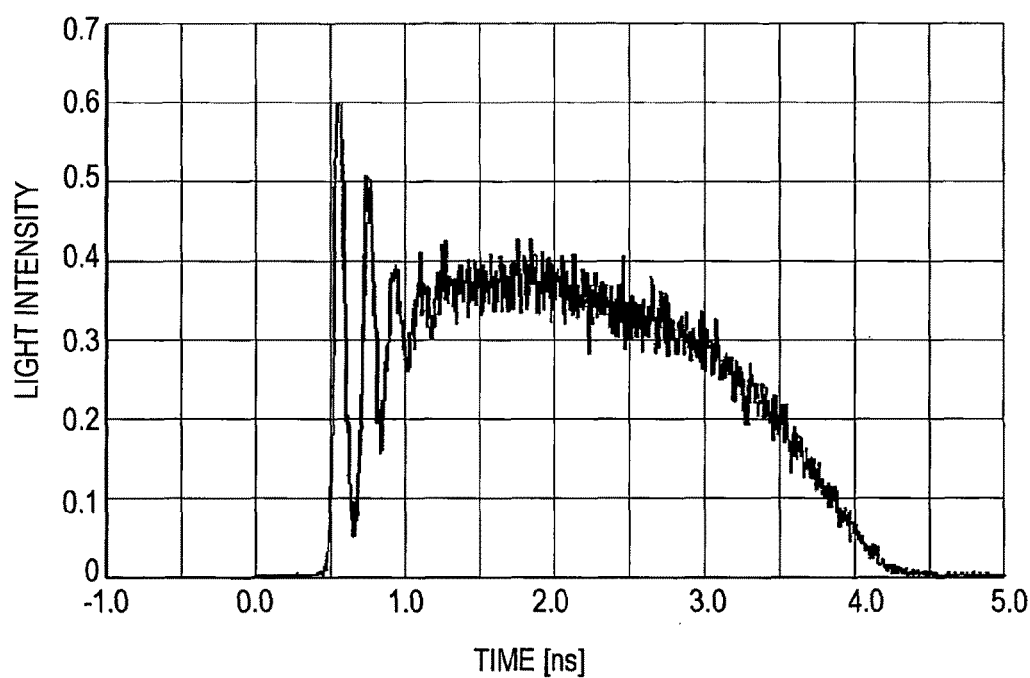
FIG. 13 is a schematic diagram showing an actual light-emission waveform.

In practice, the waveform of light intensity characteristics measured when a laser driving signal SD of a comparatively high voltage is applied to a typical semiconductor laser (manufactured by Sony Corporation, SLD3233VF) is shown in FIG. 13. Meanwhile, FIG. 13 shows the waveform of the light intensity characteristics of the laser light LL obtained resultantly by supplying a laser driving signal SD in a rectangular pulse shape to a semiconductor laser.

It is confirmed from this FIG. 13 that the relaxation oscillation seen as the calculation result of the photon density S in FIGS. 10 and 11 also occurs as a change in the actual light intensity.

Here, the relationship between the laser driving signal SD to be supplied to the semiconductor laser 3 and the light intensity of the laser light LL will be discussed in detail.

Figure 14:
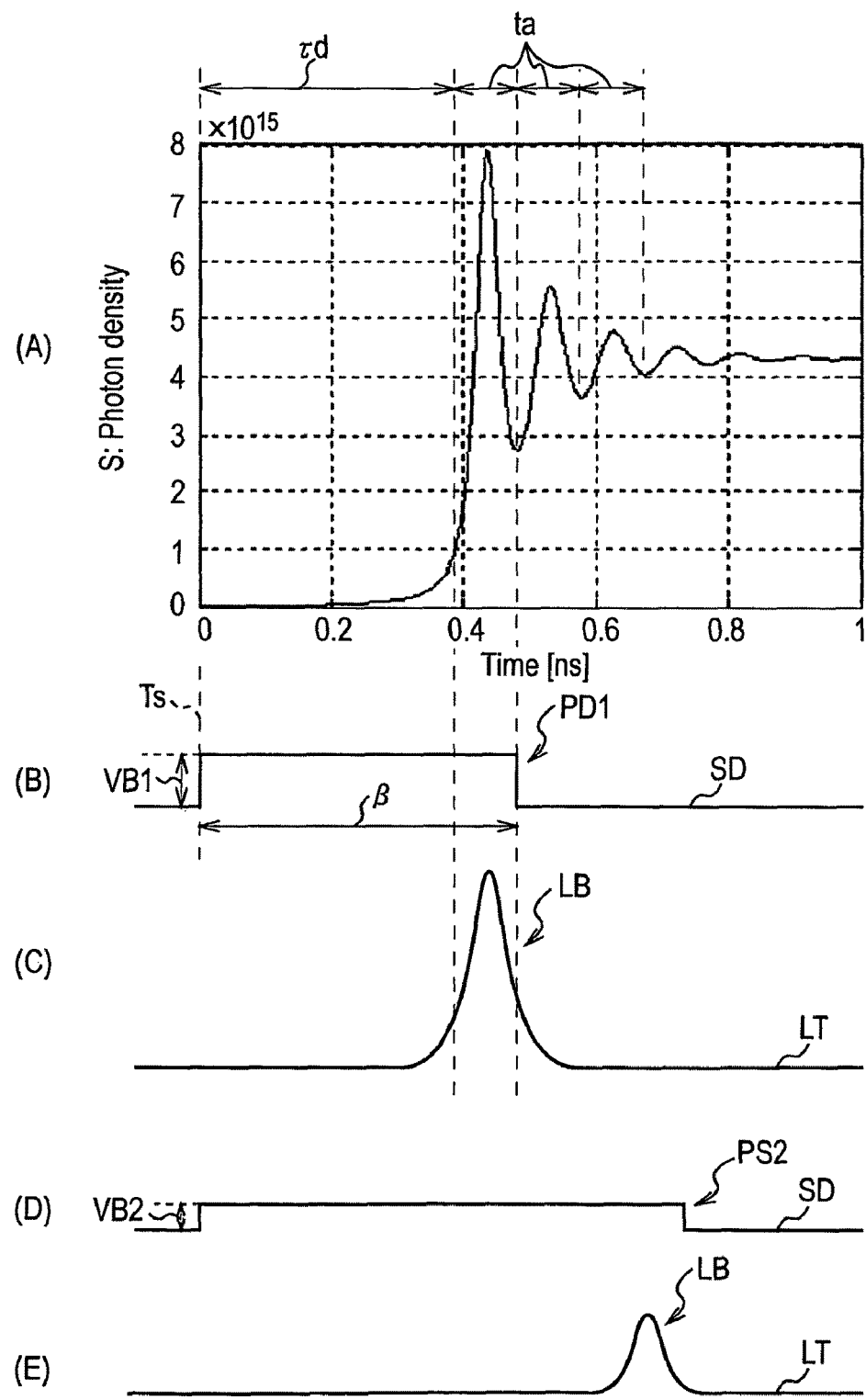
FIG. 14 is a schematic diagram showing the relationship between a driving signal and a light intensity.

FIG. 14(A) shows a state of change in the photon density S over time similarly to FIG. 11. For example, as shown in FIG. 14(B), the laser control unit 2 of the short pulse light source device 1 supplies, to the semiconductor laser 3, a laser driving signal SD in a pulse shape, which is formed at a oscillation voltage VB1 sufficient to cause relaxation oscillation to occur.

At this time, the laser control unit 2 forms the laser driving signal SD into a pulse signal in a rectangular shape by raising it from a low level to a high level over a time (that is, τd+ta, hereinafter this will be referred to as a supply time τPD) in which the oscillation period ta of the relaxation oscillation is added to the light-emission start time period τd.

Meanwhile, for the convenience of description, a portion of the laser driving signal SD, which rises in a pulsed manner, will be referred to as a driving pulse PD1.

As a result, as shown in FIG. 14(C), it is possible for the semiconductor laser 3 to emit laser light LL (hereinafter this will be referred to as oscillation output light LB) in a pulse shape, which corresponds to only the first wave portion in the relaxation oscillation.

At this time, since the laser control unit 2 supplies the driving pulse PD formed in a pulse shape, the laser control unit 2 can comparatively minimize the application time period of a high oscillation voltage VB. Thus, the average consumption of electric power of the semiconductor laser 3 can be decreased, and problems and damage of the semiconductor laser 3 due to over heat generation can be prevented.

On the other hand, as shown in FIG. 14(D), the laser control unit 2 is also configured to be capable of supplying, to the semiconductor laser 3, a driving pulse PD2, which is at a high voltage to such a degree as to be capable of causing relaxation oscillation to occur and formed at an oscillation voltage VB2 lower than the oscillation voltage VB1.

In this case, as shown in FIG. 14(E), it is possible for the semiconductor laser 3 to emit oscillation output light LB having a light intensity lower than the case in which the driving pulse PD1 is supplied.

As described above, the short pulse light source device 1 is configured in such a manner as to be capable of operating in the relaxation oscillation mode in which a driving pulse PD (that is, a driving pulse PD1 or PD2) at a comparatively high oscillation voltage VB is supplied from the laser control unit 2 to the semiconductor laser 3. At this time, the short pulse light source device 1 is configured in such a manner as to be capable of emitting oscillation output light LB whose light intensity changes in a pulsed manner due to relaxation oscillation.

[2-3. Pulse Output of Laser Light in Specific Mode]

Furthermore, in addition to the normal mode and the relaxation oscillation mode, the short pulse light source device 1 is also configured in such a manner as to be capable of operating in a specific mode in which a driving pulse PD at a specific voltage VE higher than the oscillation voltage VB supplied to the semiconductor laser 3.

At this time, the short pulse light source device 1 is configured in such a manner as to be capable of pulse-outputting laser light LL at a light intensity further higher than the oscillation output light LB from the semiconductor laser 3.

[2-3-1. Configuration of Optical Measurement Device]

Here, an experiment was performed in which the light intensity of the laser light LL in a case where the voltage V of the driving pulse PD in the short pulse light source device 1 is changed is measured by using an optical measurement device 11 (FIG. 15) that measures and analyzes the laser light LL emitted from the short pulse light source device 1.

The optical measurement device 11 causes the laser light LL to be emitted from the semiconductor laser 3 of the short pulse light source device 1, and causes this light to enter the collimator lens 12.

Then, the optical measurement device 11 causes the collimator lens 12 to convert the laser light LL from divergent light into parallel light so as to enter the condensing lens 15, and also causes the condensing lens 15 to collect light.

After that, the optical measurement device 11 supplies the laser light LL to a light sample oscilloscope 16 (manufactured by Hamamatsu Photonics K.K., C8188-01), so that the light intensity of the laser light LL is measured, and the changes over time are shown as light intensity characteristics UT (to be described later).

Furthermore, the optical measurement device 11 supplies the laser light LL to a light spectrum analyzer 17 (manufactured by ADC Corporation, Q8341), so that the wavelength of the laser light LL is analyzed, and the distribution characteristics thereof are shown as wavelength characteristics UW (to be described later).

Furthermore, in the optical measurement device 11, a power meter 14 (manufactured by ADC Corporation, Q8230) is disposed between the collimator lens 12 and the condensing lens 15, and the power meter 14 measures the light intensity LT of the laser light LL.

In addition, the optical measurement device 11 is also configured in such a manner that a BPF (Band Pass Filter) 13 can be disposed between the collimator lens 12 and the condensing lens 15 as necessary. This BPF 13 makes it possible to reduce the transmittance of specific wavelength components in the laser light LL.

[2-3-2. Relationship Between Set Pulse and Driving Pulse]

By the way, in the short pulse light source device 1, since the pulse signal SL, the laser driving signal SD, and the like that are generated in practice are so-called high frequency signals, their respective waveforms are expected to become so-called "corrupt" waveforms, which are deformed from ideal rectangular waves.

Figure 16:
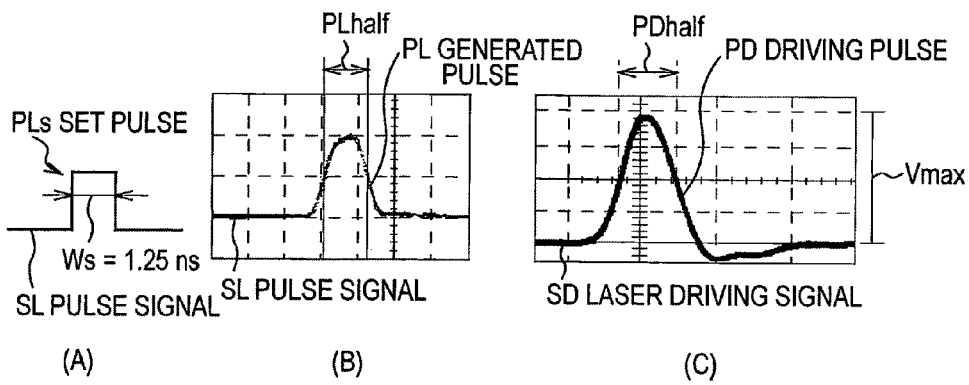
FIG. 16 is a schematic diagram showing the shapes of each of pulses.

Accordingly, as shown in FIG. 16(A), setting is performed on the pulse signal generation unit 4 so as to output a pulse signal SL containing a set pulse PLs in a rectangular shape, whose pulse width Ws is 1.25 [ns]. When this pulse signal SL was measured by a predetermined measurement device, the measurement results shown in FIG. 16 are obtained.

In the pulse signal SL of FIG. 16(B), A generated pulse half value width PLhalf, which is a half value width of a pulse (hereinafter this will be referred to as a generated pulse PL) that is generated in such a manner as to correspond to a set pulse PLs, was approximately 1.5 [ns].

Furthermore, in the case that the above-mentioned pulse signal SL was supplied from the pulse signal generation unit 4 to the driving circuit 6, when the laser driving signal SD that was supplied in practice from the driving circuit 6 to the semiconductor laser 3 was measured in a similar manner, the measurement results shown in FIG. 16(C) were obtained.

In this laser driving signal SD, a driving pulse half value width PDhalf, which is the half value width of the pulse (that is, the driving pulse PD) that appears in such a manner as to correspond to the generated pulse PL changed in the range of approximately 1.5 [ns] to approximately 1.7 [ns] in response to the signal level of the generated pulse PL.

Figure 17:
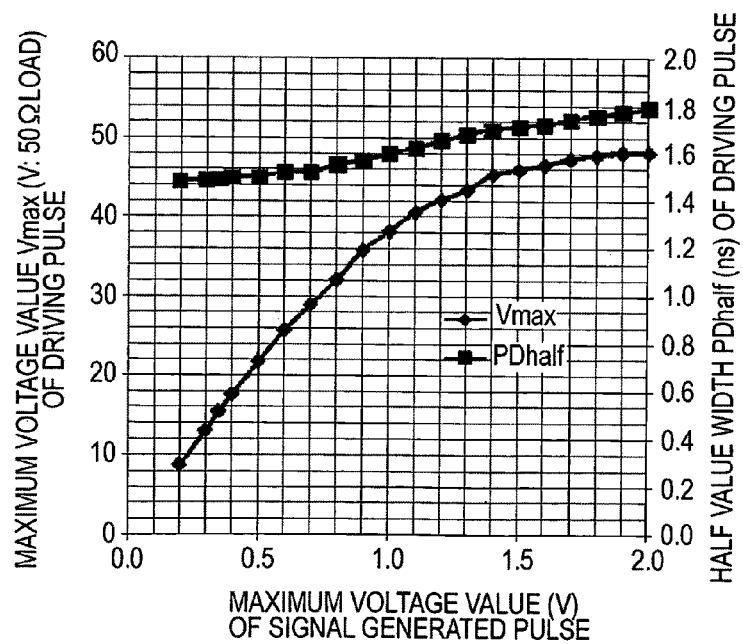
FIG. 17 is a schematic diagram showing the relationship between a pulse signal and a driving pulse.

The relationship of the maximum voltage value of the generated pulse PL with respect to the driving pulse half value width PDhalf in the driving pulse PD at this time, and the relationship of the maximum voltage value Vmax of the driving pulse PD with respect to the maximum voltage value of the generated pulse PL are shown in FIG. 17 in an overlapping manner.

It can be seen from this FIG. 17 that, as the maximum voltage value of the generated pulse PL supplied to the driving circuit 6 is increased, the maximum voltage value Vmax of the driving pulse PD in the laser driving signal SD output from the driving circuit 6 is also increased.

Furthermore, it can be seen from FIG. 17 that, as the maximum voltage value of the generated pulse PL supplied to the driving circuit 6 is increased, the driving pulse half value width PDhalf of the driving pulse PD is also gradually increased.

In other words, even when the short pulse light source device 1 sets the set pulse PLs at a fixed pulse width to the pulse signal generation unit 4, by changing the maximum voltage value of the generated pulse PL to be supplied to the driving circuit 6, it is possible to change the pulse width and the voltage value of the driving pulse PD in the laser driving signal SD output from the driving circuit 6.

[2-3-3. Relationship Between Voltage of Driving Pulse and Laser Light to be Output]

Figure 15:
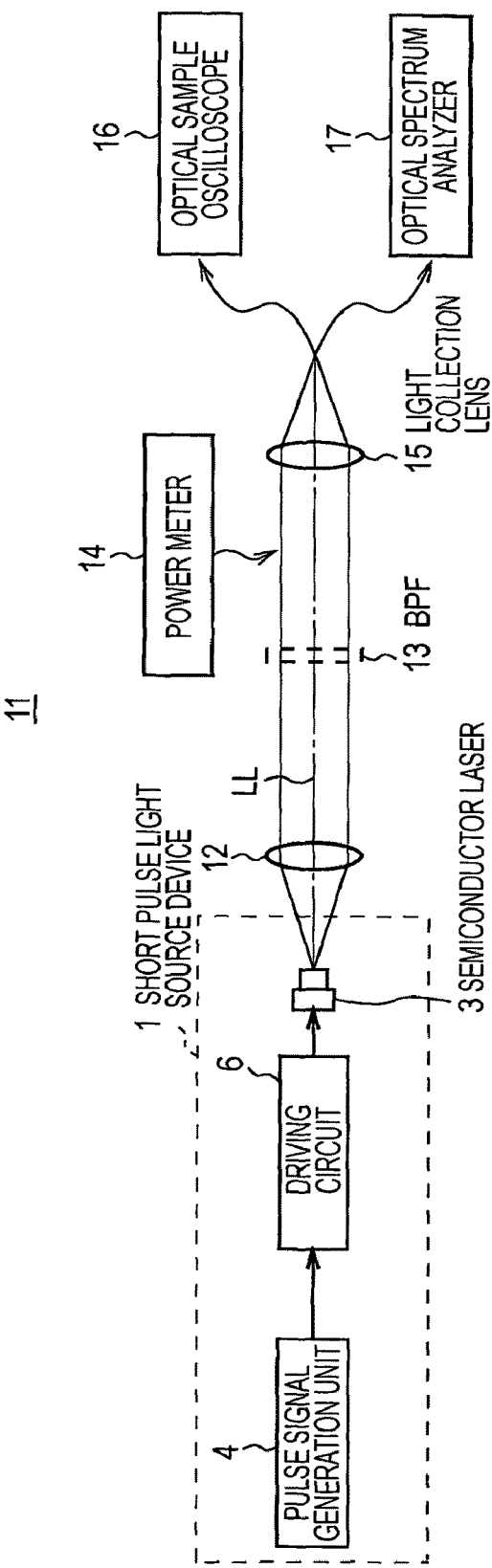
FIG. 15 is a schematic diagram showing the configuration of an optical measurement device.

Accordingly, regarding each of cases in which the maximum voltage value Vmax of the driving pulse PD is set to various values, the light intensity of the laser light LL output from the semiconductor laser 3 in response to the driving pulse PD was measured by using the light sample oscilloscope 16 of the optical measurement device 11 (FIG. 15).

Figure 18:
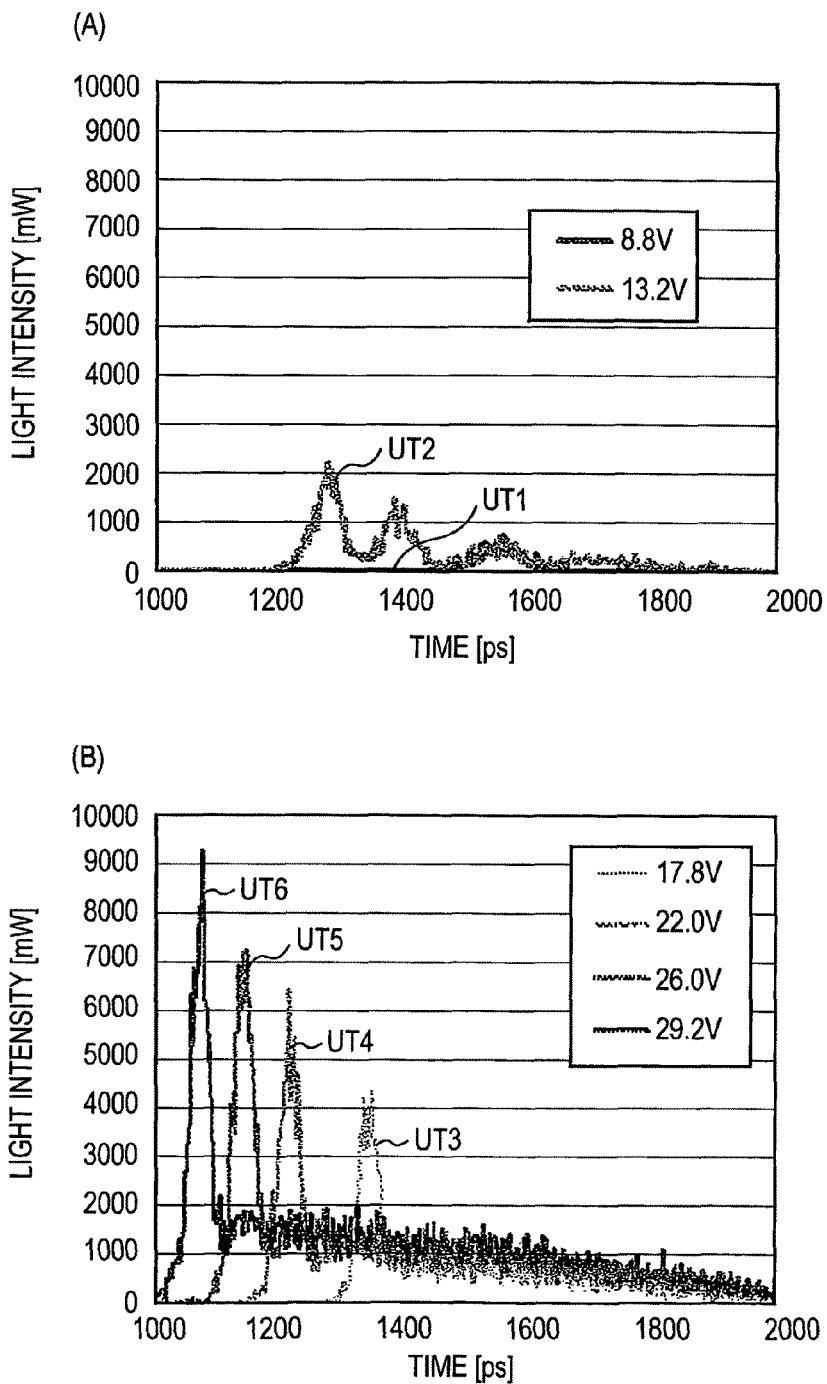
FIG. 18 is a schematic diagram showing light intensity characteristics when the voltage of a driving pulse is changed.
Figure 21:
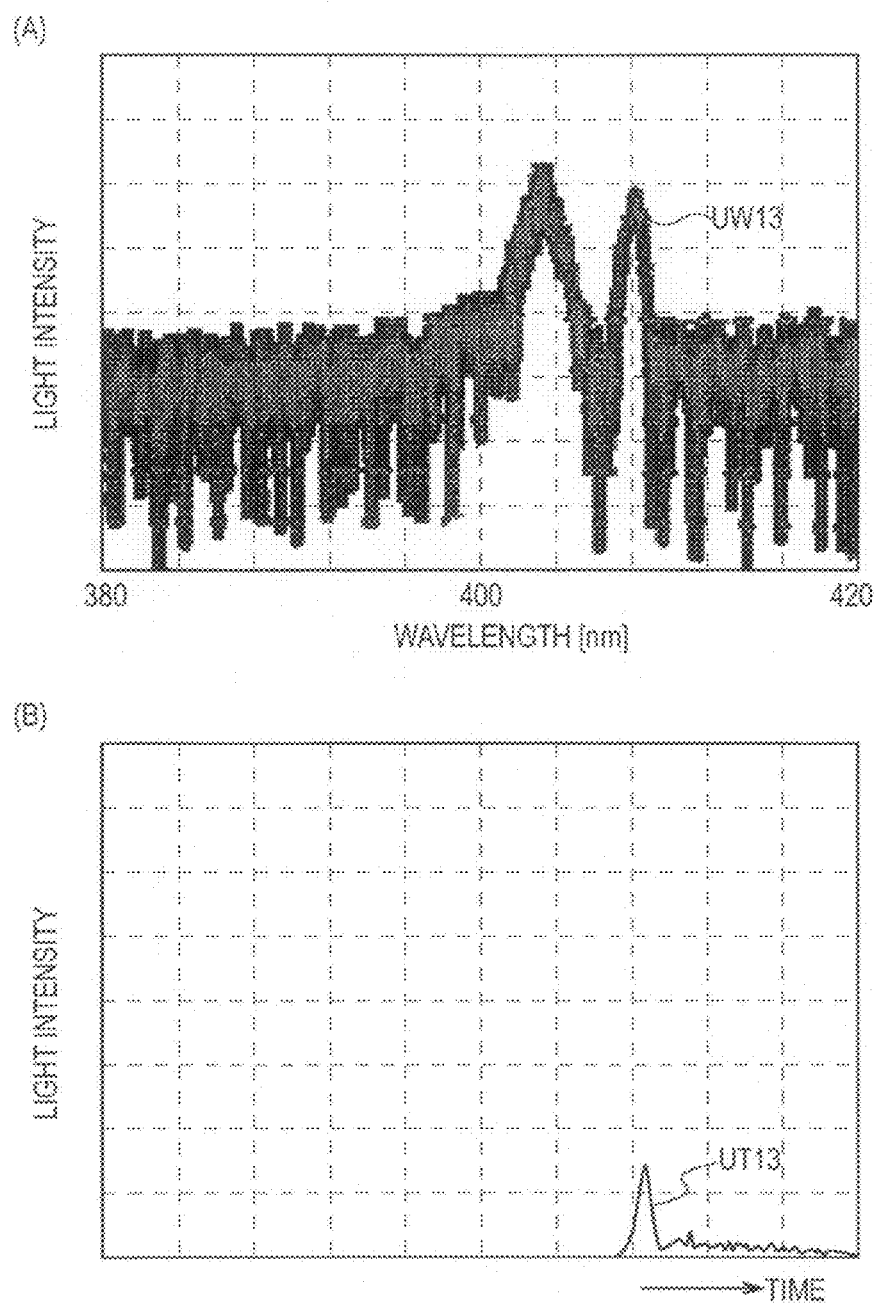
FIG. 21 is a schematic diagram showing wavelength characteristics and light intensity characteristics when the voltage of a driving pulse is 15.6 [V].

FIGS. 18(A) and 18(B) show the results of this measurement. Meanwhile, in FIG. 18, the time axis (horizontal axis) represents a relative time and does not represent an absolute time. Furthermore, in this measurement, the BPF 13 has not been disposed.

As shown in FIG. 18(A), when the maximum voltage value Vmax of the driving pulse PD is 8.8 [V], in the light intensity characteristics UT1 of the laser light LL, only one comparatively wide small output peak (in the vicinity of time 1550

[ps]) was confirmed, and oscillation by relaxation oscillation was not seen. That is, the light intensity characteristics UT1 show that the short pulse light source device 1 operates in the normal mode and normal output light LN is output from the semiconductor laser 3.

Furthermore, as shown in FIG. 18(A), when the maximum voltage value Vmax of the driving pulse PD is 13.2 [V], in the light intensity characteristics UT2 of the laser light LL, a plurality of peaks by relaxation oscillation were confirmed. That is, the light intensity characteristics UT2 show that the short pulse light source device 1 operates in the relaxation oscillation mode, and oscillation output light LB is output from the semiconductor laser 3.

On the other hand, as shown in FIG. 18(B), when the maximum voltage values Vmax of the driving pulse PD are respectively 17.8 [V], 22.0 [V], 26.0 [V], and 29.2 [V], in the light intensity characteristics UT3, UT4, UT5, and UT6 of the laser light LL, a peak portion that appears as a beginning peak in a comparatively early time and a slope portion that is attenuated moderately thereafter accompanied by minute oscillation were confirmed.

In the light intensity characteristics UT3, UT4, UT5, and UT6, since a large peak does not appear after the beginning peak portion, when compared to the light intensity characteristics UT2 (FIG. 18(A)) by the relaxation oscillation mode having the peaks of the second wave and the third wave following the first wave, the tendency of the waveforms differs clearly.

Incidentally, since the resolution in the light sample oscilloscope 16 of the optical measurement device 11 is approximately 30 [ps] or higher, although not shown in FIG. 18, it was confirmed by the experiment in which a streak camera that was used separately that the peak width (the half value width) of the beginning peak portion is approximately 10 [ps].

As described above, since the resolution in the light sample oscilloscope 16 is low, there is a possibility that the optical measurement device 11 may not necessarily have measured the correct light intensity LT. In this case, the maximum light intensity of the beginning peak portion in FIG. 18 and the like appears as being lower than the actual value.

Next, the laser light LL when the maximum voltage value Vmax of the driving pulse PD is changed will be further analyzed in detail.

Here, by using the optical measurement device 11, the light intensity characteristics UT and the wavelength characteristics UW of the laser light LL that is emitted from the semiconductor laser 3 when the maximum voltage value Vmax of the driving pulse PD is changed were measured by the light sample oscilloscope 16 and the light spectrum analyzer 17, respectively.

FIGS. 19 to 23 each show the results of these measurements. Incidentally, FIG. 19(A) to FIG. 23(A) show the wavelength characteristics UW (that is, the results decomposed for each wavelength) of the laser light LL, which were measured by the light spectrum analyzer 17. Furthermore, FIG. 19(B) to FIG. 23(B), similarly to FIG. 18, show the light intensity characteristics UT (that is, the state of changes over time) of the laser light LL, which were measured by the light sample oscilloscope 16. In these measurements, the BPF 13 has not been disposed.

As shown in FIG. 19(B), when the maximum voltage value Vmax of the driving pulse PD is 8.8 [V], only one peak was confirmed in the light intensity characteristics UT11 waveform of the laser light LL. It may be said that, on the basis of the above, at this time, the short pulse light source device 1 was operating in the normal mode, and the laser light LL is normal output light LN.

Furthermore, as shown in FIG. 19(A), in the wavelength characteristics UW11 at this time, only one peak was confirmed at a wavelength of approximately 404 [nm]. It can be seen on the basis of the above that the wavelength of this laser light LL is approximately 404 [nm].

As shown in FIG. 20(B), when the maximum voltage value Vmax of the driving pulse PD is 13.2 [V], in the light intensity characteristics UT12 of the laser light LL, a plurality of comparatively large peaks were confirmed. It may be said on the basis of the above that, at this time, the short pulse light source device 1 was operating in the relaxation oscillation mode and the laser light LL is oscillation output light LB.

Furthermore, as shown in FIG. 20(A), in the wavelength characteristics UW12 at this time, two peaks were confirmed at wavelengths of approximately 404 [nm] and approximately 407 [nm]. It can be seen on the basis of the above that the wavelengths of this laser light LL are approximately 404 [nm] and approximately 407 [nm].

As shown in FIG. 21(B), when the maximum voltage value Vmax of the driving pulse PD is 15.6 [V], in the light intensity characteristics UT13 of the laser light LL, a beginning peak portion and a slope portion that is attenuated moderately were seen.

At this time, as shown in FIG. 21(A), in the wavelength characteristics UW13, two peaks were confirmed at approximately 404 [nm] and at approximately 408 [nm]. In these wavelength characteristics UW13, it was confirmed that the peak of 406 [nm], which was confirmed in the relaxation oscillation mode, was moved 2 [nm] toward the long wavelength side, and in addition, in the vicinity of 398 [nm], the waveform is slightly bulged.

As shown in FIG. 22(B), when the maximum voltage value Vmax of the driving pulse PD is 17.8 [V], in the light intensity characteristics UT14 of the laser light LL, a beginning peak portion and a slope portion that is attenuated moderately were seen.

Furthermore, as shown in FIG. 22(A), in the wavelength characteristics UW14 at this time, two large peaks were confirmed at approximately 398 [nm] and at approximately 403 [nm]. In the wavelength characteristics UW14, when compared to the wavelength characteristics UW13 (FIG. 21(A)), it was confirmed that the peak of approximately 408 [nm] is very small, and instead, a large peak has been formed at approximately 398 [nm].

As shown in FIG. 23(B), when the maximum voltage value Vmax of the driving pulse PD is 38.4 [V], in the light intensity characteristics UT15 of the laser light LL, a beginning peak portion and a slope portion that is attenuated moderately were clearly seen.

Furthermore, as shown in FIG. 23(A), in the wavelength characteristics UW15 at this time, two peaks were confirmed at approximately 398 [nm] and at approximately 404 [nm]. At the wavelength characteristics UW15, when compared to the wavelength characteristics UW14 (FIG. 22(A)), it was confirmed that the peak of approximately 408 [nm] has been completely lost, and also a clear peak has been formed at approximately 398 [nm].

It was confirmed on the basis of these that as a result of supplying a driving pulse PD of a specific voltage VE (maximum voltage value Vmax) larger than the oscillation voltage VB to the semiconductor laser 3, the short pulse light source device 1 is capable of outputting laser light LL whose waveform and wavelength differ from those of the oscillation output light LB. Furthermore, the light-emission start time period τd of this laser light LL did not match the value obtained using equation (3) obtained from the above-mentioned rate equation.

Here, the wavelength of the laser light LL will be considered. As the maximum voltage value Vmax of the laser light LL increases, the laser light LL is changed from the normal output light LN (FIG. 19) to the oscillation output light LB (FIG. 20), and furthermore the wavelength is changed from the oscillation output light LB.

More specifically, the oscillation output light LB (FIG. 20) has, in the wavelength characteristics UW12 thereof, a peak toward a longer wavelength side by approximately 3 [nm] (3±2 [nm] or less) from the normal output light LN in addition to the peak of a wavelength (±2 [nm] or less from the wavelength of the normal output light LN) that is almost identical to the normal output light LN.

In comparison, the laser light LL shown in FIG. 23 has, in the wavelength characteristics UW15 thereof, a peak toward a shorter wavelength side by approximately 6 [nm] (6±2 [nm] or less) from the normal output light LN) in addition to the peak of the wavelength (±2 [nm] or less from the wavelength of the normal output light LN) that is almost identical to the normal output light LN.

Accordingly, in the following, the laser light LL shown in FIG. 23 will be referred to as specific output light LE, and an operation mode in the short pulse light source device 1, in which the specific output light LE is output from the semiconductor laser 3, will be referred to as a specific mode.

[2-3-4. Wavelength of Laser Light in Specific Mode]

By the way, when the wavelength characteristics UW14 (FIG. 22(A)) when the maximum voltage value Vmax is 17.8 [V] is compared with the wavelength characteristics UW13 (FIG. 21(A)) when the maximum voltage value Vmax is 15.6 [V], the peak on the long wavelength side has been lost, and the peak on the short wavelength side has appeared.

That is, it can be seen in the wavelength characteristics UW that, in the course in which the laser light LL is changed from the oscillation output light LB to the specific output light LE with an increase in the maximum voltage value Vmax, the number of peaks on the long wavelength side is gradually decreased, and instead, the number of peaks on the short wavelength side is increased.

Accordingly, in the following, laser light LL whose peak area on the short wavelength side in the wavelength characteristics UW is greater than or equal to the peak area on the long wavelength side is defined as specific output light LE. Laser light LL whose peak area on the short wavelength side is smaller than or equal to a peak area in the wavelength characteristics UW on the long wavelength side is defined as oscillation output light LB.

Incidentally, in a case where two peaks overlap with each other as shown in FIG. 22, the wavelength on the shorter wavelength side by 6 [nm] from the wavelength of the normal output light LN is defined as the center wavelength on the short wavelength side, and the area in the range of the center wavelength ±3 [nm] is defined as the area of the peak.

Therefore, as a result of this definition, the laser light LL when the maximum voltage value Vmax is 15.6 [V] (FIG. 21) is oscillation output light LB, and the laser light LL when the maximum voltage value Vmax is 17.8 [V] (FIG. 22) is specific output light LE.

Next, in the optical measurement device 11, the short pulse light source device 1 is made to operate in the specific mode, and the light intensity characteristics UT16 and the wavelength characteristics UW16 of the laser light LL (that is, the specific output light LE) were measured. Furthermore, in a state in which the BPF 13 is disposed in the optical measurement device 11 so as to decrease the transmittance at the wavelength 406±5 [nm] in the laser light LL, light intensity characteristics UT17 and wavelength characteristics UW17 were measured in a similar manner.

Figure 24:
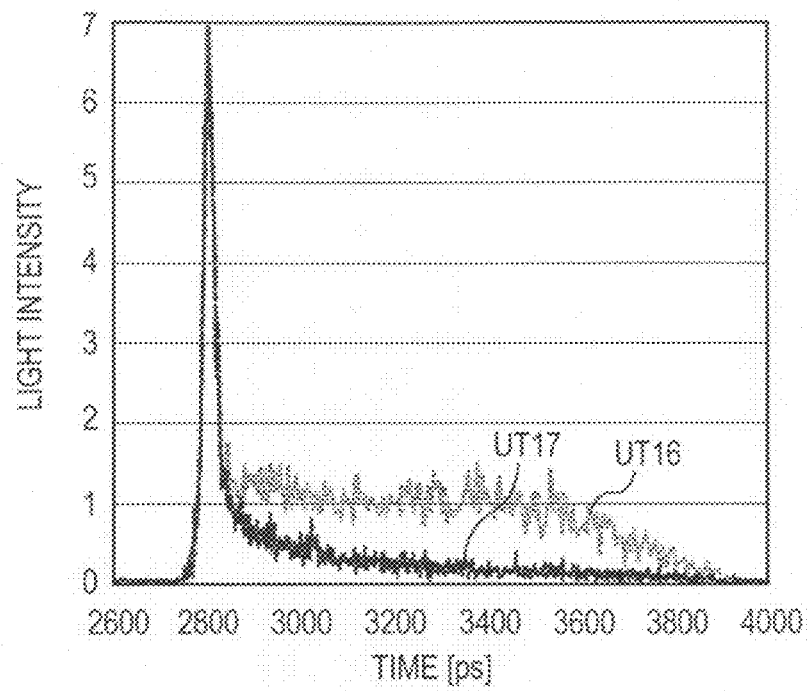
FIG. 24 is a schematic diagram showing differences in light intensity characteristics due to the presence or absence of a BPF.

FIG. 24 shows the light intensity characteristics UT16 and the light intensity characteristics UT17 in an overlapping manner. As can be seen from this FIG. 24, in the light intensity characteristics UT17 when the BPF 13 was disposed, when compared to the light intensity characteristics UT16, whereas the light intensity of the peak portion is almost identical, the light intensity of the slope portion is greatly decreased.

This shows that whereas the emission high intensity is decreased due to the BPF 13 because the wavelength of the slope portion is approximately 404 [nm], the light intensity did not decrease due to the BPF 13 because the wavelength of the peak portion is approximately 398 [nm].

Figure 25:
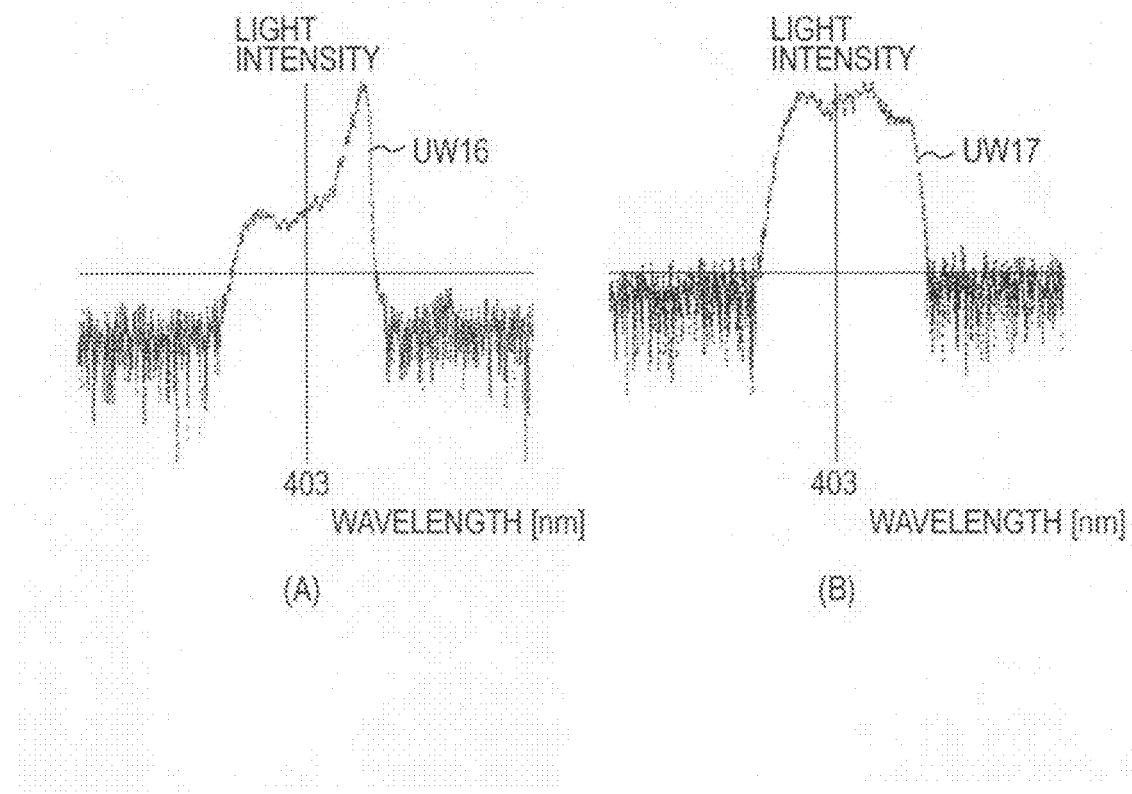
FIG. 25 is a schematic diagram showing differences in wavelength characteristics due to the presence or absence of a BPF.

Furthermore, FIGS. 25(A) and 25(B) show wavelength characteristics UW16 and UW17, respectively. Incidentally, FIG. 25 shows that the wavelength characteristics UW16 and UW17 are each normalized on the basis of the highest light intensity, and the light intensity in the vertical axis is set at a relative value.

In the wavelength characteristics UW16 (FIG. 25(A)), the light intensity at a wavelength of 404 [nm] is higher than the light intensity at a wavelength of 398 [nm] in such a manner as to correspond to the slope portion having a large area in the light intensity characteristics UT16.

On the other hand, in the wavelength characteristics UW17, as the slope portion decreases, the light intensity at a wavelength of 404 [nm] became nearly the same degree as the light intensity at a wavelength of 398 [nm].

Figure 26:
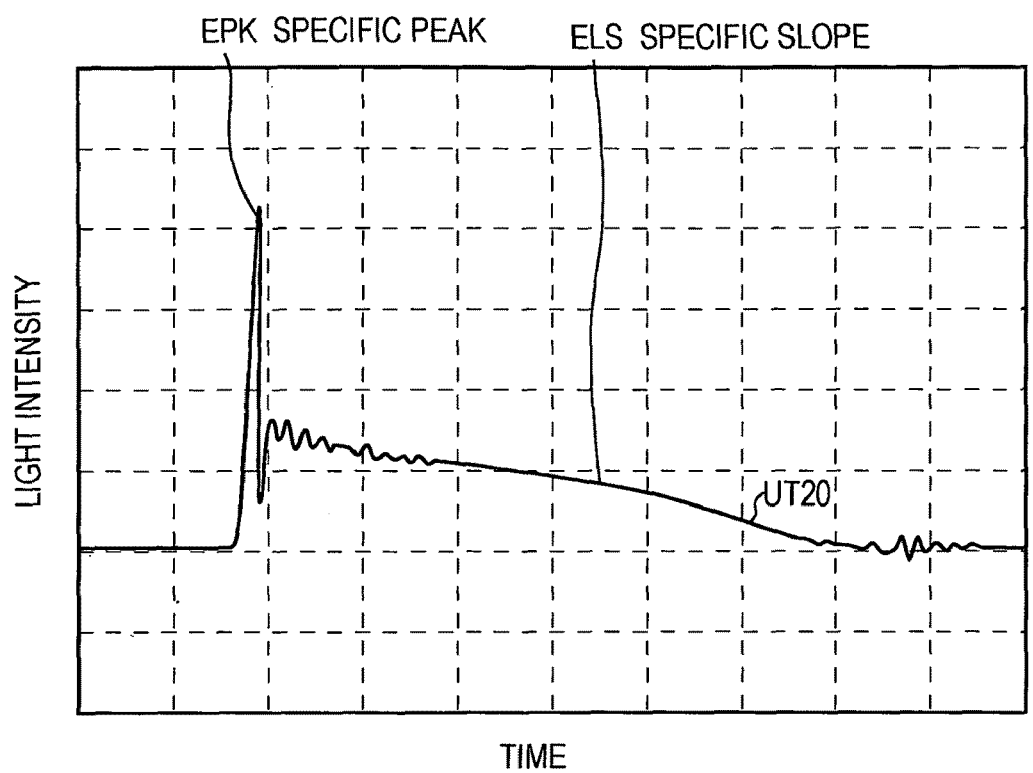
FIG. 26 is a schematic diagram showing light intensity characteristics of specific output light.

This has also proved that, regarding the specific output light LE, the wavelength of the specific slope ESL in the light intensity characteristics UT shown in FIG. 26 is approximately 404 [nm], and the wavelength of the specific peak EPK is approximately 398 [nm], that is, the wavelength of the peak portion is shorter than that of the slope portion.

In other words, the wavelength of the peak portion in the light intensity characteristics UT of the specific output light LE is shifted toward a short wavelength side by approximately 6 [nm] when compared to the case of the normal output light LN. Incidentally, even in the case that another semiconductor laser whose wavelength of the normal output light LN differs was used in another experiment, similar results were obtained.

Furthermore, in the optical measurement device 11, when the specific output light LE was measured by using SLD3233 manufactured by Sony Corporation as the semiconductor laser 3, light intensity characteristics UT20 shown in FIG. 26 were obtained.

At this time, when the light intensity of the peak portion (hereinafter this will be referred to as a specific peak EPK, and a light beam that is output at this time will be referred to as a specific peak light LEP) in the specific output light LE was measured by using the power meter 14, the light intensity was approximately 12 [W]. This light intensity of approximately 12 [W] can be said to be a very large value when compared to the highest light intensity (approximately 1 to 2 [W]) in the oscillation output light LB. Incidentally, in FIG. 26, since the resolution of the light sample oscilloscope 16 is low, this light intensity does not appear.

In addition, it was confirmed on the basis of the result of the analysis using a streak camera (not shown) that, in the light intensity characteristics UT of the specific output light LE, the peak width in the specific peak EPK is approximately 10 [ps], which is smaller than the peak width (approximately 30 [ps]) in the oscillation output light LB. Incidentally, in FIG.

26, since the resolution of the light sample oscilloscope 16 is low, this peak width does not appear.

On the other hand, the wavelength of the slope portion (hereinafter this will be referred to as a specific slope ESL, and a light beam that is output at this time will be referred to as a specific slope light LES) in the light intensity characteristics UT of the specific output light LE is the same as the wavelength of the laser light LL in the normal mode, and the maximum light intensity was approximately 1 to 2 [W].

As described above, the short pulse light source device 1 is able to sequentially emit specific peak light LEP and specific slope light LES as specific output light LE by supplying a laser driving signal SD at a specific voltage VE further higher than the oscillation voltage VB to the semiconductor laser 3.

[2-3-5. Movement of Light-Emission Point in Specific Output Light]

Next, the position of the light-emission point in the case that the specific output light LE is output from the semiconductor laser 3 was investigated.

Figure 27:
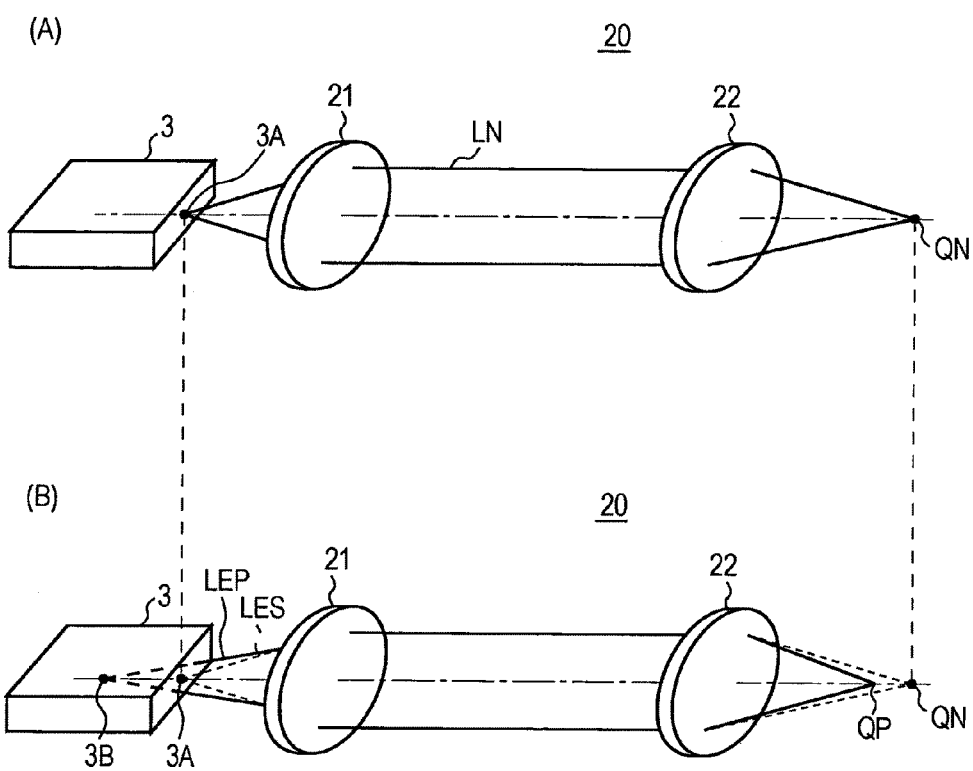
FIG. 27 is a schematic diagram illustrating differences in light-emission points and focal points in normal output light (A) and specific output light (B).

FIG. 27(A) schematically shows an optical system 20 in which the semiconductor laser 3, the collimator lens 21, and the condensing lens 22 are combined. Furthermore, FIG. 27(A) shows a state in which normal output light LN is output from the semiconductor laser 3 in this optical system 20. At this time, the light-emission point of the normal output light LN is positioned on the emission end surface 3A of the semiconductor laser 3 and also, the focal point thereof is connected to a position QN.

Furthermore, FIG. 27(B) corresponding to FIG. 27(A) shows, by the dashed line, a state in which specific slope light LES is output from the semiconductor laser in the optical system 20. At this time, the light-emission point of the specific slope light LES is positioned on an emission end surface 3A of the semiconductor laser 3 similarly to the case of the normal output light LN and also the focal point thereof is connected to the position QN.

In comparison, in a case where specific peak light LEP is output from the semiconductor laser in the optical system 20, as indicated by the solid line in FIG. 27(B), the focal point thereof is connected to a position QP before the position QN. It has been proved on the basis of the above that the light-emission point of the specific peak light LEP is positioned at a point 3B inside the semiconductor laser 3.

Here, when the NA of the collimator lens 21 is set at 0.161 and the NA of the condensing lens 22 is set at 0.837, the position QP at which the focal point of the specific peak light LEP was formed was forward by 0.37 [μm] from the position QN. When the light-emission point of the specific peak light LEP was calculated on the basis of this, the point 3B of the semiconductor laser 3 was at a position 10 [μm] inward from the emission end surface 3A.

As described above, in a case where the semiconductor laser 3 causes the specific output light LE to be output, it has proved that although the emission end surface 3A is used as a light-emission point similarly to the time the normal output light LN is output when the specific slope light LES is to be output, the light-emission point is moved to the point 3B in the inside when the specific peak light LEP is output. Incidentally, the difference in these light-emission point positions is a difference of a virtual light-emission point position containing a deviation of the light-emission point in the actual laser and chromatic aberration of the measurement optical system.

3. First Embodiment

Figure 28:
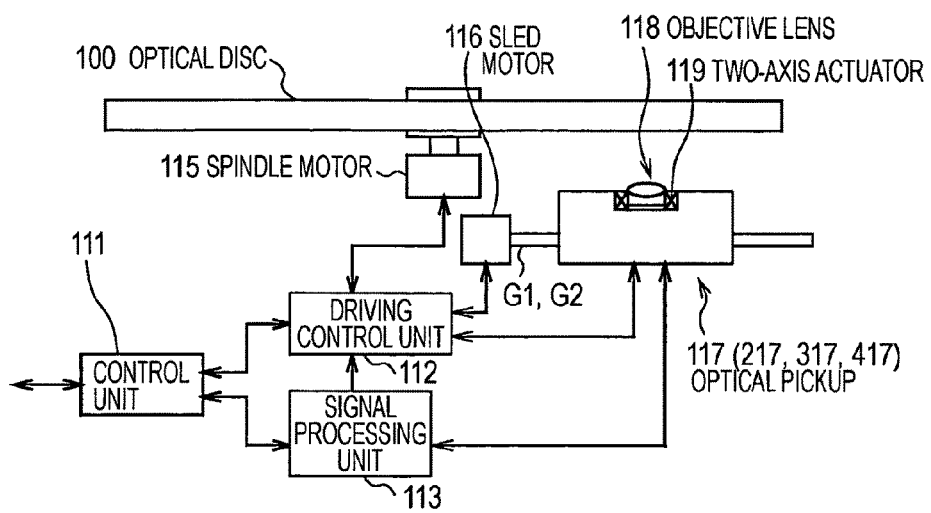
FIG. 28 is a schematic diagram showing the entire configuration of an optical disc apparatus.

Next, a first embodiment will be described. In the present embodiment, an optical disc apparatus 110 shown in FIG. 28 is used to record information on an optical disc 100 on the basis of the above-described information recording reproduction principles and the principles of outputting a light beam by a semiconductor laser, and further to reproduce information from the optical disc 100.

[3-1. Structure of Optical Disc]

Figure 29:
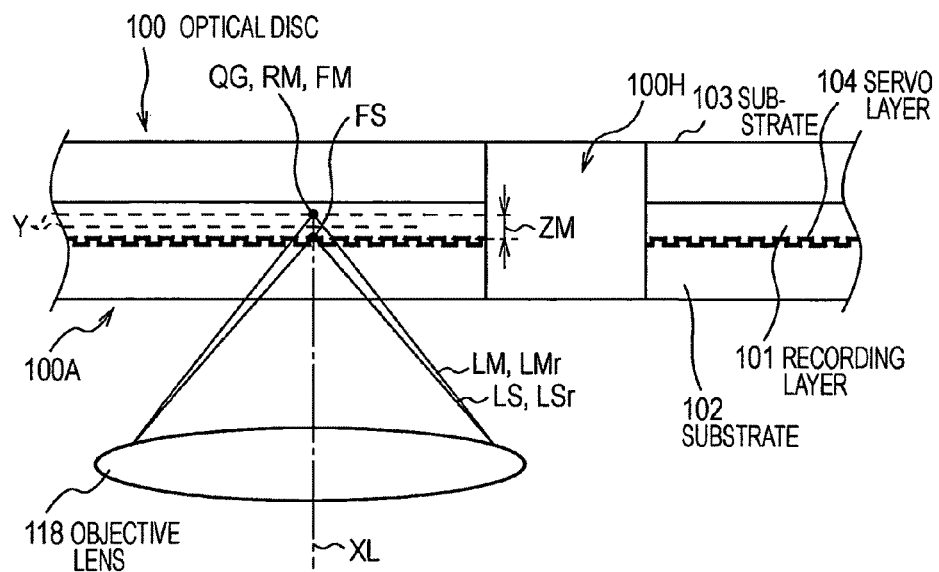
FIG. 29 is a schematic diagram showing the structure of an optical disc.

As a sectional view is shown in FIG. 29, the optical disc 100 is formed in such a manner that information is recorded thereon by irradiation with an information light beam LM corresponding to the laser light LL from the optical disc apparatus 110. Furthermore, the optical disc 100 is also formed in such a manner that the information light beam LM is reflected so as to be formed as an information reflection light beam LMr, and this is detected by the optical disc apparatus 110, thereby reproducing the information.

In practice, the optical disc 100 is formed in nearly a circular plate shape as a whole, and is configured in such a manner that both sides of a recording layer 101 for recording information are sandwiched by substrates 102 and 103.

The optical disc apparatus 110 is configured to collect the information light beam LM emitted from the light source to the inside of the recording layer 101 of the optical disc 100 by an objective lens 118.

The recording layer 101 contains a two-photon absorbing material that absorbs two photons of light of a wavelength of approximately 404 [nm]. This two-photon absorbing material is known to cause two-photon absorption to occur in proportion to the square of the light intensity, and causes two-photon absorption to occur with respect to only the light having a very high light intensity. Meanwhile, examples of this two-photon absorbing material, which can be used, include a hexadiyne compound, a cyanine dye, a merocyanine dye, an oxonol dye, a phthalocyanine dye, and an azo dye.

In the recording layer 101, when the recording layer 101 is irradiated with an information light beam LM at a comparatively strong intensity, for example, a two-photon absorbing material is vaporized by two-photon absorption so as to form air bubbles, with the result that a recording mark RM is recorded at the position of the focal point FM.

At this time, since the recording layer 101 is a two-photon absorbing material, a reaction occurs in proportion to the square of the light intensity. That is, the recording layer 101 absorbs only the information light beam LM having a very high intensity as, for example, in the vicinity of the focal point at which light is collected by a lens so as to cause a reaction to occur, and a reaction hardly occurs by the information light beam LM having a low intensity like at other than the focal point. For this reason, it is possible for the recording layer 101 to maintain the whole transmittance to be high.

Furthermore, in the optical disc 100, a servo layer 104 is provided between the recording layer 101 and the substrate 102. The servo layer 104 is formed with guide grooves for servo. More specifically, tracks in a spiral shape (hereinafter these will be referred to as servo tracks) KS are formed by lands and grooves, which are similar to an ordinary BD-R (Recordable) disc.

An address formed of a serial number for each predetermined recording unit is assigned to the servo track KS, so that a servo track (hereinafter this will be referred to as a target servo track KSG) to which a servo light beam LS (to be described later) should be irradiated when information is to be recorded or reproduced can be identified by the address.

Furthermore, the servo layer 104 has so-called wavelength selectivity. For example, the servo layer 104 is structured to reflect a red light beam of a wavelength of approximately 660 [nm] at a high reflectance, and transmits a blue-violet optical beam of a wavelength of approximately 404 [nm] therethrough at a high transmittance.

The optical disc apparatus 110 irradiates the optical disc 100 with a servo light beam LS at a wavelength of approximately 660 [nm]. At this time, the servo light beam LS is reflected by the servo layer 104 of the optical disc 100 and becomes a servo reflection light beam LSr.

The optical disc apparatus 110 receives the servo reflection light beam LSr, and adjusts the focal point FS of the servo light beam LS to the servo layer 104 by performing position control on the objective lens 118 in a focus direction in which the objective lens 118 comes closer to or is separated from the optical disc 100 on the basis of a photoreceived result.

Furthermore, in the optical disc apparatus 110, the optical axes XL of the servo light beam LS and the information light beam LM are made to nearly match each other. Consequently, the optical disc apparatus 110 positions the focal point FM of the information light beam LM at a place corresponding to the target servo track KSG in the recording layer 101, that is, in a normal line perpendicular to the servo layer 104 extending along the target servo track KSG.

As a result, on the optical disc 100, a recording mark RM is formed at a targeted position (hereinafter this will be referred to as a target position QG) in a normal line passing through the target servo track KSG in the recording layer 101.

Furthermore, the recording mark RM formed in the manner described above is arranged in a planar shape nearly parallel to the irradiation surface 100A of the optical disc 100 and each surface of the servo layer 104 and the like, thereby forming a mark layer Y by the recording mark RM.

On the other hand, when information is to be reproduced from the optical disc 100, the optical disc apparatus 110 collects the information light beam LM from, for example, the irradiation surface 100A side with respect to the target position QG. Here, in a case where a recording mark RM has been formed at the position of the focal point FM (that is, the target position QG), the information light beam LM is reflected by the recording mark RM and becomes an information reflection light beam LMr.

The optical disc apparatus 110 detects the information reflection light beam LMr, generates a detection signal appropriate for the detection result, and detects whether or not a recording mark RM has been formed on the basis of the detection signal.

As described above, in a case where information is to be recorded or reproduced by the optical disc apparatus 110 on or from the optical disc 100, the information light beam LM is irradiated at the target position QG while using together the servo light beam LS by the optical disc apparatus 110.

[3-2. Configuration of Optical Disc Apparatus]

Next, a specific configuration of the optical disc apparatus 110 will be described. As shown in FIG. 28, the optical disc apparatus 110 is configured with a control unit 111 serving as a nucleus. The control unit 111 is constituted by a CPU (Central Processing Unit) (not shown), a ROM (Read Only Memory) in which various programs, and the like are stored, and a RAM (Random Access Memory) used as a work area for the CPU, and the like.

In a case where information is to be recorded on the optical disc 100, the control unit 111 drives a spindle motor 115 to rotate via a driving control unit 112, so that the optical disc 100 placed in a turntable (not shown) is rotated at a desired speed.

Furthermore, the control unit 111 drives a sled motor 116 to rotate via the driving control unit 112, thereby causing the optical pickup 117 to be considerably moved in a tracking direction along the movement axes G1 and G2, that is, in a direction toward the inner or outer radial edge side of the optical disc 100.

The optical pickup 117 has a plurality of optical components such as the objective lens 118, the short pulse light source unit 120, and the like incorporated therein, and is configured to irradiate the optical disc 100 with an information light beam LM and a servo light beam LS (FIG. 29) under the control of the control unit 111.

Furthermore, the optical pickup 117 detects a servo reflection light beam LSr formed by the servo light beam LS being reflected by the optical disc 100, generates a plurality of detection signals based on the detection result, and supplies these signals to the signal processing unit 113.

The signal processing unit 113 generates a focus error signal SFE and a tracking error signal STE by performing a predetermined computation process using the detection signal, and supplies these signals to the driving control unit 112.

Incidentally, the focus error signal SFE is a signal indicating the amount of deviation of the servo light beam LS in the focus direction with respect to the servo layer 104. Furthermore, the tracking error signal STE is a signal indicating the amount of deviation of the servo light beam LS in the tracking direction with respect to the target servo track KS (that is, the target servo track KSG).

On the basis of the focus error signal SFE and the tracking error signal STE, the driving control unit 112 generates a focus driving signal and a tracking driving signal for driving the objective lens 118, and supplies these signals to the two-axis actuator 119 of the optical pickup 117.

On the basis of the focus driving signal and the tracking driving signal, the two-axis actuator 119 of the optical pickup 117 moves the objective lens 118 in the focus direction and in the tracking direction (hereinafter these will be referred to as focus control and tracking control, respectively).

By performing the focus control and the tracking control, the driving control unit 112 causes the focal point FS of the servo light beam LS collected by the objective lens 118 to follow the target servo track KSG of a mark layer Y (hereinafter this will be referred to as a target mark layer YG).

At this time, the control unit 111 supplies recording information supplied from the outside to the signal processing unit 113. The signal processing unit 113 performs a predetermined modulation process on the recording information so as to generate recording data, and supplies it to the laser control unit 2.

The laser control unit 2 emits an information light beam LM formed of specific output light LE on the basis of the recording data, thereby causing a recording mark RM to be formed at the target position QG of the target mark layer YG. Thus, it is possible for the optical disc apparatus 110 to record the information on the optical disc 100.

Furthermore, in a case where information is to be reproduced from the optical disc 100, the optical pickup 117 causes the focal point FS of the servo light beam LS to follow the target servo track KSG similarly to that during recording, and irradiates an information light beam LM whose light intensity is comparatively weak to the target position QG of the target mark layer YG.

At this time, the information light beam LM is reflected at the place at which the recording mark RM has been formed, and becomes an information reflection light beam LMr. The optical pickup 117 detects this information reflection light beam LMr, generates a detection signal based on the detection result, and supplies this signal to the signal processing unit 113.

The signal processing unit 113 performs a predetermined demodulation process, a predetermined decoding process, and the like on the detection signal, thereby restoring the information recorded as the recording mark RM at the target position QG of the target mark layer YG. Thus, it is possible for the optical disc apparatus 110 to reproduce the information from the target position QG on the optical disc 100.

As described above, the optical disc apparatus 110 emits the servo light beam LS and the information light beam LM from the optical pickup 117, and further detects the servo reflection light beam LSr and the information reflection light beam LMr. Consequently, the optical disc apparatus 110 is configured to record and reproduce information on and from the optical disc 100.

[3-3. Configuration of Optical Pickup]

Figure 30:
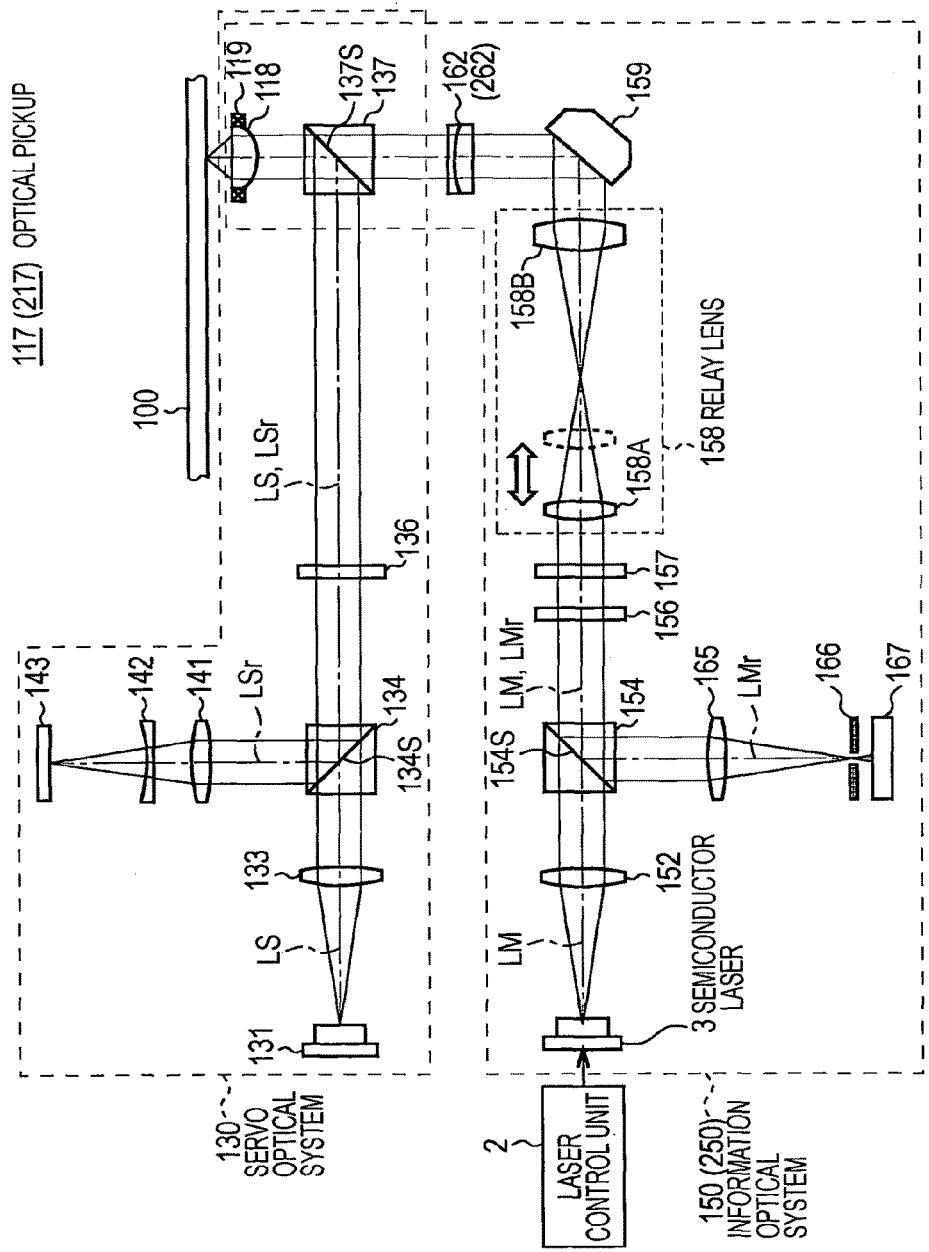
FIG. 30 is a schematic diagram showing the configuration of an optical pickup according to a first embodiment.

Next, the configuration of the optical pickup 117 will be described. As shown in FIG. 30, this optical pickup 117 includes the laser control unit 2, a servo optical system 130 that mainly performs servo control of the objective lens 118, and an information optical system 150 that mainly performs the recording and reproduction of information.

The optical pickup 117 causes the servo light beam LS emitted from the laser diode 131 and the information light beam LM emitted from the semiconductor laser 3 to enter the same objective lens 118 via the servo optical system 130 and the information optical system 150, respectively, and irradiates the optical disc 100 with the beams, respectively.

The laser control unit 2 generates a laser driving signal SD containing a driving pulse PG, and supplies this signal to the semiconductor laser 3.

[3-3-1. Light Path of Servo Light Beam]

Figure 31:
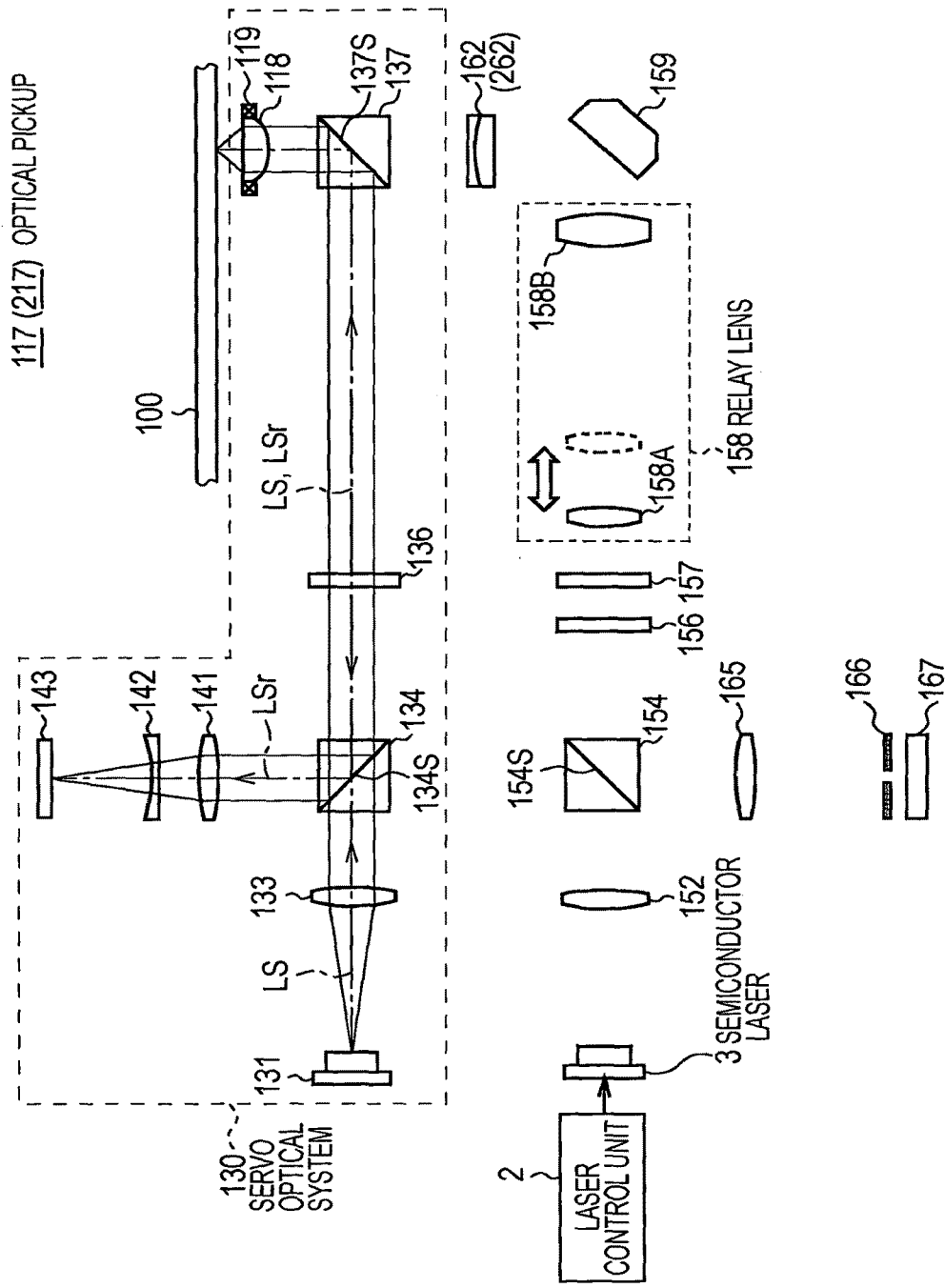
FIG. 31 is a schematic diagram showing a light path of a servo light beam.

As shown in FIG. 31 corresponding to FIG. 30, in the servo optical system 130, the optical disc 100 is irradiated with the servo light beam LS via the objective lens 118, and the servo reflection light beam LSr reflected by the optical disc 100 is received by a photodetector 143.

That is, under the control of the control unit 111 (FIG. 28), the laser diode 131 emits a servo light beam LS formed of divergent light of a wavelength of approximately 660 [nm] and causes the servo light beam LS to enter the collimator lens 133. The collimator lens 133 converts the servo light beam LS from the divergent light to parallel light, and causes the light to enter a polarizing beam splitter 134.

The polarizing beam splitter 134 has a reflectance and a transmittance that are different according to the polarization direction of a light beam. The polarizing beam splitter 134 transmits almost all of the servo light beam LS formed of P polarization therethrough, and causes the light to enter a ¼ wavelength plate 136.

The ¼ wavelength plate 136 converts the servo light beam LS of P polarization (that is, linearly polarized light) into circular polarization (for example, right-handed circularly polarized light), and causes the light to enter a dichroic prism 137.

The dichroic prism 137 is such that the reflectance of a reflection light transmitting surface 137S differs according to the wavelength of a light beam, and refracts a light beam of a wavelength of approximately 660 [nm] and transmits a light beam of a wavelength of approximately 404 [nm] therethrough.

In practice, the dichroic prism 137 reflects the servo light beam LS by the reflection light transmitting surface 137S and causes the servo light beam LS to enter the objective lens 118.

The objective lens 118 collects the servo light beam LS, and irradiates it from the irradiation surface 100A side of the optical disc 100 toward the servo layer 104. At this time, as shown in FIG. 29, the servo light beam LS is transmitted through the substrate 102 and is reflected in the servo layer 104, thereby becoming a servo reflection light beam LSr directed in a direction opposite to the servo light beam LS. Furthermore, the circling direction in the circular polarization of the servo reflection light beam LSr is inverted from the servo light beam LS.

After that, the servo reflection light beam LSr is converted into parallel light by the objective lens 118, and thereafter is made to enter dichroic prism 137. The dichroic prism 137 reflects the servo reflection light beam LSr, and causes this light beam to enter the ¼ wavelength plate 136.

The ¼ wavelength plate 136 converts the servo reflection light beam LSr formed of circularly polarized light into S polarization (that is, linearly polarized light), and causes the light to enter the polarizing beam splitter 134. The polarizing beam splitter 134 reflects the servo reflection light beam LSr of S polarization by the reflection light transmitting surface 134S, and causes the servo reflection light beam LSr to enter a condensing lens 141.

The condensing lens 141 converges the servo reflection light beam LSr, and irradiates it to a photodetector 143 after the servo reflection light beam LSr is made to have astigmatism by a cylindrical lens 142.

The photodetector 143 has a plurality of photo-receiving areas, generates detection signals appropriate for the amount of light of the servo reflection light beam LSr in each photo-receiving area, and sends these detection signals to the signal processing unit 113 (FIG. 28).

Incidentally, in the servo optical system 130, the optical positions of various optical components have been adjusted so that the in-focus state in which the servo light beam LS is collected by the objective lens 118 and is irradiated to the servo layer 104 of the optical disc 100 is reflected on an in-focus state in which the servo reflection light beam LSr is collected by the condensing lens 141 and is irradiated to the photodetector 143.

On the basis of the so-called astigmatism method, the signal processing unit 113 calculates a focus error signal SFE indicating the amount of deviation between the focal point FS of the servo light beam LS and the servo layer 104 of the optical disc 100, and supplies the focus error signal SFE to the driving control unit 112.

Furthermore, on the basis of the so-called push-pull method, the signal processing unit 113 calculates a tracking error signal STE indicating the amount of deviation between the focal point FS and the target servo track KSG in the servo layer 104 of the optical disc 100, and supplies the tracking error signal STE to the driving control unit 112.

On the basis of the focus error signal SFE, the driving control unit 112 generates a focus driving signal and supplies the focus driving signal to the two-axis actuator 119. Thus, the driving control unit 112 performs feedback control (that is, focus control) of the objective lens 118 so that the servo light beam LS is focused to the servo layer 104 of the optical disc 100.

Furthermore, on the basis of the tracking error signal STE, the driving control unit 112 generates a tracking driving signal, and supplies the tracking driving signal to the two-axis actuator 119. Thus, the driving control unit 112 performs feedback control (that is, tracking control) of the objective lens 118 so that the servo light beam LS is focused to the target servo track KSG in the servo layer 104 of the optical disc 100.

As described above, the servo optical system 130 irradiates the servo layer 104 of the optical disc 100 with the servo light beam LS, and supplies the photoreceived result of the servo reflection light beam LSr, which is reflection light thereof, to the signal processing unit 113. In response to this, the driving control unit 112 performs focus control and tracking control of the objective lens 118 so that the servo light beam LS is focused to the target servo track KSG of the servo layer 104.

[3-3-2. Light Path of Information Light Beam]

Figure 32:
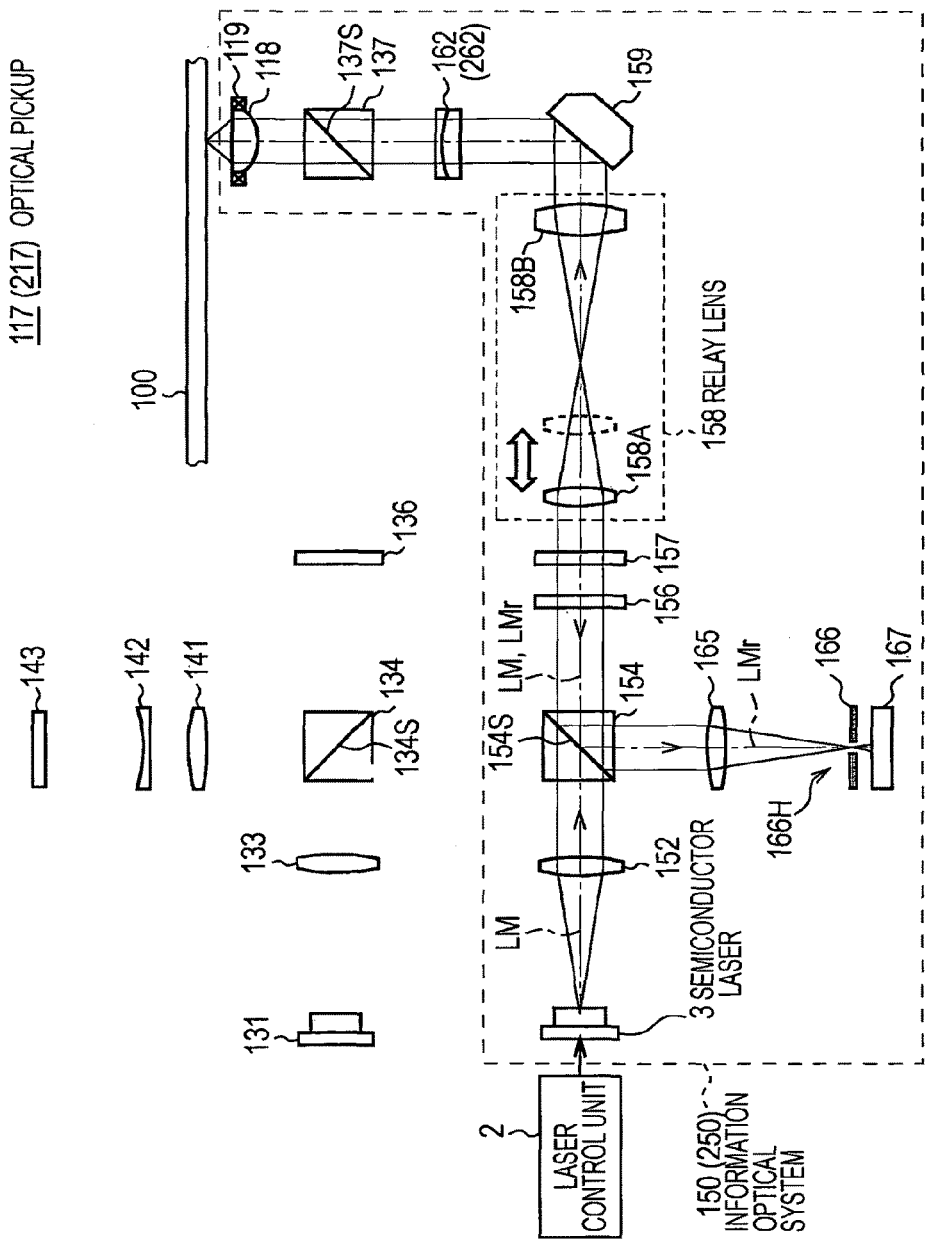
FIG. 32 is a schematic diagram showing a light path of an information light beam.

On the other hand, as shown in FIG. 32 corresponding to FIG. 30, the information optical system 150 is configured in such a manner that an information light beam LM is emitted from the semiconductor laser 3 and is collected to the optical disc 100 by the objective lens 118. Along with this, the information optical system 150 is also configured to receive the information reflection light beam LMr formed by the information light beam LM being reflected by the optical disc 100.

That is, on the basis of the laser driving signal SD supplied from the laser control unit 2, the semiconductor laser 3 emits the information light beam LM formed of divergent light and causes it to enter a collimator lens 152.

The collimator lens 152 converts the information light beam LM from the divergent light to parallel light, and causes it to enter a polarizing beam splitter 154. Incidentally, the collimator lens 152 also has a function of correcting the aberration of the information light beam LM.

The polarizing beam splitter 154 transmits a light beam of P polarization therethrough on a reflection light transmitting surface 154S similarly to the reflection light transmitting surface 134S, and causes a light beam of S polarization to be reflected. In practice, the polarizing beam splitter 154 transmits the information light beam LM of P polarization therethrough on the reflection light transmitting surface 154S, and further causes the information light beam LM to enter a ¼ wavelength plate 157 via an LCP (Liquid Crystal Panel) 156 for correcting spherical aberration or the like.

The ¼ wavelength plate 157 converts the information light beam LM from the P polarization (that is, linearly polarized light) into circularly polarized light (for example, left-hand circularly polarized light), and causes the information light beam LM to enter a relay lens 158.

The relay lens 158 is constituted by a movable lens 158A capable of being moved in the optical axis direction of the information light beam LM, and a fixed lens 158B.

In practice, the relay lens 158 converts the information light beam LM from parallel light into convergent light by using the movable lens 158A, converts the information light beam LM that has become divergent light after convergence into convergent light once more by the fixed lens 158B, and causes the information light beam LM to enter a mirror 159.

The mirror 159 changes the traveling direction of the information light beam LM by reflecting the information light beam LM, and causes the information light beam LM to enter a dichroic prism 137 in sequence via a correction lens 162 (the details will be described later). The dichroic prism 137 transmits the information light beam LM of a wavelength of approximately 404 [nm] therethrough on the reflection light transmitting surface 137S, and causes this light beam to enter the objective lens 118.

The objective lens 118 collects the information light beam LM and irradiates the optical disc 100 with the information light beam LM. At this time, as shown in FIG. 29, the information light beam LM is transmitted through the substrate 102 and is focused to in the recording layer 101.

Here, the position of the focal point FM of the information light beam LM is determined by the convergence state in the case that the information light beam LM is emitted from the fixed lens 158B of the relay lens 158. That is, the focal point FM is moved in the focus direction in the recording layer 101 on the basis of the position of the movable lens 158A.

In practice, in the information optical system 150, the position of the movable lens 158A is controlled by the control unit 111 (FIG. 28). Consequently, in the information optical system 150, the depth ZM (that is, the distance from the servo layer 104) of the focal point FM (FIG. 29) of the information light beam LM in the recording layer 101 of the optical disc 100 is adjusted, so that the focal point FM coincides with the target position QG.

At this time, as a result of the information light beam LM being collected at the target position QG by the objective lens 118, a recording mark RM is formed at the target position QG.

On the other hand, regarding the information light beam LM, when performing a reproduction process for reading information recorded on the optical disc 100, in the case that a recording mark RM has been recorded at the target position QG, the information light beam LM collected at the focal point FM is reflected by the recording mark RM and becomes an information reflection light beam LMr.

At this time, the information reflection light beam LMr is moved in a direction opposite to the information light beam LM and is made to enter the objective lens 118. Furthermore, the circling direction of the information reflection light beam LMr in the circular polarization is inverted from the information light beam LM.

Incidentally, in a case where the recording mark RM has not been recorded at the target position QG, almost all the information light beam LM is transmitted through the optical disc 100. Consequently, the above-mentioned information reflection light beam LMr is hardly generated.

The objective lens 118 causes the information reflection light beam LMr to be converged to a certain degree, and causes it to enter the relay lens 158 in sequence via the dichroic prism 137, the correction lens 162, and the mirror 159.

The relay lens 158 converts the information reflection light beam LMr into parallel light and causes it to enter the ¼ wavelength plate 157. The ¼ wavelength plate 157 converts the information reflection light beam LMr formed of circularly polarized light into S polarization (that is, linearly polarized light), and causes the information reflection light beam LMr to enter the polarizing beam splitter 154 via the LCP 156.

The polarizing beam splitter 154 reflects the information reflection light beam LMr of S polarization by the reflection light transmitting surface 154S, and causes it to enter a multi-lens 165. The multi-lens 165 collects the information reflection light beam LMr, and irradiates it to the photodetector 167 via a pinhole plate 166.

The pinhole plate 166 is arranged in such a manner that the focal point of the information reflection light beam LMr collected by the multi-lens 165 is positioned within a hole part 166H, and causes the information reflection light beam LMr to be directly passed therethrough. On the other hand, the pinhole plate 166 cuts off the light whose focal point has not been formed within the hole part 166H, that is, the light (so-called stray light) reflected at a place other than the target position QG within the optical disc 100.

As a result, the photodetector 167 generates a reproduction detection signal appropriate for the amount of light of the information reflection light beam LMr without being affected by stray light, and supplies this reproduction detection signal to the signal processing unit 113 (FIG. 28).

The signal processing unit 113 generates reproduction information by performing a predetermined demodulation process, a predetermined decoding process, and the like on the reproduction detection signal, and supplies this reproduction information to the control unit 111.

As described above, in the information optical system 150, on the basis of the laser driving signal SD from the laser control unit 122, an information light beam LM is emitted from the semiconductor laser 3 and is irradiated to the optical disc 100. Furthermore, in the information optical system 150, the information reflection light beam LMr from the optical disc 100 is received, and the photoreceived result is supplied to the signal processing unit 113.

[3-4. Position at Which Recording Mark is Formed]

Next, a description will be given of a position at which a recording mark RM is formed in the recording layer 101 of the optical disc 100.

[3-4-1. Formation of Recording Mark in Virtual Optical System]

First, in order to be contrasted with the information optical system 150 in the optical pickup 117, a virtual optical system 150V corresponding to the information optical system 150 is assumed.

Figure 33:
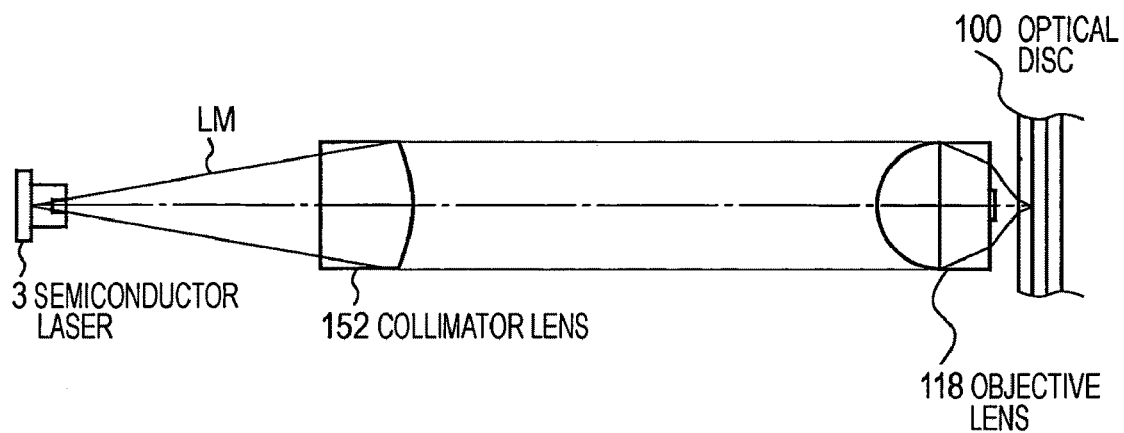
FIG. 33 is a schematic diagram showing the configuration of a virtual optical system.

As shown in FIG. 33, the virtual optical system 150V is constituted by the semiconductor laser 3, the collimator lens 152, and the objective lens 118, and emits an information light beam LM formed of specific output light LE from the semiconductor laser 3. Incidentally, the NAs of the collimator lens 152 and the objective lens 118 are set at 0.161 and 0.837, respectively, similarly to the case of the optical system 20 (FIG. 27(B)).

In a case where the semiconductor laser 3 is to emit specific output light LE, as shown in FIG. 26, first, the semiconductor laser 3 emits specific peak light LEP at a wavelength of 398 [nm], and then emits specific slope light LES at a wavelength of 404 [nm].

Here, in the semiconductor laser 3, when specific peak light LEP is to be emitted, similarly to the case of the optical system 20 (FIG. 27(B)), the light-emission point thereof is a point moved inward by approximately 10 [μm] from the emission end surface 3A, which is the light-emission point in the specific slope light LES.

As a consequence, similarly to the case shown in FIG. 27(B), the focal point FMP of the specific peak light LEP is positioned approximately 0.3 [μm] in front of the target position QG at which the information light beam LM should be focused originally. Here, for the convenience of description, the depth (that is, the distance from the servo layer 104) of the target position QG is set at a depth ZG, and the depth of the focal point FMP is set at a depth ZP.

Figure 34:
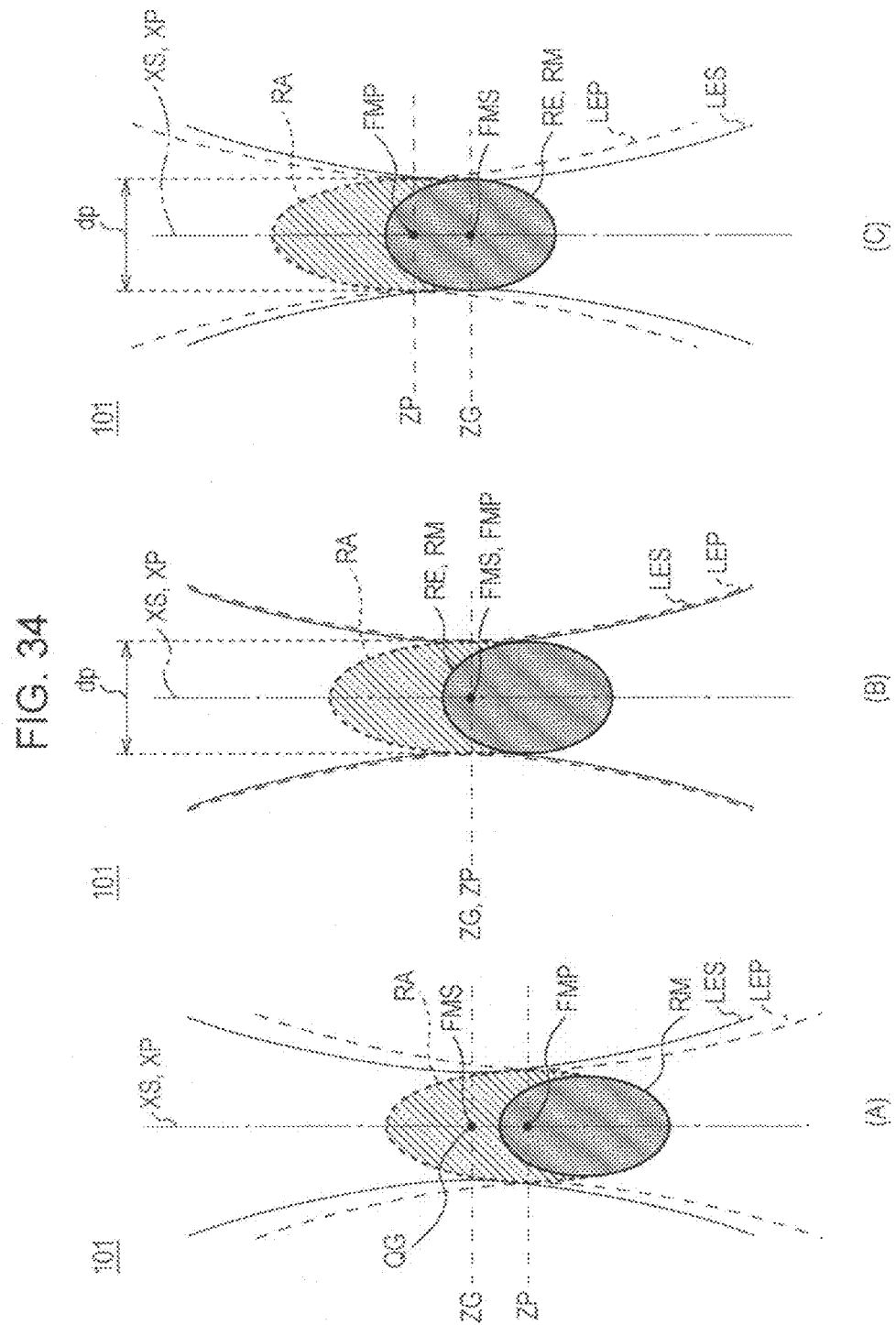
FIG. 34 is a schematic diagram illustrating formation of a recording mark in the first embodiment.

At this time, in the recording layer 101 of the optical disc 100, as shown in FIG. 34(A), a two-photon absorbing reaction occurs in the vicinity of the focal point FMP of the specific peak light LEP, thereby causing the material forming the recording layer 101 to be changed, and an absorption change area RA is formed.

Since this absorption change area RA is colored by the two-photon absorbing reaction, the transmittance of the light beam is decreased when compared to the surroundings thereof.

On the other hand, in the semiconductor laser 3, when specific slope light LES is to be emitted following specific peak light LEP, similarly to the case of the optical system 20 (FIG. 27(B)), the light-emission point thereof is set to an emission end surface 3A.

At this time, on the recording layer 101, as shown in FIG. 34(A), the focal point FMS of the specific slope light LES is positioned approximately 0.3 [μm] away from a target position QG whose depth is ZG, that is, from the center of the absorption change area RA.

In addition, since the absorption change area RA has been colored by the two-photon absorbing reaction, the transmittance of the specific slope light LES is decreased. For this reason, the energy of the specific slope light LES is concentrated not in an area with the focal point FMS being the center, but in an area (hereinafter this will be referred to as an energy concentration area RE) that is deviated toward the entry surface 100A side in the absorption change area RA.

At this time, in the recording layer 101, a recording mark RM is formed in a portion where the absorption change area RA and the energy concentration area RE overlap. As a result, the recording mark RM is formed at a position deviated toward the entry surface 100A side from the target position G and the focal point FMP of the specific peak light LEP.

As described above, in the virtual optical system 150V, as a result of the specific peak light LEP and the specific slope light LES being sequentially emitted as the information light beam LM from the semiconductor laser 3, a recording mark RM is formed at a place that is deviated toward the entry surface 100A side from the target position QG.

[3-4-2. Correction of Recording Mark Formation Position Using Correction Lens]

Accordingly, the information optical system 150 is configured to correct, using the correction lens 162, the position at which a recording mark RM is formed.

Figure 35:
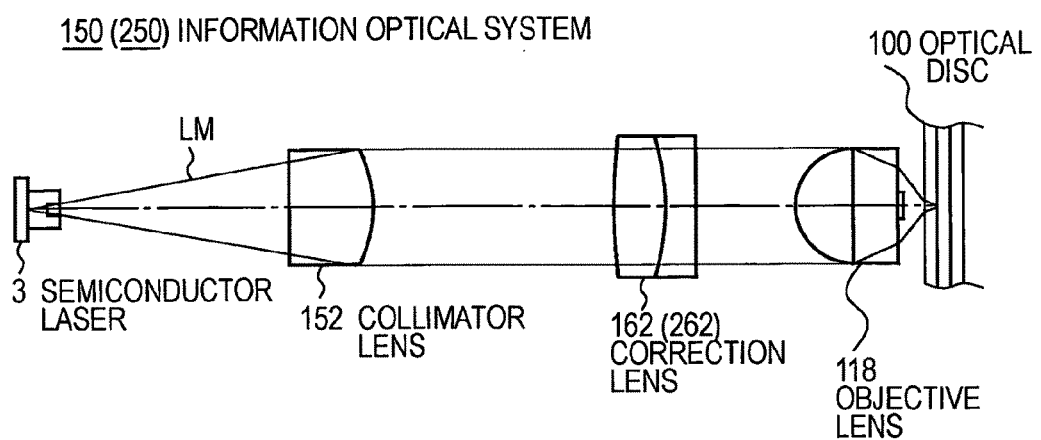
FIG. 35 is a schematic circuit diagram showing the configuration of an information optical system in the first and second embodiments.

FIG. 35 shows some components in the information optical system 150, and schematically shows a state in which an information light beam LM emitted from the semiconductor laser 3 is irradiated to the optical disc 100 via the collimator lens 152, the correction lens 162, and the objective lens 118 in sequence.

That is, the information optical system 150 shown in FIG. 33 is configured in such a manner that a correction lens 162 has been added to the virtual optical system 150V.

Figure 36:
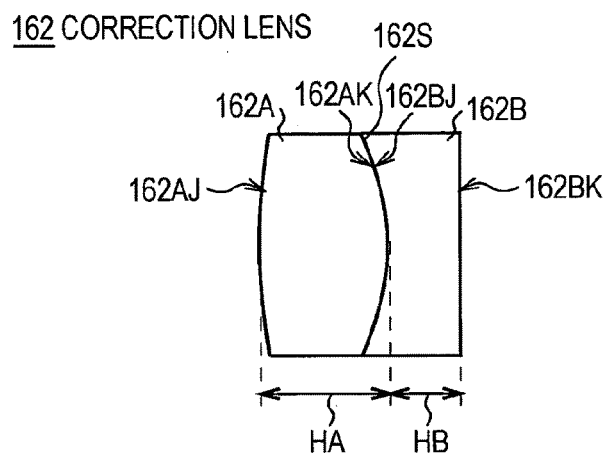
FIG. 36 is a schematic diagram showing the configuration of a correction lens in the first embodiment.

As shown in FIG. 36, the correction lens 162 is formed such that a convex lens unit 162A in the shape of a convex lens and a concave lens unit 162B in the shape of a concave lens are joined at a joined surface 162S.

The convex lens unit 162A is formed of curved surfaces such that an entry surface 162AJ at which the information light beam LM enters is formed on a curved surface having a comparatively large curvature radius, and an exit surface 162AK having a comparatively small curvature radius, from which the information light beam LM is emitted.

Furthermore, the convex lens unit 162A is made of a predetermined glass material M1. This glass material M1 has an index of refraction N1 (405) of 1.780 at a wavelength of 405 [nm], and a variance vd1 of 53.3.

The concave lens unit 162B is configured in such a manner that an entry surface 162BJ at which an information light beam LM enters is a curved surface nearly identical to the exit surface 162AK of the convex lens unit 162A, and an exit surface 162BK from which the information light beam LM is emitted is a planar surface.

Furthermore, the concave lens unit 162B is made of a glass material M2 having optical characteristics differing from those of the convex lens unit 162A. This glass material M2 has an index of refraction N2 (405) of 1.789 at a wavelength of 405 [nm], and a variance vd2 of 53.3. That is, although the index of refraction N of the glass material M2 at a wavelength of 405 [nm] is nearly equal compared with the glass material M1, the variance vd greatly differs.

Figure 37:
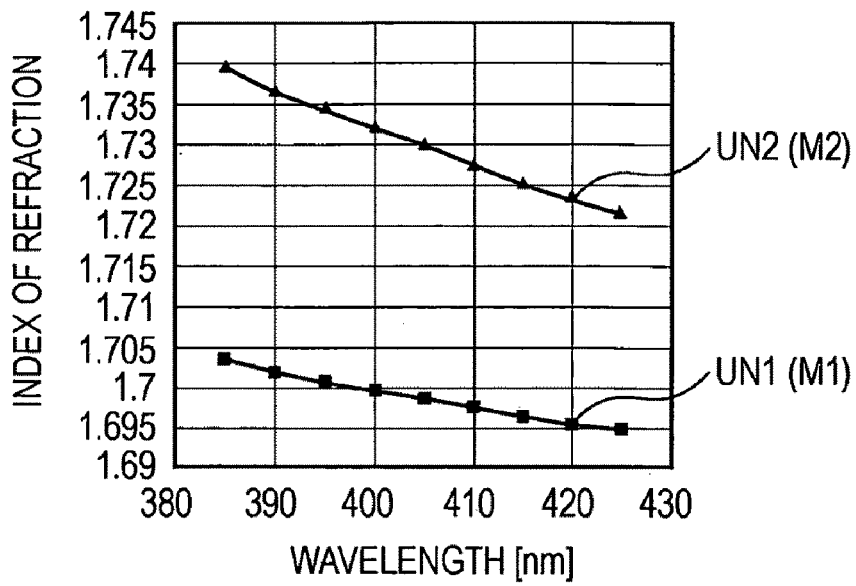
FIG. 37 is a schematic diagram showing the relationship between a wavelength and an index of refraction in a material of a correction lens.

Here, the relationship between the wavelength and the index of refraction of light in the glass material M1 and in the glass material M2 are shown as characteristic curves UN1 and UN2 in FIG. 37. As can be seen from the fact that their divergences vd differ and the characteristic curves UN1 and UN2 differ, the glass material M1 and the glass material M2 differ in the degree of change in their indexes of refraction when the wavelength of light is changed.

The index of refraction N of this correction lens 162 (FIG. 36) is nearly equal between the glass material M1 of the convex lens unit 162A and the glass material M2 of the concave lens unit 162B with regard to a light beam of a wavelength of 405 [nm]. For this reason, when a light beam of a wavelength of 405 [nm] enters the correction lens 162, most of the light beam is transmitted therethrough without causing the light beam to be hardly refracted on the joined surface 162S.

In comparison, the index of refraction N of the correction lens 162 differs between the glass material M1 of the convex lens unit 162A and the glass material M2 of the concave lens unit 162B with regard to a light beam at a wavelength other than the wavelength 405 of [nm]. For this reason, when a light beam of other than the wavelength of 405 [nm] enters the correction lens 162, the light beam is refracted on the joined surface 162S, and the joined surface 162S is made to act as a lens.

That is, the correction lens 162 transmits specific slope light LES at a wavelength of 404 [nm] therethrough with hardly affecting the specific slope light LES, and converts specific peak light LEP so as to expand the divergence angle by causing the joined surface 162S to act as a concave lens for the specific peak light LEP at a wavelength of 398 [nm].

As a result, when compared to the case of the virtual optical system 150V that is not provided with the correction lens 162, it is possible for the correction lens 162 to move the focal point FMP of the specific peak light LEP to a position away from the entry surface 100A at which the specific slope light LES enters.

If the focal point FMP is moved a further approximately 0.3 [μm] away from the entry surface 100A side than the case (FIG. 34(A)) of the virtual optical system 150V, it is possible to make the focal point FMP coincide with the target position QG (that is, the depth ZG) at which the focal point FMS of the specific slope light LES is positioned. In this case, as shown in FIG. 34(B) corresponding to FIG. 34(A), it is possible for the information optical system 150 to form an absorption change area RA with the target position QG being the center.

However, even inside the recording layer 101, in this case, the energy concentration area RE is formed deviated toward the entry surface 100A side in the absorption change area RA. For this reason, as shown in FIG. 34(B), the recording mark RM is still formed at a position deviated toward the entry surface 100A side from the target position QG.

For this reason, in the correction lens 162, the focal point FMP is moved to a position away from the target position QG (that is, the depth ZG) from the entry surface 100A side.

Figure 38:
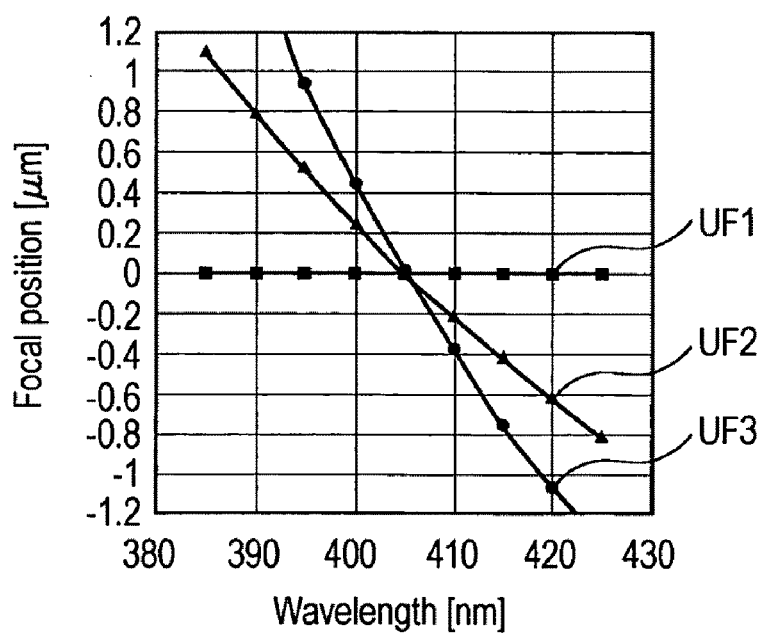
FIG. 38 is a schematic diagram showing the relationship between a wavelength and a focus position in the first embodiment.

Here, the relationship between the wavelength of the information light beam LM and the depth ZM of the focal point FM in the virtual optical system 150V (FIG. 33) and in the information optical system 150 (FIG. 35) are shown as characteristic curves UF1 and UF3, respectively, in FIG. 38.

Incidentally, FIG. 38 shows a relative position (that is, the depth ZM) of the focal point FM in the vertical axis by using the depth ZG of the target position QG as a reference position. Furthermore, FIG. 38 shows the position of the focal point FM in a case where the light-emission points of the information light beam LM are unified to the emission end surface 3A (FIG. 27) of the semiconductor laser 3.

As can be seen from the characteristic curve UF1, in the case of the virtual optical system 150V, since the correction lens 162 is not provided, the depth ZM of the focal point FM does not change regardless of the wavelength of the information light beam LM.

In comparison, as can be seen from the characteristic curve UF3, in the case of the information optical system 150, due to the existence of the correction lens 162, the depth of the focal point FM is changed in accordance with the wavelength of the information light beam LM.

In particular, in the information optical system 150, although the focal point FM is positioned at the depth ZG identical to the reference position QG in the vicinity of a wavelength of 405 [nm], the focal point FM can be moved approximately 0.6 [μm] to a far position in the vicinity of a wavelength of 398 [nm]. This depth of approximately 0.6 [μm] is a value that is set to be greater than 0.3 [μm] that is a distance between the position QN and the position QP in FIG. 27(B).

Incidentally, in the correction lens 162, on the basis of the optical design, the thickness HA in the optical axis portion of the convex lens unit 162A is set at 1.3 [mm], and the thickness HB in the optical axis portion of the concave lens unit 162B is set at 0.8 [mm]. Furthermore, in the correction lens 162, the curvature radius R1 of the entry surface 162AJ is set at 92.178 [mm], and the curvature radiuses R2 of the exit surface 162AK and the entry surface 162BJ are each set at 4.147 [mm].

As a result, as shown in FIG. 34(C) corresponding to FIG. 34(B), in the information optical system 150, the focal point FMP in the specific peak light LEP can be positioned away from the target position QG at which the focal point FMS in the specific slope light LES is positioned when viewed from the entry surface 100A side.

Consequently, in the recording layer 101 of the optical disc 100, with the focal point FMP positioned away from the target position QG being the center, a two-photon absorbing reaction due to the specific peak light LEP occurs, and an absorption change area RA is formed.

At this time, the absorption change area RA is formed in a range in which the center thereof is away from the target position QG and a portion on the entry surface 100A side contains the target position QG. Furthermore, the absorption change area RA is colored by the two-photon absorbing reaction.

In addition, in the recording layer 101, as a result of the specific slope light LES being irradiated from the entry surface 100A side, an energy concentration area RE is formed in a portion on the entry surface 100A in the absorption change area RA, that is, in a portion in which the target position QG is the center. As a result, in the recording layer 101, a recording mark RM is formed with the target position QG being the center.

Incidentally, FIG. 38 also shows a characteristic curve UF2 in a case where the focal point FM of the information light beam LM at a wavelength of 398 [nm] is moved a further approximately 0.3 [μm] to a far position than that at a wavelength of 404 [nm] by the correction lens 162.

In this case, regarding the design of the correction lens 162, for example, the curvature radius R1 of the entry surface 162AJ can be set at 162.238 [mm], the curvature radiuses R2 of the exit surface 162AK and the entry surface 162BJ each can be set at 7.240 [mm].

As described above, in the information optical system 150, the correction lens 162 transmits the specific slope light LES therethrough, and refracts the correction lens 162 causes the specific peak light LEP. Consequently, in the information optical system 150, it is possible to change the depth ZP of the focal point FMP in the specific peak light LEP while the focal point FMS of the specific slope light LES is fixed to the target position QG, and it is possible to position the focal point FMP to a distant place than the same target position QG as the focal point FMS.

[3-5. Operation and Advantages]

In the above configuration, the information optical system 150 of the optical disc apparatus 110 causes the semiconductor laser 3 to sequentially output the specific peak light LEP and the specific slope light LES of the specific output light LE as an information light beam LM.

At this time, the information optical system 150 irradiates the recording layer 101 of the optical disc 100 with the specific peak light LEP and the specific slope light LES in sequence via the collimator lens 152, the correction lens 162, and the objective lens 118.

The correction lens 162 acts as a concave lens for the specific peak light LEP at a wavelength of 398 [nm], thereby causing the divergence angle thereof to be changed, and transmits the specific slope light LES therethrough as is (FIG. 35).

The objective lens 118 collects the specific peak light LEP and the specific slope light LES, thereby forming focal points FMP and FMS in the recording layer 101 of the optical disc 100, respectively.

At this time, since the divergence angle of the specific peak light LEP has been changed, it is possible for the information optical system 150 to position the focal point FMP of the specific peak light LEP at a position away from the focal point FMS of the specific slope light when viewed from the entry surface 100A side.

Therefore, in the information optical system 150, inside the recording layer 101, an absorption change area RA can be formed at a position deviated away from the target position QG. For this reason, in the recording layer 101, when the specific slope light LES is emitted from the entry surface 100A side, an energy concentration area RE is formed in a portion deviated toward the entry surface 100A side within the absorption change area RA.

As a result, in the information optical system 150, unlike in the case of the virtual optical system 150V (FIG. 34(A)) in which the correction lens 162 is not provided, a recording mark can be formed at a position at which the recording mark RM should originally be formed, that is, at a position at which the target position QG is the center.

As a result, it is possible for the information optical system 150 to increase the accuracy of recording information in the recording layer 101 of the optical disc 100.

Consequently, in a case where, for example, the position at which a new recording mark RM should be formed is determined by using the existing recording mark RM as a reference, it is possible for the information optical system 150 to prevent the formation position of the new recording mark RM from greatly differing, due to the accumulation of errors, from the position at which recording should be performed originally.

By the way, the specific output light LE is changed from the specific peak light LEP to the specific slope light LES with the passage of time. For this reason, in the information optical system 150, a technique of moving a correction lens in a light path for the information light beam LM in accordance with the timing of this switching, or the like is considered.

However, since the specific output light LE is changed from the specific slope light LES to the specific peak light LEP in a very short time period of several tens of [ps], it can be said that, in general, it is difficult to perform a mechanical operation at high speed in accordance with the timing of this switching.

In comparison, in the information optical system 150, the optical characteristics of the correction lens 162 are used, and a mechanical operation does not need to be performed. Therefore, it is possible to stably change the divergence angle of the specific peak light LEP with hardly affecting the specific slope light LES.

Furthermore, the correction lens 162 does not work on the specific slope light LES at a wavelength of 404 [nm], which is identical to that of the normal output light LN, and changes the divergence angle of the specific peak light LEP at a wavelength of 398 [nm].

For this reason, the correction lens 162 hardly affects the normal output light LN. Therefore, in the information optical system 150, when information is to be reproduced from the optical disc 100, it is possible to focus the information light beam LM formed of the normal output light LN or the oscillation output light LB to the target position QG without being affected by the correction lens 162.

According to the above configuration, the information optical system 150 of the optical disc apparatus 110 causes the semiconductor laser 3 to sequentially output the specific peak light LEP and the specific slope light LES as the information light beam LM, and causes the correction lens 162 to change the divergence angle of the specific peak light LEP. Consequently, it is possible for the information optical system 150 to position the absorption change area RA by the specific peak light LEP to a far position in the recording layer 101. As a result, in the information optical system 150, since the energy concentration area RE by the specific slope light LES can be formed in the vicinity of the target position QG, it is possible to increase the accuracy of recording information on the optical disc 100.

<4. Second Embodiment>

In a second embodiment, on the basis of the above-mentioned information recording and reproduction principles and the principles of outputting a light beam using the semiconductor laser, an optical disc apparatus 210 (FIG. 28) corresponding the optical disc apparatus 110 in the first embodiment records information on the optical disc 100 and reproduces information from the optical disc 100.

Incidentally, since the structure of the optical disc 100 (FIG. 29) is the same as in the first embodiment, the description thereof is omitted.

[4-1. Configuration of Optical Disc Apparatus and Optical Pickup]

The optical disc apparatus 210 (FIG. 28) according to the second embodiment differs from the optical disc apparatus 110 according to the first embodiment in that an optical pickup 217 taking place of the optical pickup 117 is provided, and the remainder of the configuration is the same.

The optical pickup 217 (FIG. 30) differs from the optical pickup 117 according to the first embodiment in that an information optical system 250 taking place of the information optical system 150 is provided, and the remainder of the configuration is the same.

The information optical system 250 (FIG. 30) differs from the information optical system 150 according to the first embodiment in that a correction lens 262 taking the place of the correction lens 162 is provided, and the remainder of the configuration is the same.

[4-2. Position at Which Recording Mark is Formed]

Next, a description will be given of a position at which a recording mark RM is formed in the recording layer 101 of the optical disc 100 according to the second embodiment.

[4-2-1. Formation of Recording Mark in Virtual Optical System]

First, in order to be contrasted with the information optical system 250 in the optical pickup 217, a virtual optical system 250V (FIG. 33) corresponding to the information optical system 250 is assumed.

Similarly to the virtual optical system 150V in the first embodiment, the virtual optical system 250V includes the semiconductor laser 3, the collimator lens 152, and the objective lens 118, and an information light beam LM formed of specific output light LE is emitted from the semiconductor laser 3.

In a case where the semiconductor laser 3 emits specific output light LE, as shown in FIG. 26, first, the semiconductor laser 3 emits specific peak light LEP at a wavelength of 398 [nm] and then emits specific slope light LES at a wavelength of 404 [nm].

Here, similarly to the case of the optical system 20 (FIG. 27(B)), first, when the semiconductor laser 3 is to emit the specific peak light LEP, the light-emission point thereof is at a place moved inward by approximately 10 [μm] from the emission end surface 3A that is the light-emission point in the specific slope light LES.

As a consequence, similarly to the case of FIG. 27(B), the focal point FMP of the specific peak light LEP is positioned approximately 0.3 [μm] in front of the target position QG at which the information light beam LM should originally be focused. Here, for the convenience of description, the depth (that is, the distance from the servo layer 104) of the target position QG is denoted as a depth ZG, and the depth of the focal point FMP is denoted as a depth ZP.

Figure 39:
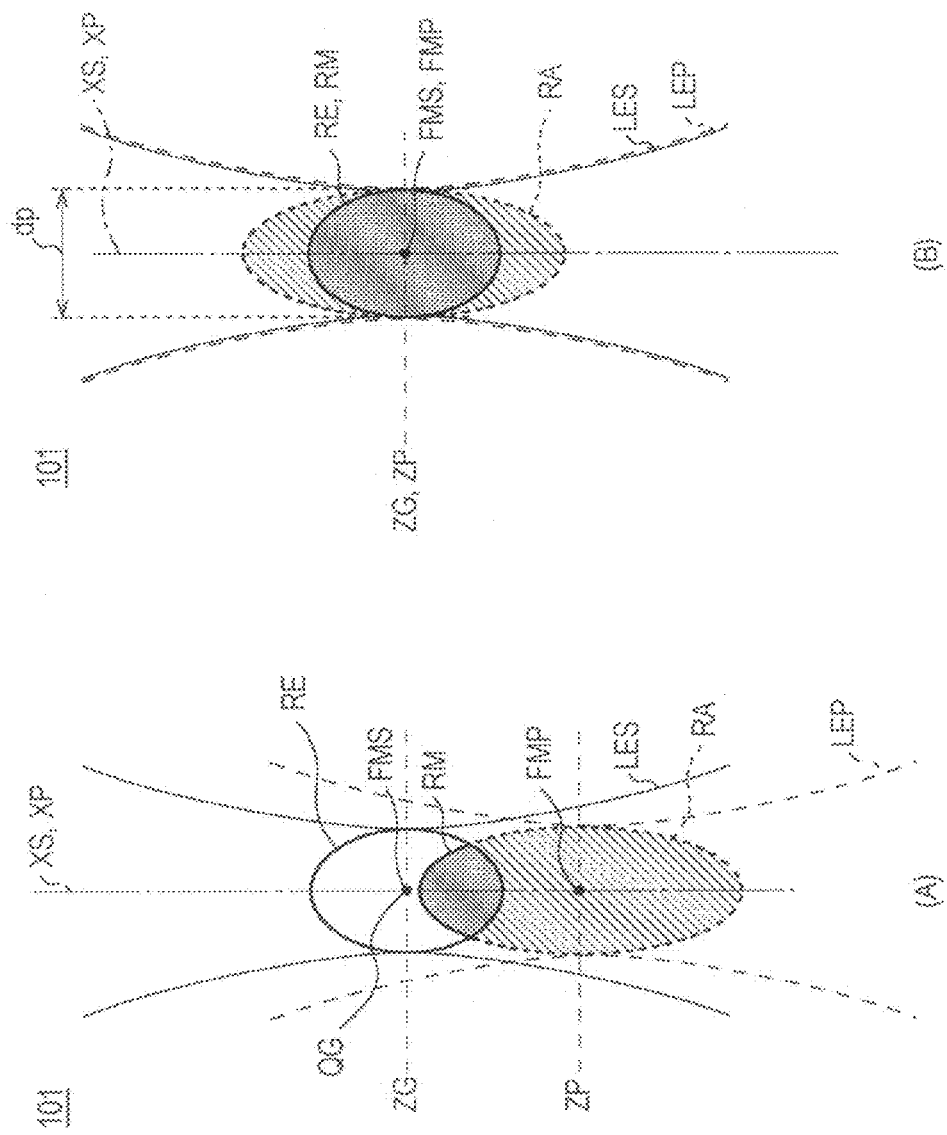
FIG. 39 is a schematic diagram illustrating formation of a recording mark in the second embodiment.

At this time, in the recording layer 101 of the optical disc 100, as shown in FIG. 39(A), a two-photon absorbing reaction occurs in the vicinity of the focal point FMP of the specific peak light LEP, thereby causing the light absorption of the material forming the recording layer 101 to be changed, and an absorption change area RA is formed.

On the other hand, when the semiconductor laser 3 is to emit specific slope light LES following the specific peak light LEP, similarly to the case of the optical system 20 (FIG. 27(B)), the light-emission point thereof is set at the emission end surface 3A.

At this time, in the recording layer 101, as shown in FIG. 39(A), the focal point FMS of the specific slope light LES is positioned at the target position QG. For this reason, the energy of the specific slope light LES is concentrated in an area (hereinafter this will be referred to as an energy concentration area RE) in the vicinity of the focal point FMP.

However, the focal point FMS of the specific slope light LES is positioned at the target position QG (that is, the depth ZG) that is a further approximately 0.3 [μm] away from the focal point FMP (that is, the depth ZP) of the specific peak light LEP when viewed from the entry surface 100A side of the optical disc 100.

At this time, in the recording layer 101, a recording mark RM is formed with a portion in which the absorption change area RA and the energy concentration area RE overlap each other being the center. As a result, the recording mark RM is formed at a position deviated slightly toward the entry surface 100A side than the target position QG.

As described above, in the virtual optical system 250V, as a result of the specific peak light LEP and the specific slope light LES being emitted in sequence as the information light beam LM from the semiconductor laser 3, the recording mark RM is formed at a place slightly deviated toward the entry surface 100A side from the target position QG.

[4-2-2. Correction of Recording Mark Formation Position by Correction Lens]

Accordingly, the information optical system 250 is configured to correct the formation position of the recording mark RM by using the correction lens 262.

In the information optical system 250, as schematically shown in FIG. 35, the information light beam LM emitted from the semiconductor laser 3 is irradiated to the optical disc 100 in sequence via the collimator lens 152, the correction lens 262, and the objective lens 118.

Figure 40:
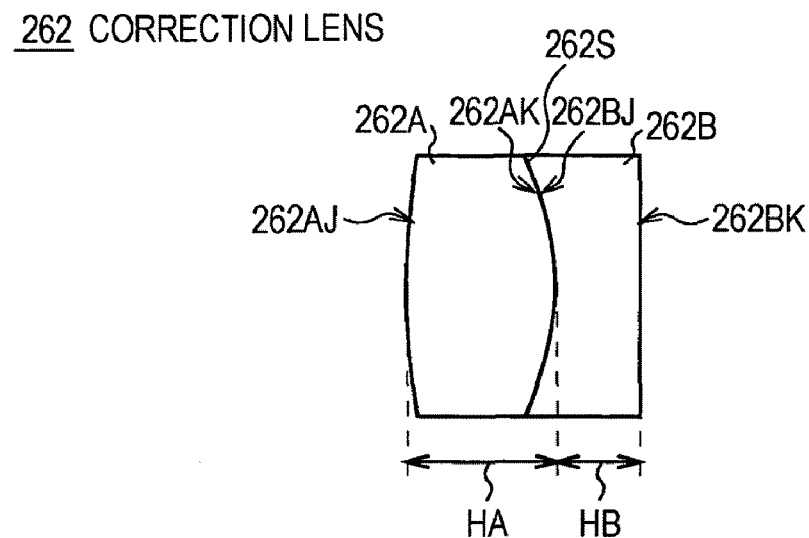
FIG. 40 is a schematic diagram showing the configuration of a correction lens in the second embodiment.

As shown in FIG. 40 corresponding to FIG. 36, in the correction lens 262, similarly to the correction lens 162 according to the first embodiment, a convex lens unit 262A in the shape of a convex lens and a concave lens unit 262B in the shape of a concave lens are joined on the joined surface 262S.

Similarly to the convex lens unit 162A in the first embodiment, the convex lens unit 262A is such that an entry surface 262AJ to which an information light beam LM enters is formed of a curved surface having a comparatively large curvature radius and an exit surface 262AK from which the information light beam LM is emitted is formed of a curved surface having a comparatively small curvature radius. Furthermore, similarly to the convex lens unit 162A, the convex lens unit 262A is made of a glass material M1.

Similarly to the concave lens unit 162B in the first embodiment, the concave lens unit 262B is such that an entry surface 262BJ at which an information light beam LM enters is formed of a curved surface nearly identical to the exit surface 262AK of the convex lens unit 262A, and an exit surface 262BK from which the information light beam LM is emitted is formed of a planar surface. Furthermore, similarly to the concave lens unit 262B, the concave lens unit 262B is made of a glass material M2.

The divergences vd of the glass material M1 and the glass material M2 differ from each other, and the characteristic curves UN1 and UN2 differ from each other. Consequently, as shown in FIG. 37, the degrees of change in their indexes of refraction when the wavelength of light is changed differ from each other.

Therefore, regarding the light beam of a wavelength of 405 [nm], the index of refraction N of the correction lens 262 (FIG. 40) is nearly equal between the glass material M1 of the convex lens unit 262A and the glass material M2 of the concave lens unit 262B. For this reason, when a light beam of a wavelength 405 [nm] enters the correction lens 262, the correction lens 262 transmits the light beam therethrough with hardly refracting the light beam on the joined surface 262S.

On the other hand, regarding a light beam at a wavelength other than a wavelength of 405 [nm], the index of refraction N of the correction lens 262 differs between the glass material M1 of the convex lens unit 262A and the glass material M2 of the concave lens unit 262B. For this reason, when a light beam of other than a wavelength of 405 [nm] enters the correction lens 262, the correction lens 262 refracts the light beam on the joined surface 262S so as to cause the joined surface 262S to act as a lens.

That is, similarly to the correction lens 162 according to the first embodiment, the correction lens 262 transmits specific slope light LES at a wavelength of 404 [nm] therethrough with hardly working thereon, and causes the joined surface 262S to act as a concave lens for the specific peak light LEP at a wavelength of 398 [nm] so as to perform conversion so that the divergence angle is expanded.

As a result, when compared to the case of the virtual optical system 250V that is not provided with the correction lens 262, it is possible for the correction lens 262 to move the focal point FMP of the specific peak light LEP to a far position from the entry surface 100A.

Figure 41:
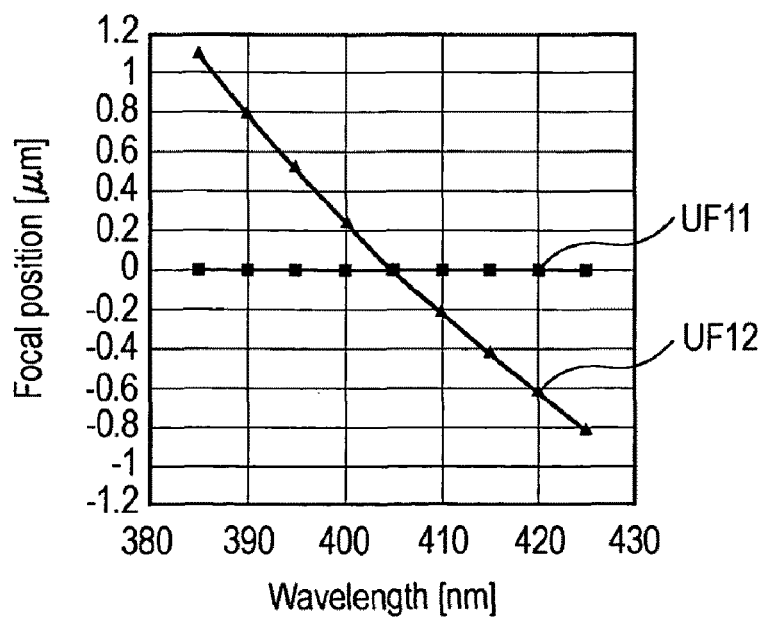
FIG. 41 is a schematic diagram showing the relationship between a wavelength and a focus position in the second embodiment.

Here, the relationships between the wavelength of the information light beam LM and the depth ZM of the focal point FM in the virtual optical system 250V (FIG. 33) and in the information optical system 250 (FIG. 35) are shown as characteristic curves UF11 and UF12 in FIG. 41, respectively.

Incidentally, FIG. 41 shows, in the vertical axis, the relative position (that is, the depth ZM) of the focal point FM by using the depth ZG of the target position QG as a reference position. Furthermore, the light-emission points of the information light beam LM are unified to the emission end surface 3A (FIG. 27) of the semiconductor laser 3.

As can be seen from the characteristic curve UF11, in the case of the virtual optical system 250V, since the correction lens 262 is not provided, the depth ZM of the focal point FM does not change regardless of the wavelength of the information light beam LM.

In comparison, in the case of the information optical system 250, as can be seen from the characteristic curve UF12, the depth of the focal point FM is changed in accordance with the wavelength of the information light beam LM due to the existence of the correction lens 262.

In particular, in the information optical system 250, in the vicinity of a wavelength of 405 [nm], although the depth ZM of the focal point FM is set at the same as the depth ZG of the reference position QG, in the vicinity of a wavelength of 398 [nm], the depth ZM of the focal point FM can be increased by approximately 0.3 [μm], that is, can be moved to a distant place. Unlike the depth of approximately 0.6 [μm] in the first embodiment, this depth of approximately 0.3 [μm] is a value that is set in accordance with the distance between the position QN and the position QP in FIG. 27(B).

Incidentally, in the correction lens 262, on the basis of the optical design, the thickness HA in the optical axis portion of the convex lens unit 262A is set at 1.3 [mm], and the thickness HB in the optical axis portion of the concave lens unit 262B is set at 0.8 [mm]. Furthermore, in the correction lens 262, the curvature radius R1 of the entry surface 262AJ is set at 162.238 [mm], and the curvature radiuses R2 of the exit surface 262AK and the entry surface 262BJ are each set at 7.240 [mm].

As a result, as shown in FIG. 39(B) corresponding to FIG. 39(A), in the information optical system 250, the depth ZP of the focal point FMP in the specific peak light LEP can be made to coincide with the depth ZG of the focal point FMS in the specific slope light LES. That is, it is possible for the information optical system 250 to position both the focal point FMP of the specific peak light LEP and the focal point FMS of the specific slope light LES at the target position QG.

As a result, in the recording layer 101 of the optical disc 100, since both the absorption change area RA and the energy concentration area RE are formed with the target position QG being the center, the recording mark RM is formed with the target position QG being the center.

As described above, the information optical system 250 is configured to cause the correction lens 262 to transmit the specific slope light LES therethrough, and to cause the specific peak light LEP to be refracted. As a result, in the information optical system 250, while the focal point FMS of the specific slope light LES is fixed to the target position QG, the depth ZP of the focal point FMP in the specific peak light LEP can be changed, so that the focal point FMP can be positioned at the same target position QG as the focal point FMS.

[4-3. Operation and Advantages]

In the above configuration, the information optical system 250 of the optical disc apparatus 210 according to the second embodiment causes the semiconductor laser 3 to sequentially output specific peak light LEP and specific slope light LES of specific output light LE as an information light beam LM.

At this time, the info optical system 250 irradiates the recording layer 101 of the optical disc 100 with the specific peak light LEP and the specific slope light LES in sequence via the collimator lens 152, the correction lens 262, and the objective lens 118 in sequence.

The correction lens 262 acts as a concave lens for the specific peak light LEP at a wavelength of 398 [nm] so as to change the divergence angle thereof, and to transmit the specific slope light LES therethrough as is (FIG. 35).

The objective lens 118 collects the specific peak light LEP and the specific slope light LES, thereby forming focal points FMP and FMS in the recording layer 101 of the optical disc 100, respectively.

At this time, since the divergence angle of the specific peak light LEP has been changed, it is possible for the information optical system 250 to adjust the depth ZP of the focal point FMP in the specific peak light LEP to the depth ZG equal to that of the focal point FMS of the specific slope light.

Therefore, in the recording layer 101, it is possible for the information optical system 250 to cause the center of the energy concentration area RE by the specific slope light LES to coincide with the target position QG that is the center of the absorption change area RA formed by the specific peak light LEP.

As a result, it is possible for the information optical system 250 to form a recording mark RM with the target position QG being the center in a portion in which the absorption change area RA and the energy concentration area RE overlap each other (FIG. 39(B)).

At this time, unlike in the case of the virtual optical system 250V (FIG. 39(A) that is not provided with the correction lens 262, it is possible for the information optical system 250 to form the recording mark RM at a position at which the recording mark RM should be originally formed, that is, at a position in which the target position QG is the center.

As a result, it is possible for the information optical system 250 to increase the accuracy of recording information on the recording layer 101 of the optical disc 100.

Consequently, in a case where, for example, the formation position of a new recording mark RM is to be determined by using the existing recording mark RM as a reference, it is possible for the information optical system 250 to prevent the formation position of the new recording mark RM from greatly differing, due to the accumulation of errors, from the position at which the recording mark RM should be originally recorded.

Furthermore, similarly to the first embodiment, the information optical system 250 uses the optical characteristics of the correction lens 262, and it is not necessary to use a mechanical operation. Consequently, it is possible to stably change the divergence angle of the specific peak light LEP with hardly affecting the specific slope light LES.

In addition, the correction lens 262 does not work on the specific slope light LES at a wavelength of 404 [nm] identical to the normal output light LN, and changes the divergence angle of the specific peak light LEP at a wavelength of 398 [nm].

For this reason, the correction lens 262 hardly affects the normal output light LN. Therefore, in the information optical system 250, when information is to be reproduced from the optical disc 100, it is possible to focus the information light beam LM formed of normal output light LN or oscillation output light LB to the target position QG without being affected by the correction lens 262.

With the above configuration, the information optical system 250 of the optical disc apparatus 210 according to the second embodiment causes the semiconductor laser 3 to sequentially output the specific peak light LEP and the specific slope light LES as an information light beam LM, and causes the correction lens 262 to change the divergence angle of the specific peak light LEP. As a result, it is possible for the information optical system 250 to form, in the recording layer 101, both the absorption change area RA by the specific peak light LEP and the energy concentration area RE by the specific slope light LES with the target position QG being the center. As a result, it is possible for the information optical system 250 to form a recording mark RM with the target position QG being the center and to increase the accuracy of recording information on the optical disc 100.

5. Third Embodiment

In a third embodiment, on the basis of the above-described information recording reproduction principles and the principles of outputting a light beam by a semiconductor laser, an optical disc apparatus 310 (FIG. 28) corresponding to the optical disc apparatus 110 in the first embodiment is configured to record information on the optical disc 100 and to reproduce information from the optical disc 100.

Incidentally, the structure of the optical disc 100 (FIG. 29) is identical to that of the first embodiment, and accordingly, the description thereof is omitted.

[5-1. Configuration of Optical Disc Apparatus and Optical Pickup]

The optical disc apparatus 310 (FIG. 28) according to the third embodiment differs from the optical disc apparatus 110 according to the first embodiment in that an optical pickup 317 taking the place of the optical pickup 117 is provided, and the remainder of the configuration is the same.

Figure 42:
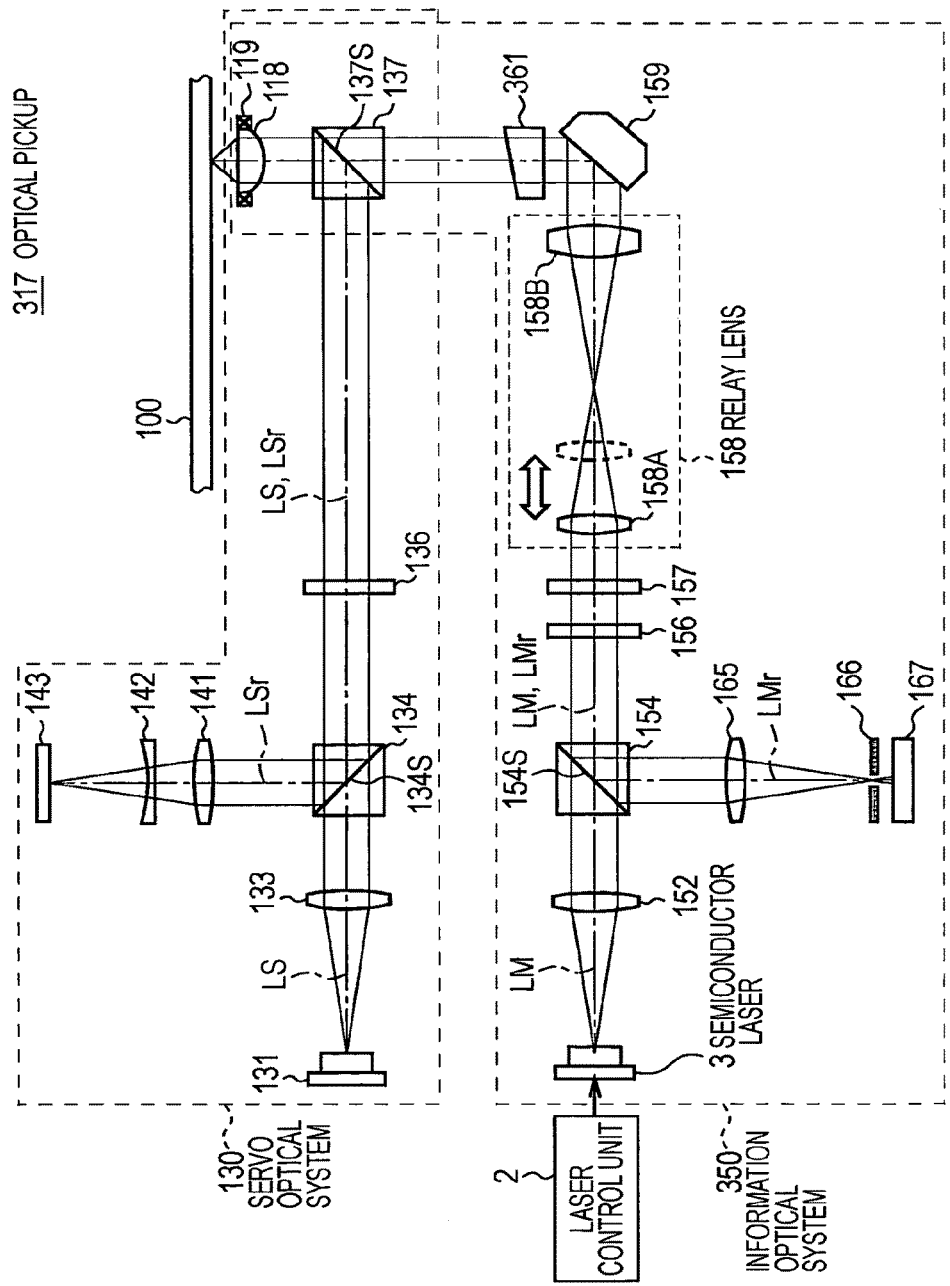
FIG. 42 is a schematic diagram showing the configuration of an optical pickup according to a third embodiment.

As shown in FIG. 42, the optical pickup 317 differs from the optical pickup 117 according to the first embodiment in that an information optical system 350 taking the place of the information optical system 150 is provided, and the remainder of the configuration is the same.

The information optical system 350 differs from the information optical system 150 according to the first embodiment in that a wedge prism 361 taking the place of the correction lens 162 is provided, and the remainder of the configuration is the same.

[5-2. Recording Mark Formation Position]

Next, a description will be given of a position at which a recording mark RM is formed in the recording layer 101 of the optical disc 100 in accordance with the third embodiment.

[5-2-1. Formation of Recording Mark in Virtual Optical System]

First, in order to be contrasted with the information optical system 350 in the optical pickup 317, a virtual optical system 350V corresponding the information optical system 350 is assumed.

Similarly to the virtual optical system 150V (FIG. 33) in the first embodiment, the virtual optical system 350V is configured to include the semiconductor laser 3, the collimator lens 152, and the objective lens 118, and the information light beam LM formed of specific output light LE is emitted from the semiconductor laser 3.

In a case where the semiconductor laser 3 is to emit specific output light LE, as shown in FIG. 26, first, the semiconductor laser 3 emits specific peak light LEP at a wavelength of 398 [nm] and then emits specific slope light LES at a wavelength of 404 [nm].

Figure 43:
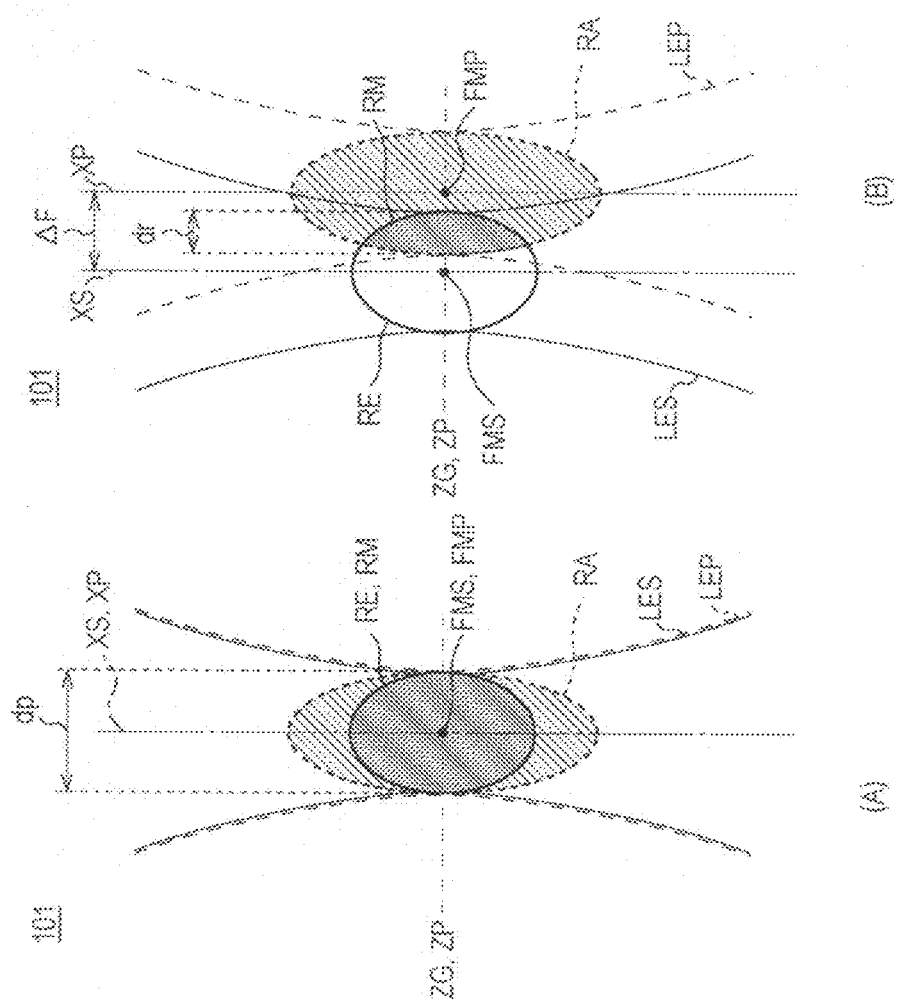
FIG. 43 is a schematic diagram illustrating formation of a recording mark according to the third embodiment.

That is, first, the semiconductor laser 3 emits the specific peak light LEP. At this time, as shown in FIG. 43(A), in the recording layer 101 of the optical disc 100, a two-photon absorbing reaction occurs in the vicinity of the focal point FMP of the specific peak light LEP, causing the light absorption of the material forming the recording layer 101 to be changed, and an absorption change area RA is formed.

Then, the semiconductor laser 3 emits specific slope light LES following the specific peak light LEP. At this time, in the recording layer 101, the energy of the specific slope light LES is concentrated in an area (hereinafter this will be referred to as an energy concentration area RE) in the vicinity of the focal point FMP.

As a result, in the recording layer 101, a recording mark RM is formed with a portion in which the absorption change area RA and the energy concentration area RE overlap each other being the center.

As described above, in the virtual optical system 350V, as a result of the specific peak light LEP and the specific slope light LES being emitted in sequence as an information light beam LM from the semiconductor laser 3, a recording mark RM sequentially is formed with the target position QG being the center in the recording layer 101.

[5-2-2. Correction of Recording Mark Formation Position Using Wedge Prism]

Next, a description will be given of the correction of the formation position of a recording mark RM by using a wedge prism 361 in the information optical system 350.

Figure 44:
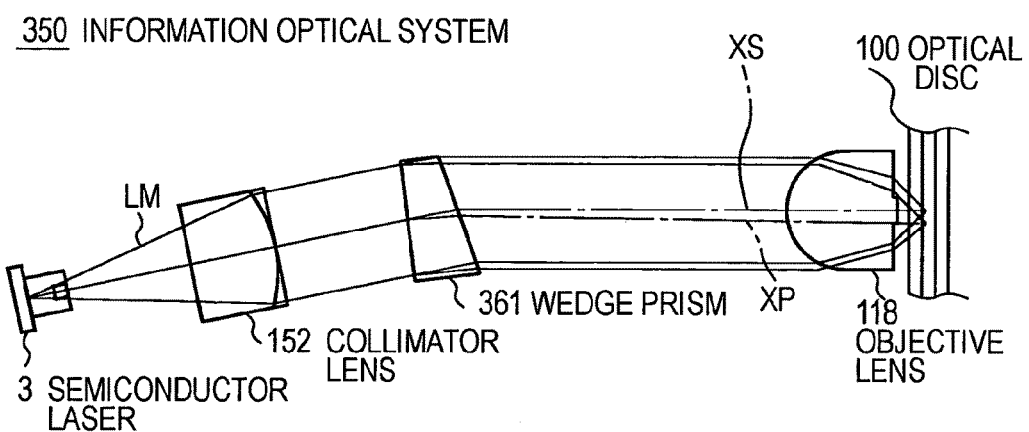
FIG. 44 is a schematic diagram showing the configuration of an information optical system according to the third embodiment.

In FIG. 44 corresponding to FIG. 33, some components in the information optical system 350 are shown, and the wedge prism 361 is added to the components of the virtual optical system 350V (FIG. 33).

The information optical system 350 irradiates the optical disc 100 with an information light beam LM emitted from the semiconductor laser 3 via the collimator lens 152, the wedge prism 361, and the objective lens 118 in sequence.

Figure 45:
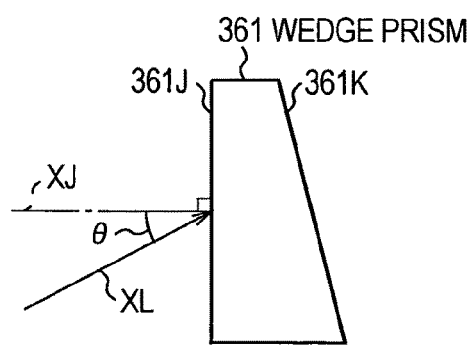
FIG. 45 is a schematic diagram showing the configuration of a wedge prism.

As shown in FIG. 45, an entry surface 361J and an exit surface 361K of the wedge prism 361 have been formed in a planar shape. In addition, the exit surface 361K is slightly inclined from parallel with respect to the entry surface 361J, and is configured in a trapezoidal shape when viewed from the side surface. Incidentally, the angle formed between the entry surface 361J and the exit surface 361K is 18° 9'.

Furthermore, the wedge prism 361 is made of an optical glass material called BK7, and the index of refraction thereof differs according to the wavelength of light. In practice, the index of refraction of the glass material forming the wedge prism 361 is 1.530 for light of a wavelength of 405 [nm], and the index of refraction thereof is 1.531 for light of a wavelength of 398 [nm].

For this reason, the wedge prism 361 refracts the specific peak light LEP (wavelength 398 [nm]) and the specific slope light LES (wavelength 404 [nm]) serving as the information light beam LM at mutually different refraction angles.

Consequently, as shown in FIG. 44, the specific peak light LEP travels slightly away from the optical axis XS in which the optical axis XP of the specific peak light LEP is separated from the optical axis XS of the specific slope light LES.

Figure 46:
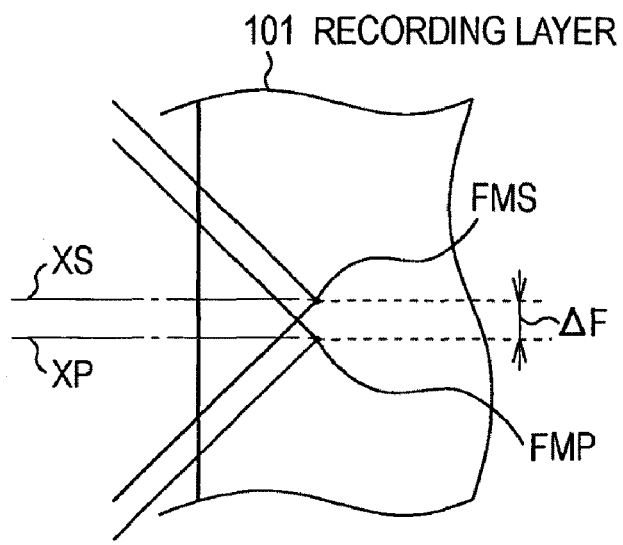
FIG. 46 is a schematic diagram illustrating a focus position in an optical disc.

As a consequence, as shown in FIG. 46, in the recording layer 101 of the optical disc 100, the focal point FMP of the specific peak light LEP is formed at a position that is separated by a distance ΔF in the plane direction of the optical disc 100 from the focal point FMS of the specific slope light LES.

This means that, in the recording layer 101, when compared to the state shown in FIG. 43(A), by moving the absorption change area RA by a distance ΔF in the plane direction of the optical disc 100 from the energy concentration area RE, the overlapping range thereof is reduced.

As a result, in the recording layer 101, as shown in FIG. 43(B), a recording mark RM is formed in a portion in which the absorption change area RA and the energy concentration area RE overlap each other. The length (hereinafter this will be referred to as a plane direction length dr) regarding the plane direction of the optical disc 100 in this recording mark RM is greatly decreased when compared to the case shown in FIG. 43(A).

By the way, if the angle formed between the normal line XJ of the entry surface 361J in the wedge prism 361 and the incident information light beam LM is denoted as an incidence angle θ, the degree at which the optical axis XP is separated from the optical axis XS changes in accordance with the incidence angle θ due to the optical properties of the wedge prism 361.

Figure 47:
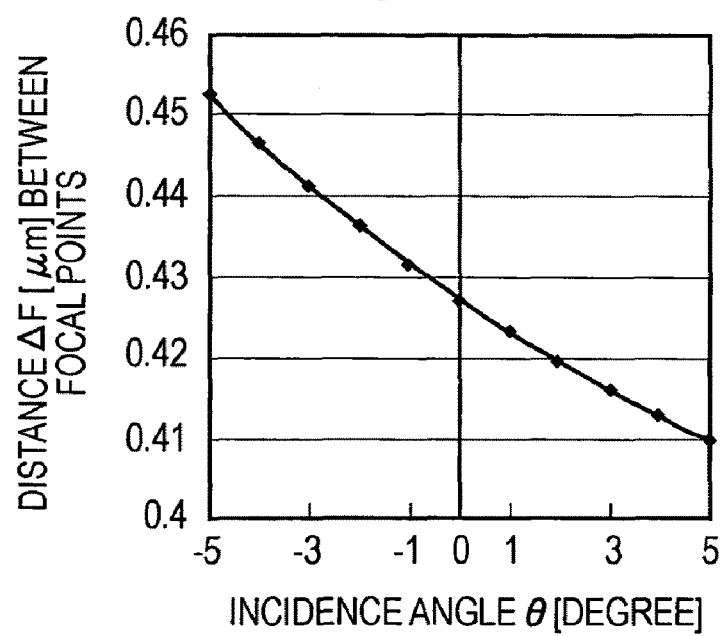
FIG. 47 is a schematic diagram showing the relationship between an incidence angle and a distance between focal points according to the third embodiment.

FIG. 47 shows the relationship between the incidence angle θ in the information optical system 350 and the distance ΔF between focal points. On the basis of this FIG. 47, if, for example, the incidence angle θ=5 [°], the distance ΔF between focal points=0.41 [μm].

In practice, in the information optical system 350, the optical components are arranged so that the incidence angle θ of the information light beam LM with respect to the wedge prism 361 becomes 5 [°]. For this reason, as shown in FIG. 43(B), in the recording layer 101, the information optical system 350 causes the focal point FMP of the specific peak light LEP to be separated by a distance ΔF=0.41 [μm] in the plane direction of the optical disc 100 from the focal point FMS of the specific slope light LES.

On the other hand, the beam diameter dp when a light beam at a wavelength of 405 [nm] is collected by using an objective lens whose NA is 0.85 is calculated as approximately 0.58 [μm] on the basis of a typical calculation equation.

Therefore, it is possible for the information optical system 350 to set the plane direction length dr of the recording mark RM to 0.17 [μm]. Since this length of 0.17 [μm] is equal to the shortest mark length in the optical disc of the BD method, the recording mark RM formed in the manner described above is of a size at which reproduction is sufficiently possible in practical applications.

As described above, the wedge prism 361 refracts the specific slope light LES and the specific peak light LEP at mutually different refraction angles, so that the focal point FMP and the focal point FMS that are collected in the recording layer 101 are separated from each other. Consequently, it is possible for the information optical system 350 to form a recording mark RM whose plane direction length dr is comparatively small by shifting the formation position of the absorption change area RA in the plane direction of the optical disc 100 and by causing the absorption change area RA to partially overlap with the energy concentration area RE.

[5-3. Operation and Advantages]

In the above configuration, the information optical system 350 of the optical disc apparatus 310 according to the third embodiment causes the semiconductor laser 3 to sequentially output the specific peak light LEP and the specific slope light LES of the specific output light LE as the information light beams LM.

After that, the information optical system 350 irradiates the recording layer 101 of the optical disc 100 with the specific peak light LEP and the specific slope light LES in sequence via the collimator lens 152, the wedge prism 361, and the objective lens 118 in sequence.

The wedge prism 361 refracts the specific peak light LEP at a wavelength of 398 [nm] and the specific slope light LES at a wavelength of 404 [nm] at mutually different refraction angles (FIG. 44).

Consequently, since the specific peak light LEP is collected by the objective lens 118 because the optical axis XP thereof is separated from the optical axis XS, a focal point FMP is formed at a position moved in the plane direction of the optical disc 100 from the focal point FMS of the specific slope light LES.

Therefore, it is possible for the information optical system 350 to position, in the recording layer 101, the energy concentration area RE by the specific slope light LES in such a manner as to partially extend off the absorption change area RA rather than being within the absorption change area RA formed by the specific peak light LEP.

As a result, it is possible for the information optical system 350 to form a comparatively small recording mark RM in a portion in which the absorption change area RA and the energy concentration area RE overlap each other (FIG. 43(B)).

At this time, in the information optical system 350, since the plane direction length dr of the recording mark RM can be decreased to more than a case (FIG. 43(A)) in which the energy concentration area RE is positioned within the absorption change area RA, the recording density in the recording layer 101 can be increased.

For example, in the information optical system 350, it is possible to reduce the plane direction length Dr regarding the direction (that is, the circumferential direction) along the tracks on the optical disc 100 by the settings of the direction and the angle in which the wedge prism 361 is mounted, and the like.

Consequently, in the optical disc apparatus 110, the recording density of information regarding the circumferential direction on the optical disc 100 can be increased. Thus, it is possible to increase the recording capacity and possible to increase the recording speed of information without increasing much the rotational speed of the optical disc 100.

Furthermore, it is possible for the information optical system 350 to reduce the plane direction length Dr regarding the radial direction on the optical disc 100 by the settings of the direction and the angle in which the wedge prism 361 is mounted, and the like.

Consequently, in the optical disc apparatus 110, since the spacing (so-called track pitch) between tracks on the optical disc 100 can be decreased, it is possible to increase the recording capacity.

With the above configuration, the information optical system 350 of the optical disc apparatus 110 according to the third embodiment causes the semiconductor laser 3 to sequentially output the specific peak light LEP and the specific slope light LES as the information light beams LM, and causes the wedge prism 361 to refract the light at mutually different refraction angles. Consequently, it is possible for the information optical system 350 to reduce the range in which the absorption change area RA by the specific peak light LEP and the energy concentration area RE by the specific slope light LES overlap each other in the recording layer 101. As a result, it is possible for the information optical system 350 to reduce the plane direction length dr of the recording mark RM in the recording layer 101 and possible to increase the recording density of information.

6. Fourth Embodiment

[6-1. Configuration of Optical Disc Apparatus and Optical Pickup)

In a fourth embodiment, on the basis of the above-described information recording reproduction principles and the principles of outputting a light beam using a semiconductor laser, an optical disc apparatus 410 (FIG. 28) corresponding to the optical disc apparatus 310 in the third embodiment is configured to record information on the optical disc 100 and reproduce information from the optical disc 100.

Incidentally, since the structure of the optical disc 100 (FIG. 29) is identical to that of the first embodiment, the description thereof is omitted.

Figure 48:
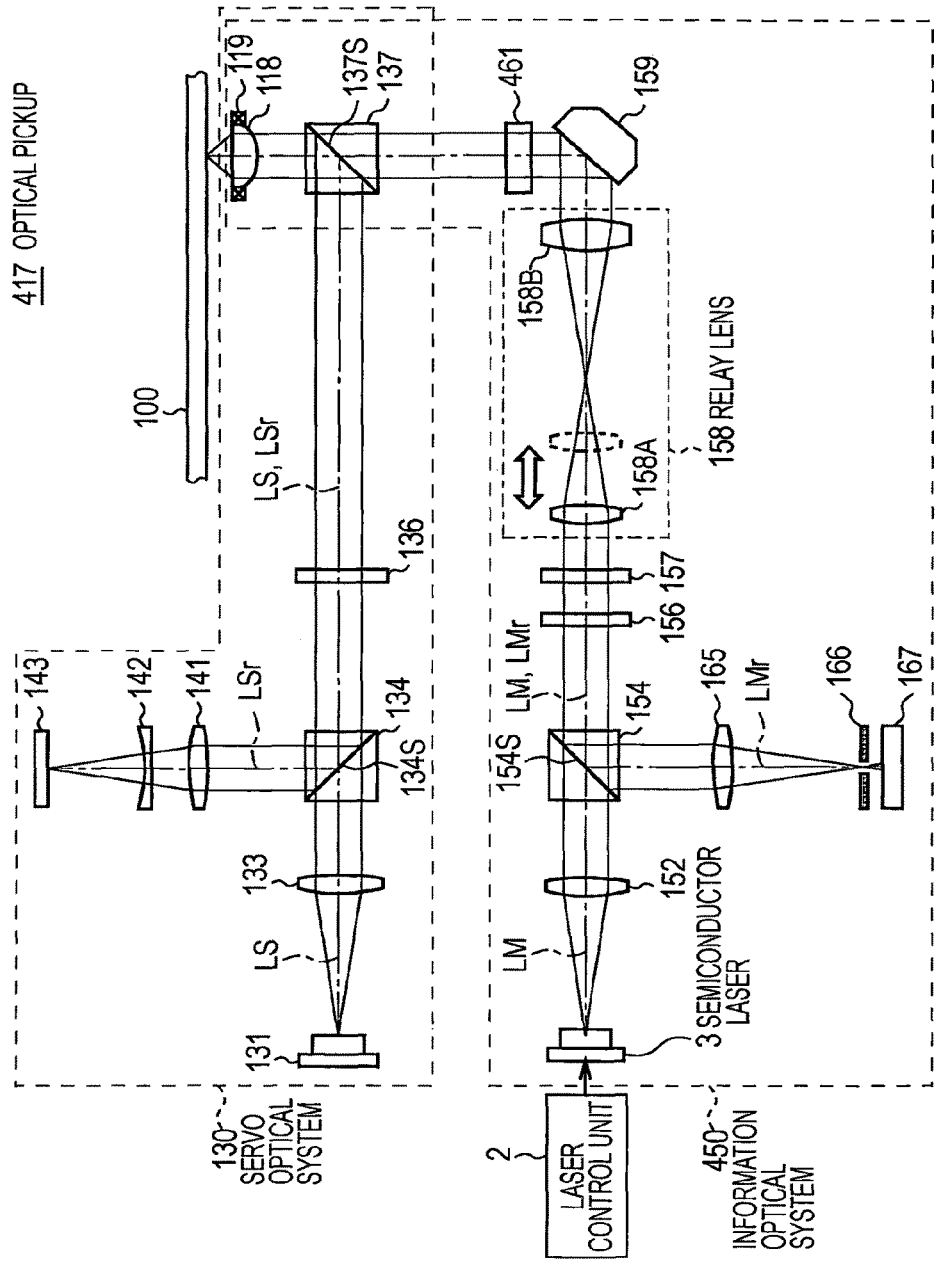
FIG. 48 is a schematic diagram showing the configuration of an optical pickup according to a fourth embodiment.

As shown in FIG. 48 in which components corresponding to those in FIG. 42 are designated with the same reference numerals, an optical pickup 417 differs from the optical pickup 317 in that an information optical system 450 taking the place of the information optical system 350 is provided, and the remainder of the configuration is the same.

An information optical system 450 differs from the information optical system 350 in that a diffraction grating plate 461 taking the place of the wedge prism 361 is provided, and the remainder of the configuration is the same.

Figure 49:
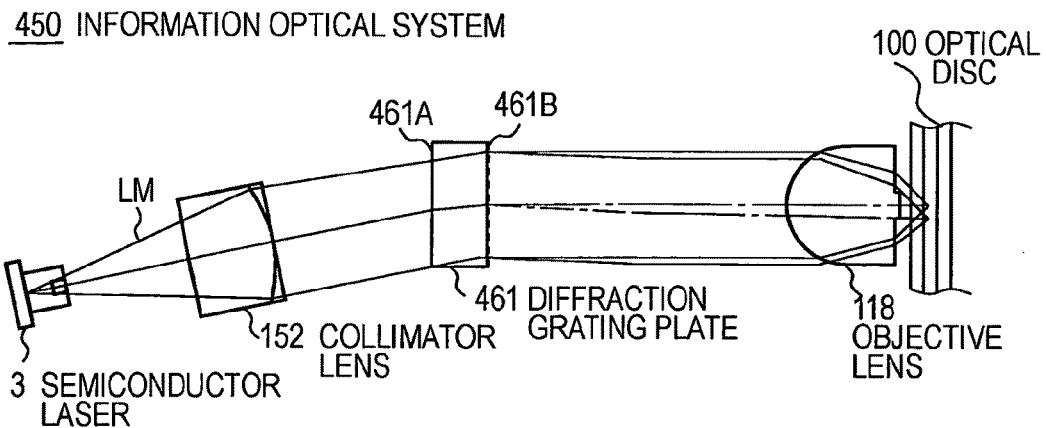
FIG. 49 is a schematic diagram showing the configuration of an information optical system according to the fourth embodiment.

Here, some components in the information optical system 450 are shown in FIG. 49 corresponding to FIG. 44. The information optical system 450 shown in FIG. 49 irradiates the optical disc 100 with an information light beam LM emitted from the semiconductor laser 3 via the collimator lens 152, the diffraction grating plate 461, and the objective lens 118 in sequence.

Figure 50:
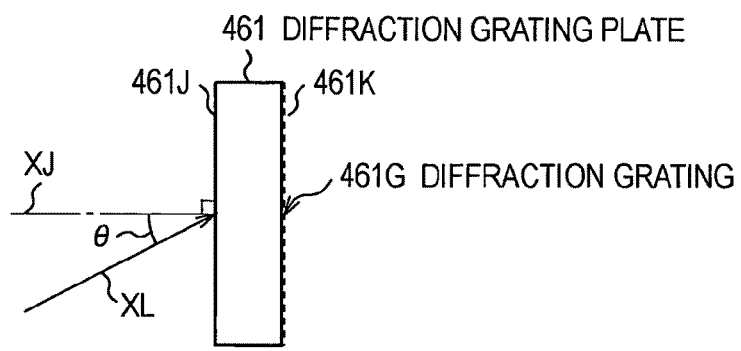
FIG. 50 is a schematic diagram showing the configuration of a diffraction grating plate.

As shown in FIG. 50, an entry surface 461J of the diffraction grating plate 461, at which the information light beam LM enters, is formed in a planar shape, whereas an exit surface 461K is formed with a diffraction grating 461G by forming many grooves on the exit surface 461K.

Here, the diffraction grating plate 461 causes the diffraction angle to differ according to the wavelength of the information light beam LM by general properties of the diffraction grating 461G formed on the exit surface 461K.

Furthermore, the diffraction grating plate 461 is made of an optical glass material called BK7 similarly to the wedge prism 361, and the index of refraction thereof differs according to the wavelength of light. In practice, the index of refraction of the glass material forming the diffraction grating plate 461 is 1.530 for light at a wavelength of 405 [nm], and the index of refraction thereof is 1.531 for light at a wavelength of 398 [nm].

That is, the diffraction grating plate 461 causes the specific peak light LEP (wavelength 398 [nm]) and the specific slope light LES (wavelength 404 [nm]) serving as the information light beam LM to be diffracted at mutually different diffraction angles.

Consequently, as shown in FIG. 49, similarly to the third embodiment (FIG. 44), the specific peak light LEP travels slightly apart from the optical axis XS, in which the optical axis XP is separated from the optical axis XS of the specific slope light LES.

As a consequence, in the recording layer 101 of the optical disc 100, similarly to the third embodiment (FIG. 46), the focal point FMP of the specific peak light LEP is formed at a position separated by a distance ΔF in the plane direction of the optical disc 100 from the focal point FMS of the specific slope light LES.

As a result, in the recording layer 101, also similarly to the third embodiment (FIG. 43(B)), a recording mark RM whose plane direction length dr is greatly decreased than in the case of FIG. 43(A) is formed in a portion in which the absorption change area RA and the energy concentration area RE overlap each other.

Figure 51:
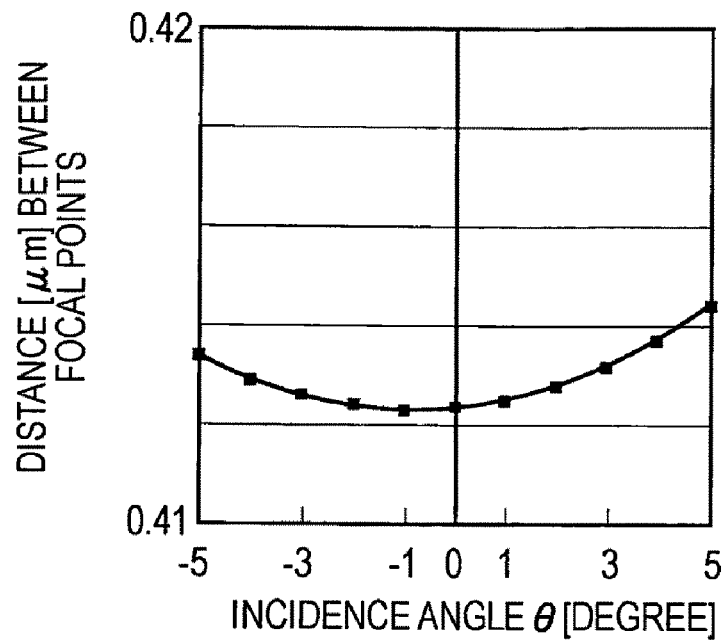
FIG. 51 is a schematic diagram showing the relationship between an incidence angle and a distance between focal points according to the fourth embodiment.

By the way, if the angle formed between the normal line XJ of the entry surface 461A in the diffraction grating plate 461 and the incident information light beam LM is denoted as an incidence angle θ, the degree in which the optical axis XP is separated from the optical axis XS is changed in accordance with the incidence angle θ due to the optical properties of the diffraction grating plate 461. FIG. 51 shows the relationship between the incidence angle θ and the distance ΔF between focal points in the information optical system 450.

Figure 52:
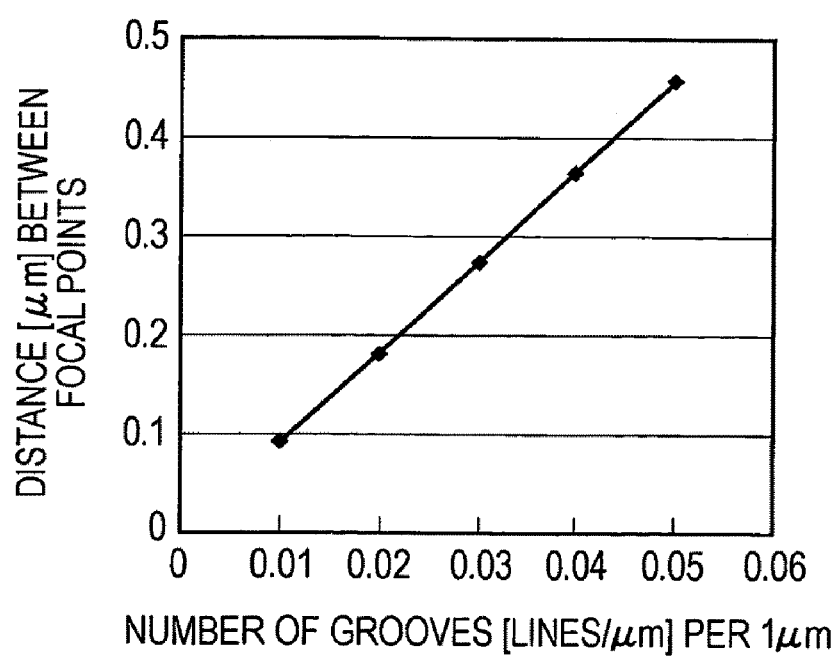
FIG. 52 is a schematic diagram showing a groove density of a diffraction grating and a distance between focal points.

Furthermore, in principles as a diffraction grating, the diffraction grating 461G of the diffraction grating plate 461 causes the diffraction angle of the information light beam LM to differ in response to the pitch of the grooves. FIG. 52 shows the relationship between the pitch of the grooves of the diffraction grating 461G and the distance ΔF between focal points when the incidence angle θ of the information light beam LM is set to 0 [°].

Here, it can be seen from a comparison between FIG. 51 and FIG. 52 that, whereas the distance ΔF between focal points in the information optical system 450 hardly changes with respect to a change in the incidence angle θ for the diffraction grating plate 461, the distance ΔF changes in response to the pitch of the grooves in the diffraction grating 461G.

In practice, in the information optical system 450, the incidence angle θ of the information light beam LM for the diffraction grating plate 461 is set at 0 [°], and the pitch of the grooves in the diffraction grating 461G is set at 22.2 [μm], that is, the number of grooves per 1 μm is set at approximately 0.045. In this case, on the basis of the relation shown in FIG. 52, the distance ΔF between focal points is approximately 0.41 [μm], which is nearly equal to that of the first embodiment.

Consequently, in the information optical system 450, the plane direction length dr of the recording mark RM can be set at 0.17 [μm], which is almost equal to the third embodiment.

As described above, the diffraction grating plate 461 diffracts the specific slope light LES and the specific peak light LEP at mutually different diffraction angles, so that, similarly to the third embodiment, the focal point FMP and the focal point FMS that are collected in the recording layer 101 are separated from each other. Consequently, in the information optical system 450, it is possible to form a recording mark RM whose plane direction length dr is comparatively small by shifting the formation position of the absorption change area RA in the plane direction of the optical disc 100 and by causing the absorption change area RA to partially overlap with the energy concentration area RE.

[6-2. Operation and Advantages)

In the above configuration, the information optical system 450 of the optical disc apparatus 410 in the fourth embodiment causes the semiconductor laser 3 to sequentially output specific peak light LEP and specific slope light LES of specific output light LE as an information light beam LM.

After that, the information optical system 450 sequentially irradiates the recording layer 101 of the optical disc 100 with the specific peak light LEP and the specific slope light LES via the collimator lens 152, the diffraction grating plate 461, and the objective lens 118 in sequence.

The diffraction grating plate 461 causes the specific peak light LEP at a wavelength of 398 [nm] and the specific slope light LES at a wavelength of 404 [nm] to be diffracted at mutually different diffraction angles (FIG. 49).

Consequently, since the optical axis XP of the specific peak light LEP is separated from the optical axis XS, when the specific peak light LEP is collected by the objective lens 118, a focal point FMP is formed at a position that is moved in the plane direction of the optical disc 100 from the focal point FMS of the specific slope light LES.

Therefore, in the information optical system 450, in the recording layer 101, the energy concentration area RE by the specific slope light LES can be positioned so as to partially extend off the absorption change area RA rather than being within the absorption change area RA formed by the specific peak light LEP.

As a result, in the information optical system 450, similarly to the information optical system 350 in the third embodiment, it is possible to form, in the recording layer 101, a comparatively small recording mark RM in a portion in which the absorption change area RA and the energy concentration area RE overlap each other (FIG. 43(B)).

Furthermore, in the diffraction grating plate 461, the distance ΔF between focal points hardly changes depending on the incidence angle θ, and the distance ΔF between focal points changes in accordance with the pitch of the grooves in the diffraction grating 461G (FIG. 51, FIG. 52). For this reason, in the optical pickup 417, if the pitch of the grooves in the diffraction grating 461G of the diffraction grating plate 461 is formed appropriately, even in the case that the mounting accuracy of the diffraction grating plate 461 is low, the risk that the distance ΔF between focal points is varied from a desired distance is small.

In addition, it is possible for the information optical system 450 to obtain the operational advantage that are nearly the same as those of the information optical system 350 in the third embodiment.

With the above configuration, in the information optical system 450 of the optical disc apparatus 410 according to the fourth embodiment, the specific peak light LEP and the specific slope light LES are output in sequence as the information light beams LM from the semiconductor laser 3, and the diffraction grating plate 461 causes the light to be diffracted at mutually different diffraction angles. Consequently, it is possible for the information optical system 450 to partially extend the energy concentration area RE by the specific slope light LES off the absorption change area RA by the specific peak light LEP. As a result, in the information optical system 450, similarly to the information optical system 350 in the third embodiment, it is possible to reduce the plane direction length dr of the recording mark RM in the recording layer 101 and possible to increase the recording density of information.

7. Other Embodiments

Meanwhile, in the above-described first embodiment, a case has been described in which the correction lens 162 changes the divergence angle of the specific peak light LEP, and does not changes the divergence angle of the specific slope light LES.

However, the present invention is not restricted to this. Whereas the divergence angle of the specific slope light LES is changed by the correction lens 162, the divergence angle of the specific peak light LEP may not be changed. In this case, it is possible to adjust the depth Z of the focal point FMS in the specific slope light LES to the depth ZP of the focal point FMP in the specific peak light LEP. In addition, both the divergence angles of the specific peak light LEP and the specific slope light LES may be changed by the correction lens 162. This also applies to the second embodiment.

Furthermore, in the above-described first embodiment, a case has been described in which the correction lens 162 in which the convex lens unit 162A in a convex lens shape and the concave lens unit 162B in a concave lens shape are joined on the joined surface 162S.

However, the present invention is not restricted to this, and a correction lens in which other various lenses are combined may be used. In this case, regarding the correction lens, as a result of the divergences of the constituent lenses differing from each other, as the entire correction lens, the index of refraction at a wavelength of 398 [nm] of the specific peak light LEP should differ from the index of refraction specific slope light at a wavelength of 404 [nm] of the specific slope light LES. This also applies to the second embodiment.

In addition, in the above-described first embodiment, a case has been described in which the convex lens unit 162A is made of a glass material M1 and the concave lens unit 162B is made of a glass material M2.

However, the present invention is not restricted to this. Both the convex lens unit 162A and the concave lens unit 162B may be made of any glass material or resin material. In this case, in the convex lens unit 162A and the concave lens unit 162B, the indexes of refractions thereof at a wavelength of 404 [nm] of the specific slope light LES should be nearly equal, and the indexes of refraction at as wavelength of 398 [nm] of the specific peak light LEP should be different. This also applies to the second embodiment.

In addition, in the above-described first embodiment, a case has been described in which, whereas the divergence angle of the specific peak light LEP is changed by the correction lens 162, the specific slope light LES is transmitted therethrough as is.

However, the present invention is not restricted to this. For example, whereas the divergence angle of the specific peak light LEP is changed by various optical elements, such as a hologram, a diffraction grating, or a combination of these, the specific slope light LES may be transmitted therethrough as is. This also applies to the second embodiment.

In addition, in the above-described first embodiment, a case has been described in which the correction lens 162 causes the focal point FMP of the specific peak light at a LEP wavelength of 398 [nm] to be positioned to a distant place by 0.6 [μm].

However, the present invention is not restricted to this. The movement width of the focal point FMP may be any value in accordance with the size in the depth direction, the size of the energy concentration area RE, or the like in the recording mark RM. In summary, the energy concentration area RE should be formed with the target position QG being the center.

In addition, in the above-described second embodiment, a case has been described in which the correction lens 262 causes the focal point FMP of the specific peak light LEP at a wavelength of 398 [nm] to be positioned by 0.3 [μm] to a distant place. However, the present invention is not restricted to this. The movement width of the focal point FMP of the specific peak light LEP may also be set to any value. In summary, the absorption change area RA should be formed with the target position QG being in the center.

In addition, in the above-described first embodiment, a case has been described in which the light-emission point of the specific slope light is positioned at the emission end surface 3A (FIG. 27(B)) of the semiconductor laser 3, and the light-emission point of the specific peak light is positioned at a point 3B inward by approximately 10 [μm] from the emission end surface 3A.

However, the present invention is not restricted to this, and may be applied to a case in which the light-emission point of the specific peak light LEP is positioned at a position other than the point 3B. In this case, the light-emission point of the specific peak light LEP may also be in any of inside or outside the semiconductor laser 3. Furthermore, it is preferable that the light-emission point of the specific peak light LEP is in the optical axis of the specific slope light LES, but may be off the optical axis. In this case, since the optical axes of the specific peak light LEP and the specific slope light LES differ from each other, for example, the two optical axes should be aligned by using a prism. This also applies to the second embodiment.

In addition, in the above-described third and fourth embodiments, a case has been described in which the optical axis XP of the specific peak light LEP is separated from the optical axis XS of the specific slope light LES by the wedge prism 361 and the diffraction grating plate 461.

However, the present invention is not restricted to this. The optical axis XP of the specific peak light LEP may be separated from the optical axis XS of the specific slope light LES by using an optical element capable of causing the traveling direction of an optical beam to differ according to the wavelength of the light beam.

In addition, in the above-described third embodiment, a case has been described in which, by setting the incidence angle θ in the wedge prism 361 to 5 [°], the focus-to-focus distance ΔF between the focal point FMP of the specific peak light LEP and the focal point FMS of the specific slope light LES is set at 0.41 [μm].

However, the present invention is not restricted to this. The focus-to-focus distance ΔF may be set at various values by changing the incidence angle θ in the wedge prism 361. In this case, if the focus-to-focus distance ΔF is in a range that does not exceed the beam diameter dp in the specific peak light LEP, it is possible to form a recording mark RM. This also applies to the fourth embodiment.

In addition, the recording mark RM should be of a size at which an information reflection light beam LMr at a light intensity of such a degree of capable of being detected in the photodetector 167 can be reflected when an information light beam LM is emitted at reading time. For example, as described above, it is considered that the plane direction length dr is set at 0.17 [μm] or more.

In addition, in the above-described third embodiment, a case has been described in which the wedge prism 361 is made of a glass material BK7. However, the present invention is not restricted to this. The wedge prism 361 may be formed of other glass materials or resin materials. In this case, the material forming the wedge prism 361 should exhibit a different index of refraction according to the wavelength of light. Furthermore, in place of the wedge prism 361, a prism in other various shapes may be used.

In addition, in the above-described fourth embodiment, a case has been described in which the pitch of the grooves in the diffraction grating 461G of the diffraction grating plate 461 is set at 22.2 [μm]. However, the present invention is not restricted to this. The pitch of the grooves may be set as desired according to the plane direction length dr of the recording mark RM to be formed in the recording layer 101. Furthermore, as materials forming the diffraction grating plate 461, other various glass materials, resin materials, or the like can be used.

In addition, in the above-described first to fourth embodiments, a case has been described in which, in the recording layer 101, a two-photon absorbing reaction is caused to occur by specific peak light LEP so as to form an absorption change area RA, and a thermal reaction is caused to occur in a range in which the energy concentration area RE of the specific slope light LES and the absorption change area RA overlap each other so as to form a recording mark RM.

However, the present invention is not restricted to this. An arbitrary first reaction may be caused to occur by specific peak light LEP, and an arbitrary second reaction may be caused to occur in a range in which the energy concentration area RE of the specific slope light LES and the area in which the first reaction has occurred overlap each other so as to form a recording mark RM. In this case, the recording layer 101 should be made of a material with which a first reaction occurs by specific peak light LEP and a second reaction occurs as a result of a portion in which the first reaction has occurred being irradiated with specific slope light.

In addition, in the above-described first to fourth embodiments, a case has been described in which the wavelength of the laser light LL (the information light beam LM) emitted from the semiconductor laser 3 is set at 404 [nm]. However, the present invention is not restricted to this, and the laser light LL may be set to another wavelength. In this case, by appropriately selecting a material forming the recording layer 101 on the optical disc 100, a recording mark RM should be appropriately formed in the vicinity of the target position QG in the recording layer 101. For example, by considering the relationship between the wavelength and the beam diameter at light collection time, or the like, the wavelength is considered to be set in a range of 390 to 460 [nm].

In addition, in the above-described first to fourth embodiments, a case has been described in which a pulse current in a rectangular shape is supplied from the laser control unit 2 to the semiconductor laser 3. However, the present invention is not restricted to this. In summary, a pulse current at a large oscillation voltage VB should be supplied to the semiconductor laser 3 in a short time, for example, a driving pulse PD in a sinusoidal shape may be supplied.

In addition, in the above-described first to fourth embodiments, a case has been described in which an ordinary semiconductor laser (manufactured by Sony Corporation, SLD3233, etc.) is used as the semiconductor laser 3. However, the present invention is not restricted to this. In summary, a so-called semiconductor laser that performs laser oscillation using p-type and n-type semiconductors should be used. In addition, preferably, a semiconductor laser in which relaxation oscillation is forcibly caused to easily occur largely should be used.

In addition, in the above-described first to fourth embodiments, a case has been described in which the recording layer 101 contains a two-photon absorbing material that shows non-linear absorption. However, the present invention is not restricted to this. As a material showing non-linear absorption, for example, nanoparticles of silver or gold, by which plasmon resonance is caused to occur, may be used. Furthermore, the recording layer in which a recording mark RM is formed according to the amount of accumulation of light energy may be irradiated with an information light beam LM.

In addition, in the above-described first to fourth embodiments, a case has been described in which a recording mark RM having a mark length of 2 T to 11 T may be formed in the recording layer 101. Furthermore, "1" or "0" may be assigned to a 1 T mark so that information is recorded according to the presence or absence of the recording mark RM. In addition, it is not necessary that there is a one-to-one correspondence between one recording mark RM (that is, 1 T) and one oscillation output light LB, and a recording mark RM may be formed by two or more oscillation output light LB.

In addition, in the above-described first to fourth embodiments, a case has been described in which the tracks in a spiral shape formed of guide grooves are formed in the servo layer 104. However, the present invention is not restricted to this. For example, instead of guide grooves, pits or the like may be formed, or guide grooves, pits or the like may be combined. Furthermore, the tracks of the servo layer 104 may not be in a spiral shape and may be in a concentric shape.

In addition, in the above-described first embodiment, a case has been described in which servo control is performed by the servo optical system 130 by using the servo layer 104. However, the present invention is not restricted to this. For example, a servo mark serving as a reference for positioning may be formed in advance in the recording layer 101, and servo control may be performed by the servo optical system 130 by using the servo mark. In this case, the servo layer 104 of the optical disc 100 can be omitted. This also applies to the second to fourth embodiments.

In addition, in the above-described embodiments, a case has been described in which a hollow recording mark RM is formed. However, the present invention is not restricted to this. A recording mark RM may be formed by, for example, locally changing the index of refraction by a chemical change.

In addition, in the above-described first to fourth embodiments, a case has been described in which the information light beam LM is irradiated from the substrate 102 side of the optical disc 100. However, the present invention is not restricted to this. The information light beam LM may be emitted, for example, the information light beam LM is emitted from the surface of the substrate 103 side. Meanwhile, with regard to a technique for emitting the information light beam LM from both surfaces, for example, the technique disclosed in Patent Literature 2 can be used.

In addition, in the above-described first embodiment, a case has been described in which the optical disc apparatus 110 records information on the optical disc 100 or reproduces information therefrom. However, the present invention is not restricted to this. The optical disc apparatus 110 may only record information on the optical disc 100. This also applies to the second to fourth embodiments.

In addition, in the above-described first embodiment, a case has been described in which the semiconductor laser 3 serving as a semiconductor laser, the correction lens 162 serving as a divergence angle differing unit, and the objective lens 118 serving as an objective lens constitute the optical pickup 117 as an optical pickup. However, the present invention is not restricted to this. A semiconductor laser, a divergence angle differing unit, and an objective lens, which are formed of other various components, may constitute an optical pickup.

In addition, in the above-described first embodiment, a case has been described in which the semiconductor laser 3 serving as a semiconductor laser, the correction lens 162 serving as a divergence angle differing unit, the objective lens 118 serving as an objective lens, and the driving control unit 112 serving as a lens driving control unit, and the two-axis actuator 119 constitute the optical disc apparatus 110 as an optical disc apparatus. However, the present invention is not restricted to this, and a semiconductor laser, a divergence angle differing unit, an objective lens, and a lens driving control unit, which are formed of other various components, may constitute an optical disc apparatus.

INDUSTRIAL APPLICABILITY

The present invention can be used for an optical information recording and reproduction apparatus which records or reproduces, for example, large size information, such as video content, audio content, or the like, on a recording medium, such as an optical disc.

REFERENCE SIGNS LIST

3 . . . semiconductor laser, 100 . . . optical disc, 101 . . . recording layer, 110, 210, 310, 410 . . . optical disc apparatus, 111 . . . control unit, 112 . . . driving control unit, 113 . . . signal processing unit, 117, 217, 317, 417 . . . optical pickup, 118 . . . objective lens, 150, 250, 350, 450 . . . information optical system, 162, 262 . . . correction lens, 361 . . . wedge prism, 461 . . . diffraction grating plate, 461G . . . diffraction grating, LL . . . laser light, LM . . . information light beam, LE . . . specific output light, LEP . . . specific peak light, LES . . . specific slope light, XP, XS . . . optical axis, FM, FMP, FMS . . . focal point, QG . . . target position, RA . . . absorption change area, RE . . . energy concentration area, RM . . . recording mark

The invention claimed is:

1. An optical pickup comprising:
a semiconductor laser to sequentially emit, as laser light, specific peak light having first light intensity characteristics in a pulse shape and specific slope light having second light intensity characteristics in a slope shape, the specific slope light having a light intensity lower than the specific peak light and a wavelength differing from that of the specific peak light, when a driving pulse in a pulse shape and at a predetermined specific voltage is supplied;
a divergence angle differing unit to cause axes or divergence angles in the specific peak light and the specific slope light to differ from each other in accordance with the wavelength of the laser light; and
an objective lens to form, in a recording layer of an optical disc, a recording mark by collecting the specific peak light so as to cause a first reaction to occur in a first area in a vicinity of a focal point thereof and thereafter by collecting the specific slope light at a same focus position as that of the specific peak light so as to cause a second reaction to occur in a second area in which the specific slope light is irradiated within the first area in which the first reaction has occurred.

2. The optical pickup according to claim 1, wherein the divergence angle differing unit includes a first lens and a second lens that are made of materials whose divergences differ from each other, the index of refraction at the wavelength of the specific slope light being nearly the same for the first lens and the second lens, the index of refraction at the wavelength of the specific peak light differing between the first lens and the second lens.

3. The optical pickup according to claim 1, wherein the divergence angle differing unit includes a first lens and a second lens made of materials whose divergences differ from each other.

4. An optical pickup comprising:
a semiconductor laser to sequentially emit, as laser light, specific peak light having first light intensity characteristics in a pulse shape and specific slope light having second light intensity characteristics in a slope shape, the specific slope light having a light intensity lower than the specific peak light and a wavelength differing from that of the specific peak light, when a driving pulse in a pulse shape and at a predetermined specific voltage is supplied;
a divergence angle differing unit to cause divergence angles in the specific peak light and the specific slope light to differ from each other in accordance with the wavelength of the laser light; and an objective lens to form, in a recording layer of an optical disc, a recording mark by collecting the specific peak light so as to cause a first reaction to occur in a first area in a vicinity of a focal point thereof and thereafter by collecting the specific slope light at a same focus position as that of the specific peak light so as to cause a second reaction to occur in a second area in which the specific slope light is irradiated within the first area in which the first reaction has occurred, wherein the divergence angle differing unit causes the divergence angles of the specific peak light and the specific slope light to differ from each other so that the first reaction is made to occur in a range containing the focal point of the specific slope light with a position away from the focal point being the center in the recording layer.

5. The optical pickup according to claim 4, wherein the divergence angle differing unit does not change the divergence angle of the specific slope light and changes the divergence angle of the specific peak light.

6. The optical pickup according to claim 5, wherein the semiconductor laser uses an emission end surface as a light-emission point when normal output light at which a light intensity does not oscillate and the specific slope light are to be emitted and uses a place other than the emission end surface as a light-emission point when the specific peak light is to be emitted.

7. An optical disc apparatus comprising:
a semiconductor laser to sequentially emit, as laser light, specific peak light having first light intensity characteristics in a pulse shape and specific slope light having second light intensity characteristics in a slope shape, the specific slope light having a light intensity lower than the specific peak light and a wavelength differing from that of the specific peak light, when a driving pulse in a pulse shape and at a predetermined specific voltage is supplied;
a divergence angle differing unit to cause divergence angles in the specific peak light and the specific slope light to differ from each other in accordance with the wavelength of the laser light;
an objective lens to form, in a recording layer of an optical disc, a recording mark by collecting the specific peak light so as to cause a first reaction to occur in a first area in a vicinity of a focal point and thereafter by collecting the specific slope light so as to cause a second reaction to occur in a side in which the specific slope light is irradiated in the first area in which the first reaction has occurred; and
a lens driving control unit to control the position of the focal point in the specific peak light and the specific slope light by driving the objective lens,
wherein the divergence angle differing unit causes the divergence angles of the specific peak light and the specific slope light to differ from each other so that a first reaction is made to occur in a range containing the focal point of the specific slope light with a position away from the focal point being the center in the recording layer.

8. An optical pickup comprising:
a semiconductor laser to sequentially emit, as laser light, specific peak light having first light intensity characteristics in a pulse shape and specific slope light having second light intensity characteristics in a slope shape, the specific slope light having a light intensity lower than the specific peak light and a wavelength differing from that of the specific peak light, when a driving pulse in a pulse shape and at a predetermined specific voltage is supplied;
a divergence angle differing unit to cause divergence angles in the specific peak light and the specific slope light to differ from each other in accordance with the wavelength of the laser light; and
an objective lens to form, in a recording layer of an optical disc, a recording mark by collecting the specific peak light so as to cause a first reaction to occur in a first area in a vicinity of a focal point and thereafter by collecting the specific slope light at the same focus position as that of the specific peak light so as to cause a second reaction to occur in a second area in which the first reaction has occurred.

9. The optical pickup according to claim 8,
wherein the semiconductor laser uses an emission end surface as a light-emission point when normal output light at which a light intensity does not oscillate and the specific slope light are to be emitted, and uses a place other than the emission end surface as a light-emission point when the specific peak light is to be emitted, and
wherein the divergence angle differing unit does not change the divergence angle of the specific slope light and changes the divergence angle of the specific peak light.

10. The optical pickup according to claim 9,
wherein the semiconductor laser uses, as a light-emission point, a predetermined place inside the semiconductor laser when the specific peak light is to be emitted, and
wherein the divergence angle differing unit does not change the divergence angle of the specific slope light and expands the divergence angle of the specific peak light.

11. The optical pickup according to claim 9, wherein the divergence angle differing unit includes a first lens and a second lens that are made of materials whose divergences differ from each other, the index of refraction at the wavelength of the specific slope light being nearly the same for the first lens and the second lens, the index of refraction at the wavelength of the specific peak light differing between the first lens and the second lens.

12. An optical disc apparatus comprising:
a semiconductor laser to sequentially emit, as laser light, specific peak light having first light intensity characteristics in a pulse shape and specific slope light having second light intensity characteristics in a slope shape, the specific slope light having a light intensity lower than the specific peak light and a wavelength differing from that of the specific peak light, when a driving pulse in a pulse shape and at a predetermined specific voltage is supplied;
a divergence angle differing unit to cause divergence angles in the specific peak light and the specific slope light to differ from each other in accordance with the wavelength of the laser light;
an objective lens to form, in a recording layer of an optical disc, a recording mark by collecting the specific peak light so as to cause a first reaction to occur in a first area in a vicinity of a focal point and thereafter by collecting the specific slope light at the same focus position as that of the specific peak light so as to cause a second reaction to occur in a second area in which the first reaction has occurred; and a lens driving control unit to control the position of the focal point in the specific peak light and the specific slope light by driving the objective lens.

13. An optical disc apparatus comprising:
a semiconductor laser to sequentially emit, as laser light, specific peak light having first light intensity characteristics in a pulse shape and specific slope light having second light intensity characteristics in a slope shape, the specific slope light having a light intensity lower than the specific peak light and a wavelength differing from that of the specific peak light, when a driving pulse in a pulse shape and at a predetermined specific voltage is supplied;
a laser light separation unit to separate an optical axis of the specific peak light from the optical axis of the specific slope light in accordance with a wavelength of the laser light; and
an objective lens to form, in a recording layer of an optical disc, a recording mark by collecting the specific peak light so as to cause a first reaction to occur in a first area in a vicinity of a focal point of the specific peak light and thereafter by collecting the specific slope light so as to cause a second reaction to occur in a portion in which the specific slope light is collected in the first area in which the first reaction has occurred,
wherein the laser light separation unit separates the optical axis of the specific peak light and the optical axis of the specific slope light from each other so that a light collection area of the specific slope light is made to partially overlap with the first area in which the first reaction has occurred in the recording layer.

14. The optical disc apparatus according to claim 13, wherein the laser light separation unit includes a prism made of a material in which indexes of refractions at the wavelength of the specific peak light and the wavelength of the specific slope light differ from each other.

15. The optical disc apparatus according to claim 14, wherein the prism changes the refraction angle in the optical axis of the specific peak light and the refraction angle in the optical axis of the specific slope light from each other in accordance with an incidence angle of the laser light so as to change a degree of the separation between the optical axis of the specific peak light and the optical axis of the specific slope light.

16. The optical disc apparatus according to claim 13, wherein the laser light separation unit includes a diffraction grating plate having a diffraction grating formed on an entry surface or an exit surface of the laser light.

17. The optical disc apparatus according to claim 16, wherein the diffraction grating plate changes the diffraction angle in the optical axis of the specific peak light and the diffraction angle in the optical axis of the specific slope light from each other in accordance with a pitch of the grooves of the diffraction grating so as to change the degree of the separation between the optical axis of the specific peak light and the optical axis of the specific slope light.

18. The optical disc apparatus according to claim 13, wherein the laser light separation unit is such that a degree of the separation between the optical axis of the specific peak light and the optical axis of the specific slope light is adjusted so that the focus-to-focus distance is shorter than a beam diameter in the vicinity of the focal point of the specific peak light.

19. The optical disc apparatus according to claim 13, wherein the laser light separation unit separates the optical axis of the specific peak light and the optical axis of the specific slope light from each other so that, in the recording layer of the optical disc, the focal point of the specific peak light is formed at a position in the tangential direction of the optical disc from the focal point of the specific slope light.

20. An optical disc apparatus comprising:
a semiconductor laser to sequentially emit, as laser light, specific peak light having first light intensity characteristics in a pulse shape and specific slope light having second light intensity characteristics in a slope shape, the specific slope light having a light intensity lower than the specific peak light and a wavelength differing from that of the specific peak light, when a driving pulse in a pulse shape and at a predetermined specific voltage is supplied;
a laser light separation unit to separate an optical axis of the specific peak light from the optical axis of the specific slope light in accordance with a wavelength of the laser light;
an objective lens to form, in a recording layer of an optical disc, a recording mark by collecting the specific peak light so as to cause a first reaction to occur in a first area in a vicinity of a focal point of the specific peak light and thereafter by collecting the specific slope light so as to cause a second reaction to occur in a portion in which the specific slope light is collected in the first area in which the first reaction has occurred; and
a lens driving control unit to control the position of the focal point in the specific peak light and the specific slope light by driving the objective lens,
wherein the laser light separation unit separates the optical axis of the specific peak light from the optical axis of the specific slope light so that a light collection area of the specific slope light is made to partially overlap with the first area in which the first reaction has occurred in the recording layer.

\* \* \* \* \*